US012639700B2

(12) United States Patent
Li et al.

(10) Patent No.: US 12,639,700 B2
(45) Date of Patent: May 26, 2026

(54) BIOMETRIC-INTEGRATED COIN

(71) Applicant: A&C Technology, Inc., Newport Beach, CA (US)

(72) Inventors: Shihao Li, Newport Beach, CA (US); Ye Zhao, Newport Beach, CA (US); Han Qin, Newport Beach, CA (US); Jiayang Qin, Newport Beach, CA (US); Ruiming Wen, Newport Beach, CA (US); Enlong Fan, Newport Beach, CA (US)

(73) Assignee: A&C Technology, Inc., Newport Beach, CA (US)

( * ) Notice: Subject to any disclaimer, the term of this patent is extended or adjusted under 35 U.S.C. 154(b) by 0 days.

(21) Appl. No.: 18/960,645

(22) Filed: Nov. 26, 2024

(65) Prior Publication Data

US 2025/0086616 A1     Mar. 13, 2025

Related U.S. Application Data

(63) Continuation of application No. PCT/US2023/086588, filed on Dec. 31, 2023.

(Continued)

(51) Int. Cl.
*G06Q 20/36* (2012.01)
*G06Q 20/40* (2012.01)
(Continued)

(52) U.S. Cl.
CPC ....... *G06Q 20/3674* (2013.01); *G06Q 20/363* (2013.01); *G06Q 20/3678* (2013.01);
(Continued)

(58) Field of Classification Search
None
See application file for complete search history.

(56) References Cited

U.S. PATENT DOCUMENTS 8,977,569 B2    3/2015  Rao
10,110,385 B1 *  10/2018  Rush ..................... H04L 9/3234
(Continued)

FOREIGN PATENT DOCUMENTS

CA       2958478 C   *   4/2019  ............. G06F 21/35
CN    101257385 A   *   9/2008  ............... G07C 9/37
(Continued)

OTHER PUBLICATIONS

M. Kuperberg, "Blockchain-Based Identity Management: A Survey From the Enterprise and Ecosystem Perspective," in IEEE Transactions on Engineering Management, vol. 67, No. 4, pp. 1008-1027, https://ieeexplore.ieee.org/document/8792372?source=IQplus. (Year: 2020).*

(Continued)

*Primary Examiner* — El Mehdi Oussir

(74) *Attorney, Agent, or Firm* — Makoui Law, PC; Ali Makoui

(57) ABSTRACT

A method of validating the ownership of a cryptocurrency based on the user's biometric information is provided. The user's accounts are generated based on their biometric information. The biometric information of the users is stored in their accounts as their original biometric seeds. The users generate additional user-generated biometric seeds from portions of their original biometric seeds. The users use capsules as valued carriers. The users combine the capsules and their user-generated biometric seeds to generate cryptocurrencies with the same value as the capsules. When a cryptocurrency is transferred from a first owner to a second owner, the second owner decomposes the cryptocurrency to get a capsule with the same value as the cryptocurrency. The second user combines the capsule of the second user's user generated biometric seeds to generate a cryptocurrency.

18 Claims, 33 Drawing Sheets

Related U.S. Application Data

(60) Provisional application No. 63/593,397, filed on Oct. 26, 2023, provisional application No. 63/436,368, filed on Dec. 30, 2022.

(51) Int. Cl.
| | |
|---|---|
| *G06Q 20/06* | (2012.01) |
| *H04L 9/00* | (2022.01) |

(52) U.S. Cl.
CPC ..... *G06Q 20/40145* (2013.01); *G06Q 20/065* (2013.01); *G06Q 2220/00* (2013.01); *H04L 9/50* (2022.05)

(56) References Cited

U.S. PATENT DOCUMENTS

| | | | | |
|---|---|---|---|---|
| 10,205,723 | B2 * | 2/2019 | Farrell | H04L 63/0428 |
| 10,762,506 | B1 * | 9/2020 | Cash | G06Q 20/206 |
| 11,288,530 | B1 * | 3/2022 | Genner | G06F 21/32 |
| 11,405,189 | B1 * | 8/2022 | Bennison | H04L 9/083 |
| 11,783,062 | B2 * | 10/2023 | Lounsberry | G06F 21/6218 |
| | | | | 726/30 |
| 11,973,753 | B2 * | 4/2024 | Henry | H04L 63/0861 |
| 12,204,671 | B2 * | 1/2025 | Jurat | H04L 9/50 |
| 2002/0184509 | A1 | 12/2002 | Scheidt et al. | |
| 2005/0235148 | A1 * | 10/2005 | Scheidt | G06Q 20/3829 |
| | | | | 713/168 |
| 2006/0204048 | A1 * | 9/2006 | Morrison | G06F 21/32 |
| | | | | 902/3 |
| 2007/0106895 | A1 * | 5/2007 | Huang | H04L 9/3247 |
| | | | | 713/181 |
| 2010/0250944 | A1 * | 9/2010 | Suzuki | H04L 63/0861 |
| | | | | 713/172 |
| 2014/0310346 | A1 * | 10/2014 | Deng | H04L 63/0861 |
| | | | | 709/204 |
| 2016/0261411 | A1 | 9/2016 | Yao et al. | |
| 2018/0048461 | A1 | 2/2018 | Jutla et al. | |
| 2018/0198609 | A1 | 7/2018 | Khan | |
| 2018/0225640 | A1 * | 8/2018 | Chapman | G06Q 20/401 |
| 2018/0225660 | A1 * | 8/2018 | Chapman | G06Q 20/10 |
| 2018/0232739 | A1 | 8/2018 | Battle | |
| 2019/0130086 | A1 | 5/2019 | Tovey et al. | |
| 2019/0205898 | A1 | 7/2019 | Greco et al. | |
| 2019/0340350 | A1 * | 11/2019 | Campbell | G06F 21/32 |
| 2020/0036531 | A1 | 1/2020 | Minovic et al. | |
| 2021/0211288 | A1 * | 7/2021 | Yarabolu | H04L 63/0861 |
| 2021/0250347 | A1 * | 8/2021 | McBain | H04L 63/0807 |
| 2021/0297258 | A1 | 9/2021 | Keith, Jr. | |
| 2021/0398134 | A1 | 12/2021 | Dumas et al. | |
| 2022/0012731 | A1 | 1/2022 | DeRosa-Grund | |
| 2022/0027866 | A1 | 1/2022 | Choi et al. | |
| 2022/0114600 | A1 | 4/2022 | Blackburn et al. | |
| 2022/0292543 | A1 * | 9/2022 | Henderson | G06Q 30/0252 |
| 2022/0366406 | A1 * | 11/2022 | Perez | G06Q 20/389 |
| 2023/0021430 | A1 * | 1/2023 | Goodsitt | H04L 9/0643 |
| 2023/0045071 | A1 * | 2/2023 | Kalaldeh | G06Q 30/018 |
| 2023/0086191 | A1 * | 3/2023 | Jakobsson | H04L 9/3231 |
| | | | | 705/66 |
| 2023/0134651 | A1 * | 5/2023 | Agbamu | G06V 40/172 |
| | | | | 705/325 |
| 2023/0169498 | A1 * | 6/2023 | Sado | G06F 3/167 |
| | | | | 705/41 |
| 2023/0177489 | A1 * | 6/2023 | Chan | G06Q 20/3672 |
| | | | | 705/66 |
| 2023/0196353 | A1 * | 6/2023 | Jakobsson | G06Q 20/3829 |
| | | | | 705/39 |
| 2023/0230066 | A1 * | 7/2023 | Jakobsson | G06Q 20/3829 |
| | | | | 705/67 |
| 2023/0281604 | A1 * | 9/2023 | Robell | G06Q 30/018 |
| 2023/0325814 | A1 * | 10/2023 | Vijayan | G06Q 20/3829 |
| | | | | 705/66 |
| 2023/0376581 | A1 * | 11/2023 | Shear | G06F 21/32 |
| 2024/0070306 | A1 * | 2/2024 | Jurat | G06F 21/6218 |
| 2024/0170113 | A1 * | 5/2024 | Schneider | G06F 21/64 |
| 2024/0193567 | A1 * | 6/2024 | Bettati | G06Q 20/123 |
| 2024/0214194 | A1 * | 6/2024 | Kapur | H04L 9/088 |
| 2024/0235840 | A1 * | 7/2024 | Osborn | H04L 9/0894 |
| 2025/0086616 | A1 * | 3/2025 | Li | H04L 9/3231 |
| 2025/0226990 | A1 * | 7/2025 | Chen | H04L 9/50 |
| 2025/0260565 | A1 * | 8/2025 | Abdelsamie | H04L 9/3239 |

FOREIGN PATENT DOCUMENTS

| | | | | | |
|---|---|---|---|---|---|
| CN | 110495132 | A | * | 11/2019 | G06F 16/23 |
| CN | 108847931 | B | * | 6/2021 | H04L 63/06 |
| CN | 115529591 | A | * | 12/2022 | H04W 12/06 |
| CN | 115866590 | A | * | 3/2023 | |
| CN | 115866591 | A | * | 3/2023 | |
| CN | 116886315 | A | * | 10/2023 | H04L 9/3231 |
| CN | 118195601 | A | * | 6/2024 | H04L 67/1097 |
| CN | 118350047 | A | * | 7/2024 | G06F 16/285 |
| CN | 115529591 | B | * | 11/2024 | H04L 63/0861 |
| CN | 119422143 | A | * | 2/2025 | G06F 21/86 |
| CN | 120105494 | A | * | 6/2025 | G06N 5/01 |
| CN | 120449186 | A | * | 8/2025 | G06V 40/172 |
| CN | 120856439 | A | * | 10/2025 | |
| DE | 102019111565 | A1 | * | 11/2019 | G06F 21/45 |
| EP | 3289509 | B1 | * | 9/2020 | G06F 21/645 |
| ES | 2894918 | A1 | * | 2/2022 | G06Q 20/36 |
| GB | 2576582 | A | * | 2/2020 | G06Q 20/36 |
| GB | 2616406 | A | * | 9/2023 | H04L 9/3247 |
| IN | 202541048684 | A | * | 6/2025 | |
| JP | 2014089746 | A | * | 5/2014 | |
| JP | 6697265 | B2 | * | 5/2020 | G06Q 20/40145 |
| JP | 2021511595 | A | * | 5/2021 | G06Q 40/02 |
| JP | 6978168 | B1 | * | 12/2021 | H04L 9/32 |
| JP | 7007077 | B1 | * | 1/2022 | |
| JP | 2022065010 | A | * | 4/2022 | |
| JP | 2022091158 | A | * | 6/2022 | |
| JP | 7128597 | B1 | * | 8/2022 | A61B 5/01 |
| JP | 7171977 | B1 | * | 11/2022 | H04L 63/0853 |
| JP | 7258321 | B1 | * | 4/2023 | H04L 63/0861 |
| JP | 2024175034 | A | * | 12/2024 | G06F 21/64 |
| KR | 20180013524 | A | * | 2/2018 | H04L 9/3247 |
| KR | 101984758 | B1 | * | 5/2019 | H04L 9/0643 |
| KR | 20190118414 | A | * | 10/2019 | G06K 9/00885 |
| KR | 20200073105 | A | * | 6/2020 | H04L 9/50 |
| KR | 20210061676 | A | * | 5/2021 | G06Q 30/0207 |
| KR | 102308859 | B1 | * | 10/2021 | H04L 63/0861 |
| WO | WO-03065169 | A2 | * | 8/2003 | G06F 21/6245 |
| WO | WO-2006094048 | A2 | * | 9/2006 | G06V 40/67 |
| WO | WO-2011005869 | A2 | * | 1/2011 | G06F 21/64 |
| WO | WO-2020106803 | A1 | * | 5/2020 | G06Q 10/10 |
| WO | WO-2020125839 | A1 | * | 6/2020 | H04L 9/50 |
| WO | WO 2022/042970 | | | 3/2022 | |
| WO | WO-2022042970 | A1 | * | 3/2022 | H04L 63/0861 |
| WO | WO-2022232833 | A1 | * | 11/2022 | G06F 21/32 |
| WO | WO-2023080075 | A1 | * | 5/2023 | H04L 9/50 |
| WO | WO-2023122182 | A1 | * | 6/2023 | H04L 9/3297 |
| WO | WO-2024043950 | A1 | * | 2/2024 | G06F 21/64 |
| WO | WO-2024137146 | A1 | * | 6/2024 | H04L 9/3239 |
| WO | WO 2024/145679 | | | 7/2024 | |
| WO | WO-2024145679 | A2 | * | 7/2024 | G06Q 20/3678 |
| WO | WO-2024148027 | A1 | * | 7/2024 | G06Q 20/389 |
| WO | WO-2024148028 | A1 | * | 7/2024 | H04L 9/50 |
| WO | WO-2025083159 | A1 | * | 4/2025 | H04L 9/3247 |

OTHER PUBLICATIONS

Bhujel S, Rahulamathavan Y. A Survey: Security, Transparency, and Scalability Issues of NFT's and Its Marketplaces. Sensors ( Basel). 2022, https://pmc.ncbi.nlm.nih.gov/articles/PMC9696178/ (Year: 2022).*

International Search Report and Written Opinion of the International Searching Authority of the commonly owned PCT/US2023/086588, published as International Publication WO 2024/145679, listed as item # 16, above, dated May 30, 2024, 18 pages.

* cited by examiner 300                        104

Non-synchronous redeem redeem reject redeem first bio-contract confirmation redeem reject

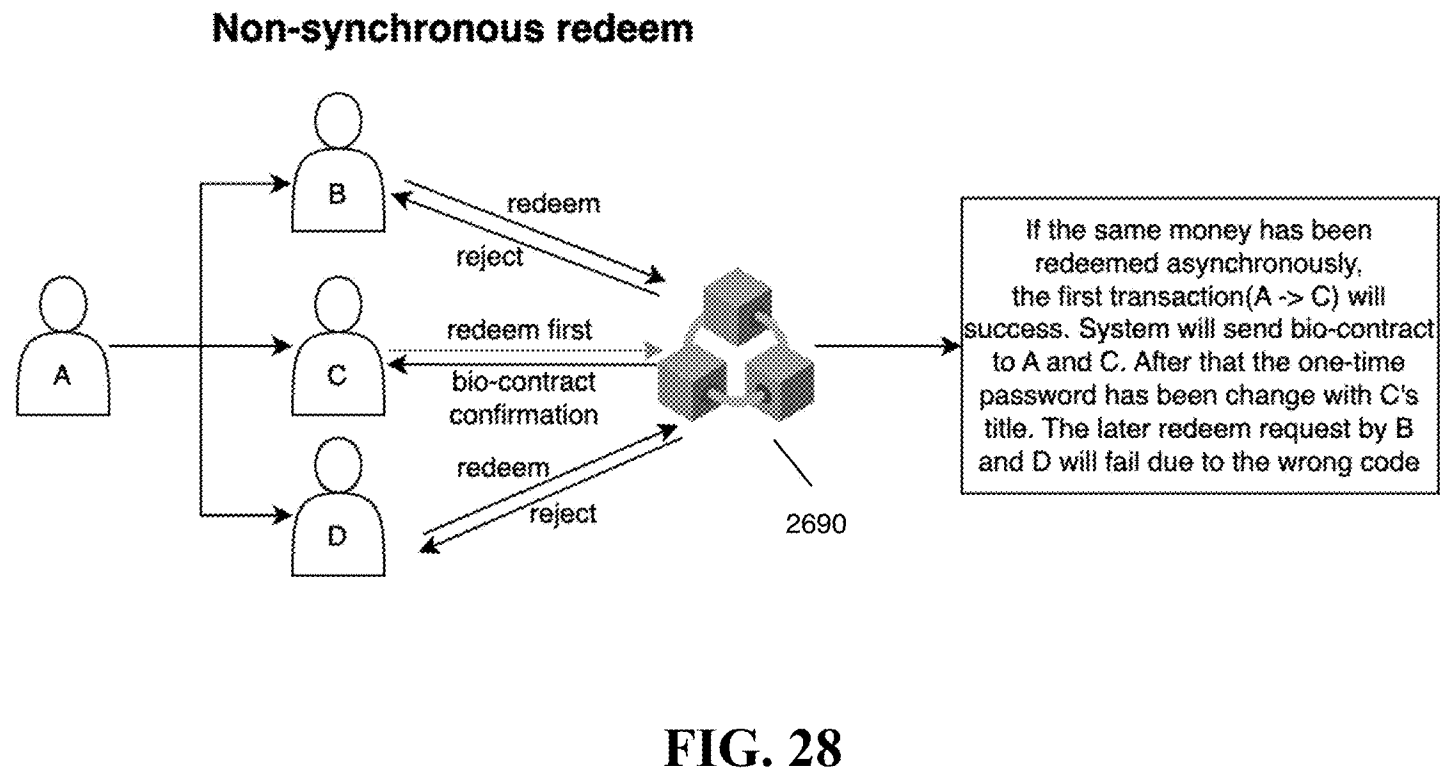

2690

If the same money has been redeemed asynchronously, the first transaction(A -> C) will success. System will send bio-contract to A and C. After that the one-time password has been change with C's title. The later redeem request by B and D will fail due to the wrong code

FIG. 28

BIOMETRIC-INTEGRATED COIN

CLAIM OF BENEFIT TO PRIOR APPLICATIONS

This application is a continuation application of PCT Application PCT/US2023/086588, filed on Dec. 31, 2023, published as WO 2024145679. PCT Application PCT/US2023/086588 claims the benefit of U.S. Provisional Patent Application Ser. No. 63/593,397, filed on Oct. 26, 2023, and U.S. Provisional Patent Application Ser. No. 63/436,368, filed on Dec. 30, 2022. The contents of PCT Application PCT/US2023/086588, published as WO 2024145679. PCT Application PCT/US2023/086588; U.S. Provisional Patent Application 63/593,397; and U.S. Provisional Patent Application 63/436,368 are hereby incorporated by reference.

BACKGROUND

Recently, there has been a growing trend for development of decentralized trust and financial systems. Utilizing blockchain technology, digital payments may be performed by a distributed ledger and recorded on a blockchain. A blockchain is a distributed ledger of all transactions with respect to payments and/or established contracts. The distributed ledger includes a growing list of records (or blocks) that are cryptographically linked together. Each block may include a cryptographic hash of the previous block, a timestamp, and transaction data.

A blockchain network uses its own native digital coin as the basic unit of account in a transaction. For example, ether (ETH) is the native cryptocurrency of the Ethereum blockchain network and bitcoin (BTC) is the native cryptocurrency of the bitcoin blockchain network. The blockchain network provides a digital method for people to interact with financial activities. Decentralized applications (DApps) are developed to operate autonomously on blockchain networks.

Blockchain tokens are digital assets (or cryptocurrencies) that are created and stored on existing blockchains, using smart contracts. Each blockchain token represents a set of rules encoded in a smart contract. A smart contract is a program published and run on the blockchain. It is a collection of codes and data which exist on a specific address on the blockchain. The codes are open to the public and results are predictable provided the inputs are determined. The codes will be executed automatically and cannot be deterred. Also, due to the nature of the blockchain, it is extremely hard to modify both the code and the data unrightfully. This feature provides fairness to both parties participated in the transaction and prevents data manipulation.

Zero-knowledge proof of knowledge (ZKP) or zero-knowledge protocol is a cryptographic protocol that enables a prover to demonstrate knowledge of a fact to a verifier without revealing any specific details. It allows the prover to prove the validity of a statement without disclosing the underlying information. By leveraging mathematical computations and interactions, the prover convinces the verifier while preserving privacy. This protocol has applications in areas like blockchain, enhancing privacy and security by verifying transactions or contracts without exposing sensitive data. It provides a powerful tool for verifying information without unnecessary disclosure, bolstering trust in digital systems.

Biometric identification of the present embodiments ureses unique biological characteristics or traits, such as fingerprints, facial features, palm patterns, palm vein patterns, iris patterns, retinal patterns that are extracted from biometric images acquired from the users to identify and verify individuals. By capturing and analyzing these traits, biometric systems create digital templates that may be compared against a database for identification purposes. This technology offers enhanced security, convenience, and accuracy, eliminating the need for passwords or physical ID cards. It finds applications in various sectors, including law enforcement, access control, and financial transactions.

In today's digital age, the security of personal information and online accounts has become paramount. With cyber threats and hacking attempts on the rise, traditional static passwords are no longer sufficient to protect sensitive data. To counter these risks, dynamic passwords have emerged as a powerful security measure.

Dynamic passwords, also known as one-time passwords (OTPs) or temporary passwords, provide an additional layer of security by generating unique authentication codes that expire after a single use or within a short time frame. Unlike static passwords that remain constant until manually changed, dynamic passwords are constantly changing, making them significantly more challenging for attackers to exploit.

The fundamental principle behind dynamic passwords is to ensure that even if an unauthorized individual manages to intercept or obtain the password, they will not be able to misuse it since it becomes invalid within a short period. This time-based or one-time use nature of dynamic passwords significantly reduces the risk of unauthorized access and strengthens the security of online accounts, systems, and networks.

There are several mechanisms used to generate dynamic passwords: Time-based OTPs: These passwords are generated based on the current time, using algorithms such as the Time-based One-Time Password (TOTP) algorithm. The user's device and the server share a secret key, and a new password is generated periodically, typically every 30 seconds. The server may verify the generated password using the shared key and validate its authenticity.

Event-based OTPs: These passwords are generated in response to a specific event or trigger, such as a user request or action. For example, when logging into an online banking platform, an OTP may be sent to the user's registered mobile number or email address, providing a unique code to complete the login process.

Push-based OTPs: This mechanism involves using mobile applications or specialized security tokens that generate dynamic passwords and deliver them directly to the user's device. These applications or tokens establish a secure connection with the authentication server and provide a real-time, one-time password for verification purposes.

In recent years, facial recognition technology has gained significant attention and recognition itself as one of the most innovative and impactful advancements in the field of computer vision and biometrics. It is a technology that enables the identification or verification of individuals based on their unique facial features. By analyzing facial characteristics and patterns, facial recognition systems have found applications in various domains, ranging from security and surveillance to user authentication and personalized experiences.

The process of facial recognition involves several key steps. Firstly, a facial recognition system captures an image or video of a person's face using a camera or other imaging devices. The system then analyzes the image to extract distinct facial features, such as the size and shape of the eyes, nose, mouth, and other facial landmarks. These features are often represented as mathematical algorithms or templates that serve as a unique identifier for each individual.

However, when utilizing facial recognition technology in an online system, the unique facial features need to be transmitted through a network. Despite encryption measures, the risk of potential leakage to hackers remains a concern.

Currently, blockchain technology has gained significant traction and is being implemented across various industries. It offers benefits such as transparency, immutability, and decentralized consensus. However, there are some challenges that need to be addressed.

First of all, the transaction data recorded on traditional blockchain is tedious. Traditional blockchain transactions involve recording transaction details on a public ledger, which is a decentralized and distributed database shared among participants in the network. Each transaction is added as a new entry or block in the ledger, providing a transparent and immutable record of all transactions. This public ledger ensures that anyone may view and verify the transaction history, promoting transparency and accountability. The sender's address, the receiver's address, timestamp, and the transaction amount or value being transferred must be included in traditional blockchain's public ledger. These transaction details are crucial for tracking and verifying the movement of assets on the blockchain.

While blockchain provides secure and transparent transactions, scalability remains a challenge. The limited transaction processing speed and high energy consumption of some blockchain networks hinder their efficiency for high-volume and real-time applications.

Blockchain technology is known for its robust security due to cryptographic algorithms and decentralized consensus mechanisms. However, vulnerabilities in smart contracts, potential 51% attacks, double spending attacks, DOS attacks and the risk of private key compromise pose security concerns.

BRIEF DESCRIPTION OF THE DRAWINGS

The various embodiments of the present biometric-integrated coin now will be discussed in detail with an emphasis on highlighting the advantageous features. These embodiments depict the novel and non-obvious biometric-integrated coin shown in the accompanying drawings, which are for illustrative purposes only. These drawings include the following figures, in which like numerals indicate like parts:

FIGS. 28 and 29 illustrate two scenarios in which A spends the same cryptocurrency's passcode to several individuals, for example B, C, and D, according to various aspects of the present disclosure;

DETAILED DESCRIPTION

Figure 1:
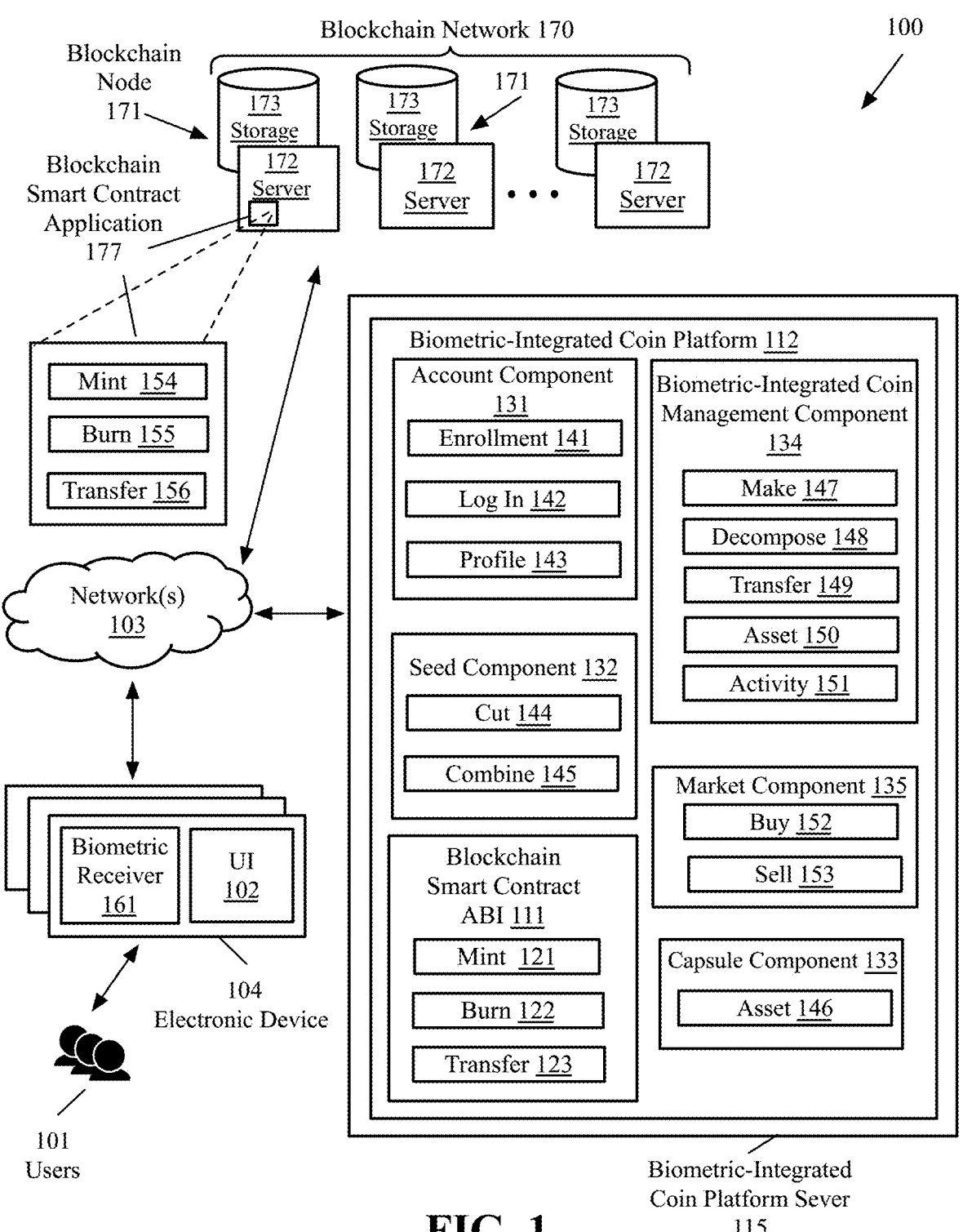
FIG. 1 is a functional block diagram illustrating an example biometric-integrated coin system, according to various aspects of the present disclosure.

One aspect of the present embodiments includes the realization that the existing methods of verifying the ownership of blockchain cryptocurrencies suffer from several shortcomings. Currently, the ownership of a blockchain cryptocurrencies is checked by referring to the blockchain as the ledger. However, the blockchain system is a fully distributed ledger network and many resources are used to maintain this network including mining machines and electrical power. Thus, there is a need to reduce the power and resource usage while the ownership may still be checked, and the system is decentralized at the same time.

Currently, the early participants who take part in the presale or start mining at the very beginning of a project will get most of the cryptocurrencies but participants who join later will get much fewer cryptocurrencies than the early participants. Therefore, the system is not fair to all participants. Thus, there is a need to create a fair system that everyone may get their digital assets at any time as they join the system.

Nowadays there are many companies and engineers who issue their own digital cryptocurrencies (or digital tokens). These events increased the ways for people to interact with financial activities, created opportunities for new markets and applications, and secured user's ownership of their assets by common ledger and encryption technology. However, to embrace those benefits of the cryptocurrencies, one must have preliminary funds invested into the corresponding cryptocurrencies, and most cryptocurrencies are stored in encrypted files called wallets. Currently, most of the wallets are secured by private keys, which are generated by encryption algorithms, such as, ECDSA (Elliptical Curve Digital Signature Algorithm). One vulnerability of this schema is that malicious persons who get the private keys by cheating may, under some circumstances, gain access to the corresponding wallets and transfer all funds (cryptocurrencies) to a third-party account. Another vulnerability is that if a person forgets the private key of a wallet, no one could gain access to the corresponding wallet and all cryptocurrencies in that wallet will be lost.

Some of the present embodiments solve the aforementioned problems by providing a cryptocurrency whose ownership may be validated and may not be transacted without the proof of the user to be its validated owner. These embodiments provide a robust environment for those cryptocurrencies to be transacted. The present embodiments provide a system with novel ways of generating unlimited amount of cryptocurrencies with a person's biometrics that may be used to prove the cryptocurrencies ownership. A designed digital carrier, or capsule, is provided to load those cryptocurrencies, to grant those cryptocurrencies the value, and the ability to transact.

The present embodiments provide methods to generate the cryptocurrencies with biometrics and the capsule loaders of those cryptocurrencies. The biometric-integrated coins of the present embodiments are verified and bonded by the users' biometric information so that nobody else may steal the coins. Only the owner of biometric-integrated coins may process their biometric-integrated coins with their own biometric information. In some embodiments, the biometric-integrated coins are the native coin of a blockchain. In some embodiments, the biometric-integrated coins may be integrated as a token in blockchains with other native coins.

The present embodiments provide fairness for all participants by ensuring equitable coin distribution during airdrops and rewards. Unlike other cryptocurrencies that can be exploited by users creating multiple wallets for extra coins, the system of present embodiments incorporates biometric information to uniquely link a user to their wallet. This prevents users from redeeming rewards multiple times, promoting fairness and equitable coin distribution.

The remaining detailed description describes the present embodiments with reference to the drawings. In the drawings, reference numbers label elements of the present embodiments. These reference numbers are reproduced below in connection with the discussion of the corresponding drawing features.

FIG. 1 is a functional block diagram illustrating an example biometric-integrated coin system 100, according to various aspects of the present disclosure. With reference to FIG. 1, the system 100 may include several electronic devices 104, one or more networks 103, and at least one biometric-integrated coin platform 112. The platform 112, in some embodiments, may be implemented on one or more electronic devices, such as, the biometric-integrated coin platform server 115.

The electronic devices 104, in some embodiments, may be mobile devices such as smartphones or a personal digital assistants (PDAs), computing devices such as tablet computers, laptop computers, desktop computers, servers, or any other electronic device that includes one or more biometric receivers 161 to receive images with the users' biometric information. The biometric receivers 161 may include, but are not limited to, a fingerprint scanner, a face scanner (e.g., a camera), a palm scanner, a palm vein scanner, an iris scanner, a retinal scanner, etc. The platform 112 may include one or more functional components that may be implemented by machine-readable instructions. The functional components May include an account component 131, a seed component 132, a capsule component 133, a biometric-integrated coin management component 134, and a market component 135.

With further reference to FIG. 1, the users 101 may access the platform 112 through a user interface (UI) 102 provided by the electronic devices 104. The users 101, in some embodiments, may need an account to interact with the platform 112. The account component 131 may provide functions related to accounts. The account component 131 may include an enrollment component 141, a log in component 142, and a profile component 143. The enrollment component 141 may be used to enroll a user 101 to use the platform 112. For example, the enrollment component 141 may be used to create an account for the user. As described below, the user may be required to provide biometric information, such as fingerprints, facial features, palm patterns, palm vein patterns, iris patterns, retinal patterns, etc., that may be stored as the user's biometric information or original seeds. A user may have several original seeds. For example, the user may have their facial image as one original seed and have one of his fingerprint as another original seed. Different fingerprint images are stored as different original seeds. The log in component 142 may provide access to the platform 112 to the users who have already enrolled in. The profile component 143 may allow the users to check and update their profiles.

Some embodiments provide seeds generated from the users' biometric information. Some embodiments provide capsules that operate as valued carrier of the seeds. The users 101 may use capsules to make biometric-integrated coins by combining capsules and seeds. With reference to FIG. 1, the seed component 132 may be configured to allow the users to create seeds using their own biometric information. The seed component 132 may include a cut component 144 and a combine component 145. The cut component 144 may be configured to cut the original seeds to become small seeds and the combine component 145 may be configured to combine small seeds to become large seeds.

The capsule component 133 may be configured to allow the users to deal with their capsules. The capsule component may include an asset component 146. The asset component 146 may be used by the users, for example, to check how many capsules they have.

The biometric-integrated coin management component 134 may be used by the users to manage their biometric-integrated coins. The biometric-integrated coin management component 134 may include a make component 147, a decompose component 148, a transfer component 149, an asset component 150, and an activity component 151. The make component 147 may be configured to allow the users to make their own biometric-integrated coins using seeds and capsules. The decompose component 148 may be configured for the user to decompose other users' biometric-integrated coins they receive. The transfer component 149 may be configured to allow the users to transfer their own biometric-integrated coins to others. The asset component 150 and the activity component 151 may be configured to allow the users to view the details of their coins and activities, respectively.

With further reference to FIG. 1, after a biometric-integrated coin is made, transferred, or destroyed, the results may be recorded on a blockchain network 170. Blockchain networks provide a distributed, unchangeable ledger. Blockchain networks may be public, private, or government blockchains. Examples of blockchain networks include Bitcoin, Ethereum, IBM Blockchain, Corda, etc. A blockchain network provides an infrastructure that allows applications to access ledger and smart contract services. Smart contracts may be used to originate transactions, which are transmitted to each node of the blockchain network and recorded on their copy of the ledger.

The blockchain network 170 may be a distributed ledger which is a decentralized network of blockchain nodes 171. Each blockchain node 171 may include at least one server 172 and storage media 173. The nodes 171 of the blockchain network 170 may communicate with each other through the network(s) 103. The network(s) 103 may include the Internet, user's networks (e.g., Wi-Fi, Ethernet, etc.), telecommunication networks (e.g., public switched telephone networks (PSTNs), packet-switched networks, etc.), networks of servers and backend devices, etc.

The blockchain smart contract application 177 may run on any of the blockchain nodes 171. For example, the blockchain smart contract application 177 may run on a virtual machine (VM) implemented on any of the nodes 171. A VM is an emulation (or software implementation) of a particular computer system.

The blockchain smart contract application 177 may be accessed through an application binary interface (ABI), such as the blockchain smart contract ABI 111. An ABI is an interface between two program modules, one of which is often at the level of machine code. The interface is the de facto method for encoding and decoding data into and out of the machine code. For example, in Ethereum blockchain network, programmers may use ABIs to encode Solidity contract calls for the Ethereum virtual machine (EVM). The programmers may use ABIs to read the data out of transactions. An ABI acts as a function selector, defining the specific functions that may be called to a smart contract for execution.

When a user activity comes (for example, a user makes a biometric integrated coin using the make function 147 or transfers a biometric integrated coin using the transfer function 149), the activity may trigger an ABI call on the biometric-integrated coin platform 112 platform. The ABI call may then execute a corresponding function in the blockchain smart contract application 177. When the function executes, it may emit events. These events are permanently stored on the blockchain. Meanwhile, the biometric-integrated coin platform 112 may always listen to the blockchain events and if the corresponding event is emitted, the biometric-integrated coin platform 112 may get the results and may display the results to the users.

In the example of the blockchain smart contract application 177 of FIG. 1, the smart contract application functions mint 154, burn 155, and transfer 156 may be activated by the corresponding mint 121, burn 122, and transfer 123 interfaces of the ABI 111. The ABI 111 encodes the function signatures and variable declarations into information that allows the VM that implements the blockchain smart contract application 177 to know which function is to be executed and what parameters are passed to the function.

Figure 2:
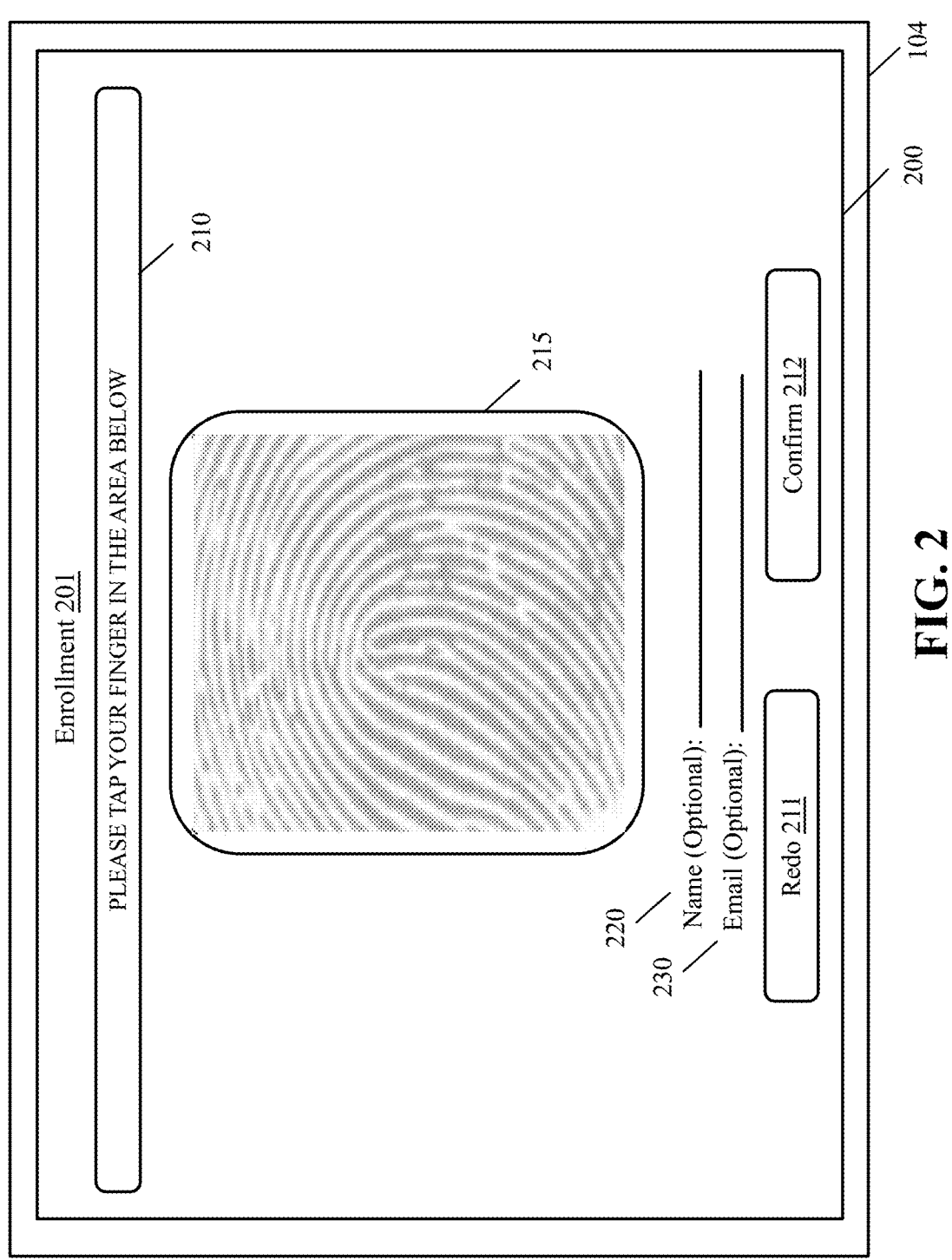
FIG. 2 illustrates a schematic front view of the display of an electronic device that includes a user interface displaying the enrollment page of the account component of the biometric integrated coin system, according to various aspects of the present disclosure.

FIG. 2 illustrates a schematic front view of the display of an electronic device 104 that includes a user interface 200 displaying the enrollment page of the account component of the biometric-integrated coin system, according to various aspects of the present disclosure. The electronic device 104 may be any of the electronic devices 104 of FIG. 1 and the UI 200 may be an example of the UI 102 of FIG. 1.

For enrollment to the biometric-integrated coin system, the users may need to provide their biometric information. The biometric information may include, but is not limited to, fingerprint information, two-dimensional (2D) or three-dimensional (3D) facial information, palm print information, palm vein print information, iris information, etc.

In the example of FIG. 2, the UI 200 may display an enrollment page 201. The enrollment page 201 may include a display area 215 for displaying an image that includes biometric information of the user. As described above with reference to FIG. 1, the electronic devices 104 may include one or more biometric receivers 161 to receive users' biometric information. In some embodiments that use fingerprints as the biometric information, the biometric receiver 161 may be a fingerprint sensor. The fingerprint sensor may be, for example, an optical sensor or a capacitive sensor. The sensor may be positioned in a particular area of the display of the electronic device (e.g., in the display area 215). In other embodiments that use fingerprints as the biometric information, the biometric receiver 161 be included in a fingerprint scanner that is communicatively coupled to the electronic device 104. In these embodiments, the image of the fingerprint that is scanned by the fingerprint scanner may be displayed in the display area 215. It should be noted that the term fingerprint is referred to the impression of a fingertip on a surface. Some of the present embodiments, may use images of the fingerprints of a user to extract biometric information regarding the user.

In the embodiments that use users' facial information as the biometric information, the electronic device 104 may include a face scanner (e.g., a camera) and the user may be prompted to provide several images if the user's face from different directions. In the embodiments that use the user's iris information as the biometric information, the electronic device 104 may include an iris scanner that may take images of the user's iris. In the embodiments that use the user's rental information as the biometric information, the electronic device 104 may include a retina scanner that may take images of the user's retina. The embodiments that use users' palm print information as the biometric information, may get the images of the user's palm prints from a palm scanner. The embodiments that use users' palm vein information as the biometric information, may get the image of the user's palm vein patterns from a palm vein scanner.

The electronic device 104, in some embodiments, may include third party hardware (e.g., an external fingerprint scanner that is communicatively coupled to the electronic device) and/or third-party software applications to collect the users' biometric information. A non-limiting example of a third-party service for facial recognition is the Amazon Web Services (AWS) Rekognition, which is a service that detects objects, scenes, activities, landmarks, faces, dominant colors, and image quality. The AWS Rekognition, or similar services, may be used by some embodiments, to store and recognize users' faces. This flexible approach allows the present embodiments to adapt to various hardware capabilities and third-party solutions based on the specific requirements and preferences of the system.

Although several examples are described with reference to FIGS. 2-6 that use images of a person's fingerprint as the images with the user's biometric information, it should be understood that the operations of FIGS. 2-6 may be performed on images that include other types of the user's biometric information, such as the images of face, iris, retina, palm, palm vein, etc., of the user in the UIs and operations of FIGS. 2-6.

Referring back to FIG. 2, the UI may include a prompt 210 asking the user to tap the user's finger on the display areas 215. The user may optionally provide a name 220, an email 230, or other identification information after providing the biometric information. The optional identification information may be provided to other users to transfer biometric-integrated coins. After the user provides the information, the user may select the confirm option 212 of the UI 200 to finish enrollment. When the option 212 is selected, the user's biometric information (in this example a fingerprint) may be sent from the electronic device 104 of the user to the biometric-integrated coin platform server 115. The user's biometric information (e.g., the image of the fingerprint) may be stored by the biometric-integrated coin platform server 115 as one of the user's original seeds. As described below, the original seeds may be preserved but the user may be provided with a copy of an original seed in order to cut the original seed into smaller user-generated seeds.

The user may be required to provide several biometric information during the enrollment process. For example, in the embodiments that use fingerprints as biometric information, the user may be required to provide fingerprints from several fingers (e.g., from any number of fingers from 2 to 10). The user may select the redo option 211 of the UI 200 to clear all information and restart the enrollment process.

After the user has enrolled in the system, the user may get a unique user identification (ID). The unique ID may be used as the unique identification of that user. For example, anyone who wants to transfer biometric-integrated coins to this user may use this ID to get in touch with the user. The ID may also be shown (e.g., as described below with reference to FIG. 3) in the user's profile for the user's convenience. After the user has enrolled in the biometric-integrated coin system, the user may log into the system again by providing user's biometric information and successfully passing the verification of the biometrics.

Figure 3:
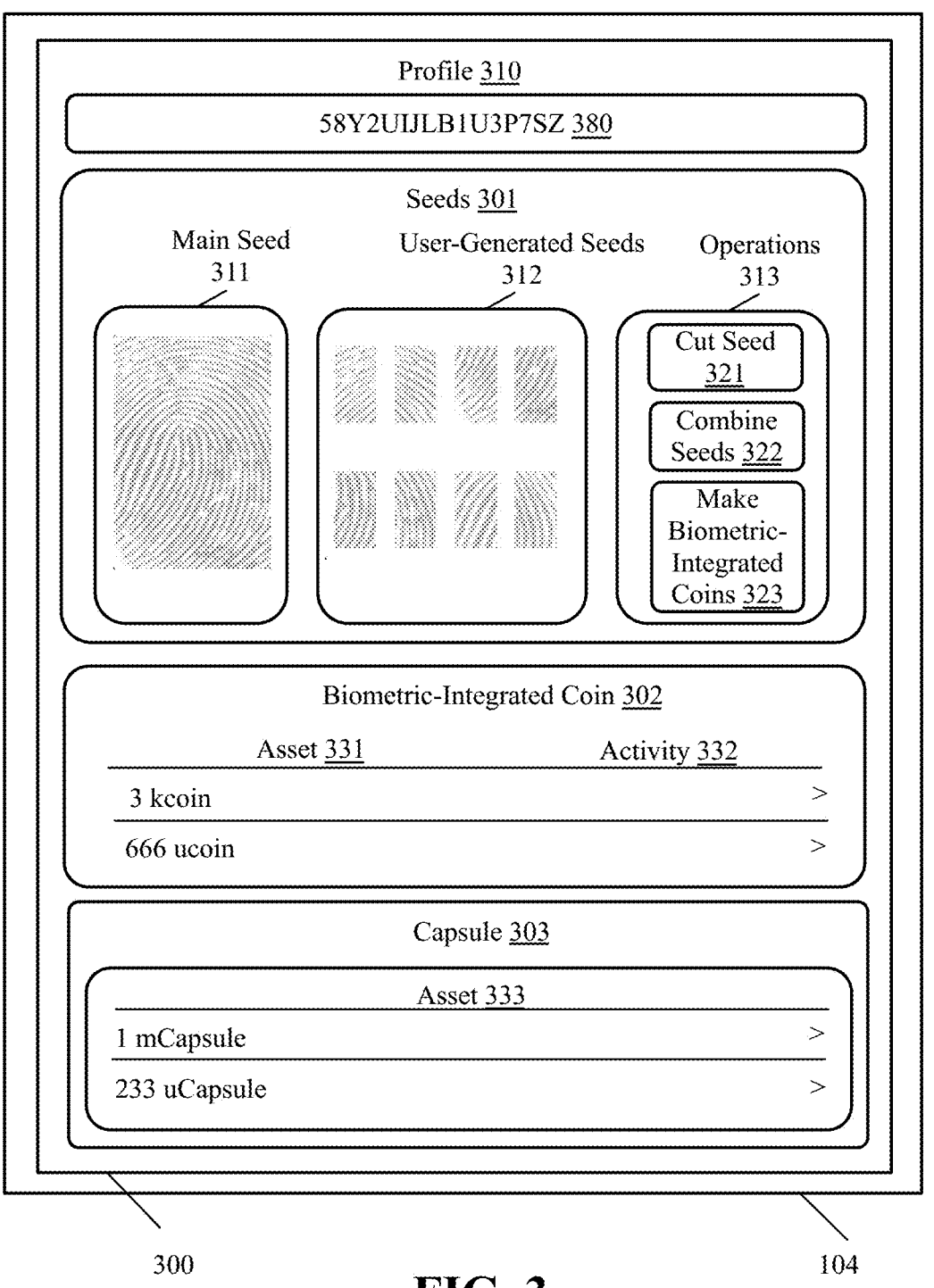
FIG. 3 illustrates a schematic front view of the display of an electronic device that includes a user interface displaying the profile page of the account component of the biometric integrated coin system, according to various aspects of the present disclosure.

FIG. 3 illustrates a schematic front view of a display of an electronic device 104 that includes a user interface 300 displaying the profile page of the account component of the biometric-integrated coin system, according to various aspects of the present disclosure. The electronic device may be any of the electronic devices 104 of FIG. 1 and the UI 300 may be an example of the UI 102 of FIG. 1. The electronic device 104 may receive the user's profile information from the biometric-integrated coin platform server 115 and may display the information on the UI 300.

The profile page 310 may show three types of items that are associated with a user in the biometric-integrated system, namely, seeds 301, capsules 303, and biometric-integrated coins 302. The seeds may be used to include the users' biometric information. The capsules may be used as a valued carrier of the seeds. The users may use capsules to make biometric integrated coins by combining the capsules and seeds. The users may use the biometric-integrated coins to make any activities, including but not limited to, transferring biometric-integrated coins to others, burn (destroy) their own biometric-integrated coins, lending out their biometric integrated coins to get money, etc.

It should be noted that only the users' own biometric-integrated coins may be proceeded with all these activities. That is, a user cannot use other users' biometric-integrated coins even if the biometric-integrated coins have already been transferred to the user. Instead, the user may decompose the transferred biometric-integrated coins and use the capsules the user gets to make the user's own biometric-integrated coins.

The capsules and the biometric-integrated coins may have different sizes with different values. For example, users may have different kinds of capsules, such as, ucapsule, kcapsule and mcapsule, where ucapsule (or the unit capsule) is the smallest unit for capsules and indicates one capsule, kcapsule indicates 1,000 capsule, and mcapsule indicates 1,000, 000 capsules. The biometric-integrated coins may also have different kinds such as, ucoin, kcoin, and mcoin, where ucoin (or unit coin) is the smallest unit for the biometric-integrated coins and indicates one biometric-integrated coin, kcoin indicates 1,000 biometric-integrated coins, and mcoin indicates 1,000,000 biometric integrated coins.

With reference to FIG. 3, the profile page 310 may display the user's user ID 380 to allow the user to copy and share the user's own ID. As shown, the UI 300 may include three sections: the seeds 301, the biometric-integrated coins 302, and the capsules 303 in the profile page 310. The seeds section 301 may be divided into three subsections: original seed display area 311, user-generated seeds display area 312, and operations section 313. There are at least three operations for the seeds: cut seed 321, combine seeds 322, and make biometric-integrated coins 323. For the biometric-integrated coins, the users may view the assets 331 and the activities 332 of their biometric-integrated coins. For the capsules, the users may view their owned capsules through the asset subsection 333.

Figure 4:
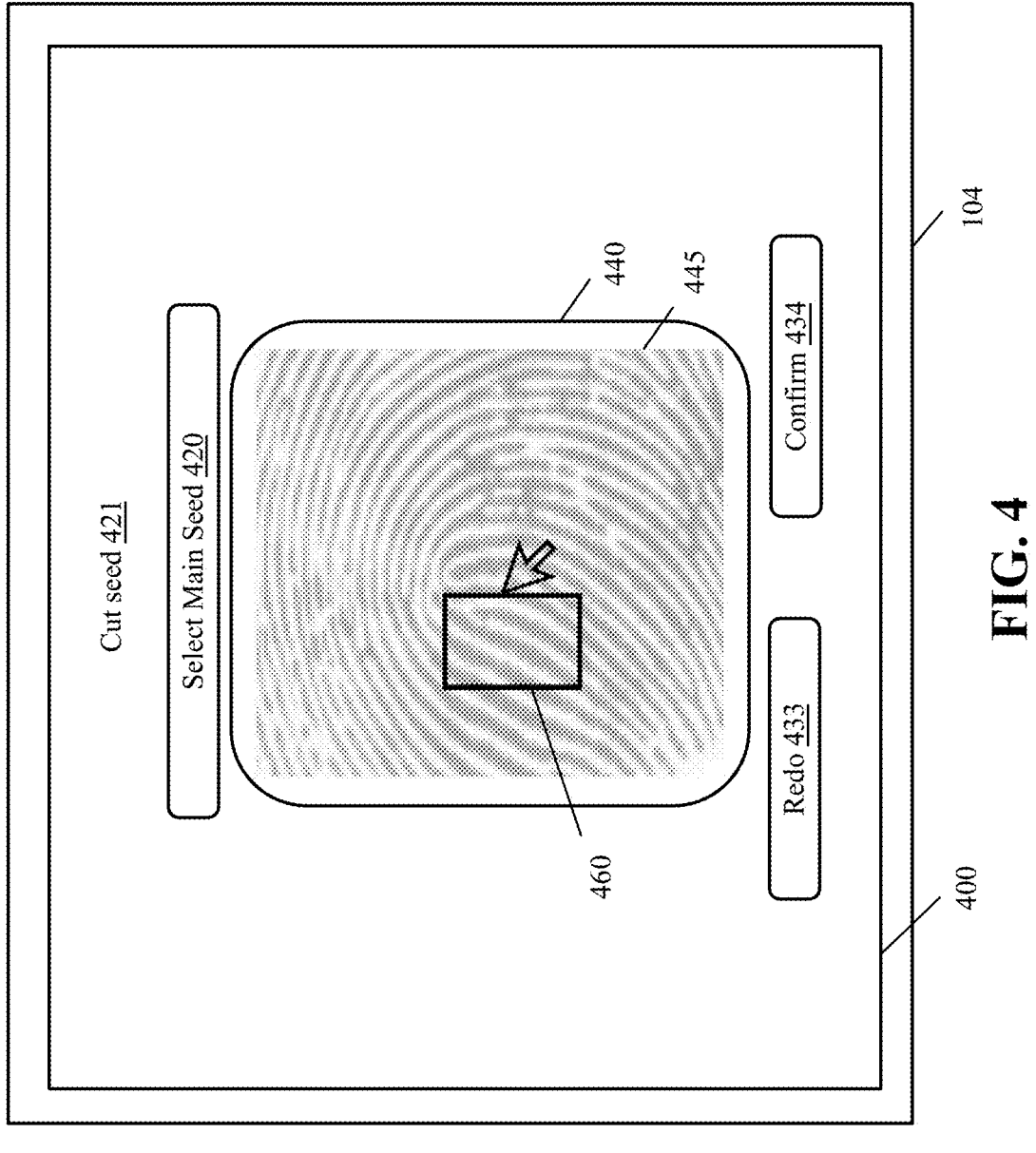
FIG. 4 illustrates a schematic front view of the display of an electronic device that includes a user interface displaying the cut seed page of the seed component of the biometric integrated coin system, according to various aspects of the present disclosure.

FIG. 4 illustrates a schematic front view of the display of an electronic device 104 that includes a user interface 400 displaying the cut seed page of the seed component of the biometric-integrated coin system, according to various aspects of the present disclosure. The electronic device may be any of the electronic devices 104 of FIG. 1 and the UI 400 may be an example of the UI 102 of FIG. 1. The cut seed page 421, in some embodiments, may be displayed when the cut seed option 321 of FIG. 3 is selected.

With reference to FIG. 4, the UI 400 may display an option 420 for selecting one of the user's original seeds. In some embodiments, a user may provide several different biometric information to be used as the original seeds. For example, each fingerprint may be a different original seed, each iris image may be a different original seed, different facial images may be different original seeds, etc. Selecting the option 420 may display the user's original seeds to allow the user to select an original seed for the cut operation. For example, in response to selecting the option 420, the electronic device 104 may receive the user's original seeds from the biometric-integrated coin platform server 115 and may display the user's original seeds in a pop-up display or in a drop-down menu to allow the user to select one of the original seeds.

The UI 400 may provide a display area 440 for displaying the biometric information (e.g., the fingerprint) 445 selected by the user as the original seed. The user may identify a portion of the biometric information to cut, for example, by drawing a shape 460 (e.g., a rectangle, a circle, an arbitrary shape, etc.) over the image of the fingerprint 445. It should be noted that the original seed itself is not destroyed during the cut operation. Instead, the cut operation is performed on a copy of the original seed. The original seed is preserved and may be used many times by the user to identify different portions of the original seed for generating user-generated seeds. Different user-generated seeds may include overlapping areas of an original seed. In some embodiments, the shape 460 may have to satisfy a size requirement (e.g., the surface of the shape 460 may have to be larger than a threshold) to ensure biometric information may be derived from the shape 460.

The UI 400 may provide an option 434 to confirm and an option 433 to redo. When the confirm option 434 is selected, the identified portion 460 of the fingerprint image may be sent from the electronic device 104 of the user to the biometric-integrated coin platform server 115 as a user generated seed. The biometric-integrated coin platform server 115 may mint a seed to the user's account (e.g., minting the seed and updating the account of the user as the owner of the seed). For example, the biometric-integrated coin platform server 115 may call the mint ABI 121 (FIG. 1) of the biometric-integrated coin platform 112 to submit a request to the smart contract mint function 154 to mint the seed to the user's account. The request may include a hash value of the image 460 that includes the user's biometric information. For example, as the image is a digital image, the hash value may be calculated by applying a hash algorithm to the digital image. It should be noted that when a seed is generated, an encrypted (e.g., a hash value of) version of the user-generated image of the fingerprint may be stored in the blockchain. Furthermore, the user-generated image of the fingerprint may be stored in a database by the biometric-integrated platform server 115. As long as the user has enrolled in, the user may see the user's original seeds. The user may use the original seeds to generate the user-generated seeds.

Figure 5:
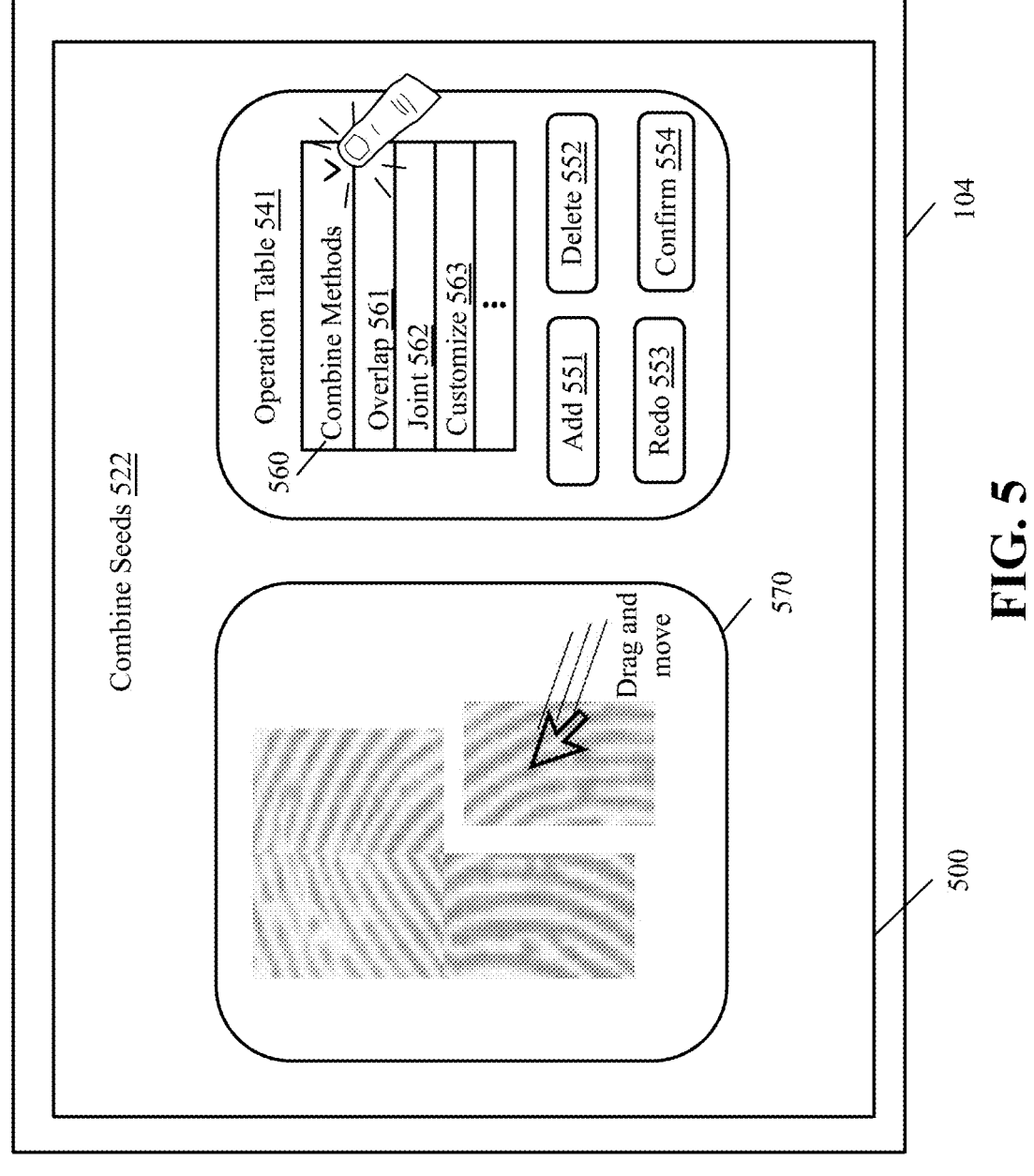
FIG. 5 illustrates a schematic front view of the display of an electronic device that includes a user interface displaying the combine component of the seed component of the biometric-integrated coin system, according to various aspects of the present disclosure.

FIG. 5 illustrates a schematic front view of the display of an electronic device 104 that includes a user interface 500 displaying the combine seeds page of the seed component of the biometric-integrated coin system, according to various aspects of the present disclosure. The electronic device may be any of the electronic devices 104 of FIG. 1 and the UI 500 may be an example of the UI 102 of FIG. 1. The combine seeds page 522, in some embodiments, may be displayed when the combine seeds option 322 of FIG. 3 is selected.

With reference to FIG. 5, the users may choose any number of their own generated seeds and may combine them to generate larger seeds. The users may choose different types of operations to generate seeds. The UI 500 may provide a display area 570 for combining (e.g., by a drag and drop operations) smaller seeds to generate larger seeds. For example, in response to the user selecting the add option 551, the UI 500 may display a dropdown menu (or a popup display area) to display the images corresponding to the user's seeds. It should be noted that when a seed is generated, an encrypted (e.g., a hash value of) version of the user-generated image of the fingerprint may be stored in the blockchain. Furthermore, the user-generated image of the fingerprint may be stored in a database by the biometric-integrated platform server 115. The user may then drag and move the seeds to the display area 570.

The operation table 541 may, for example, and without limitations, provide the options to choose the combine methods 560, add seeds 551, delete seeds 552, redo 553, and confirm 554. The combine methods 560 (shown as a drop-down menu in the example of FIG. 5), may, for example, and without limitations, provide the following options: overlap 561, joint 562, or other custom methods 563 of combining seeds.

The overlap method 561 may be used to overlap different seeds to generate the new larger seeds. The joint method 562, on the other hand, allows no overlapping. The customize method 563 allows the users to customize their combine methods, including but not limited to, resizing the seeds, rotating the seeds, cutting the seeds, etc. When the option 554 is selected, the combined seed may be sent from the electronic device 104 of the user to the biometric-integrated coin platform server 115. In some embodiments, the biometric-integrated coin platform server 115 compares the user-generated seeds with the seeds that are previously generated by the user to ensure the new user-generated seed is unique. Otherwise, the user may get an error massage indicating that the same seed has already been generated.

The biometric-integrated coin platform server 115 may mint a seed to the user's account (e.g., minting the seed and updating the account of the user as the owner of the seed). For example, the biometric-integrated coin platform server 115 may call the mint ABI 121 (FIG. 1) of the biometric-integrated coin platform 112 to submit a request to the smart contract mint function 154 to mint the seed to the user's account. The request may include a hash value of the combined image that includes the user's biometric information. For example, as the combined image is a digital image, the hash value may be calculated by applying a hash algorithm to the digital image. It should be noted that when a seed is generated, an encrypted (e.g., a hash value of) version of the user-generated image of the fingerprint may be stored in the blockchain. Furthermore, the user-generated image of the fingerprint may be stored in a database by the biometric-integrated platform server 115.

Figure 6:
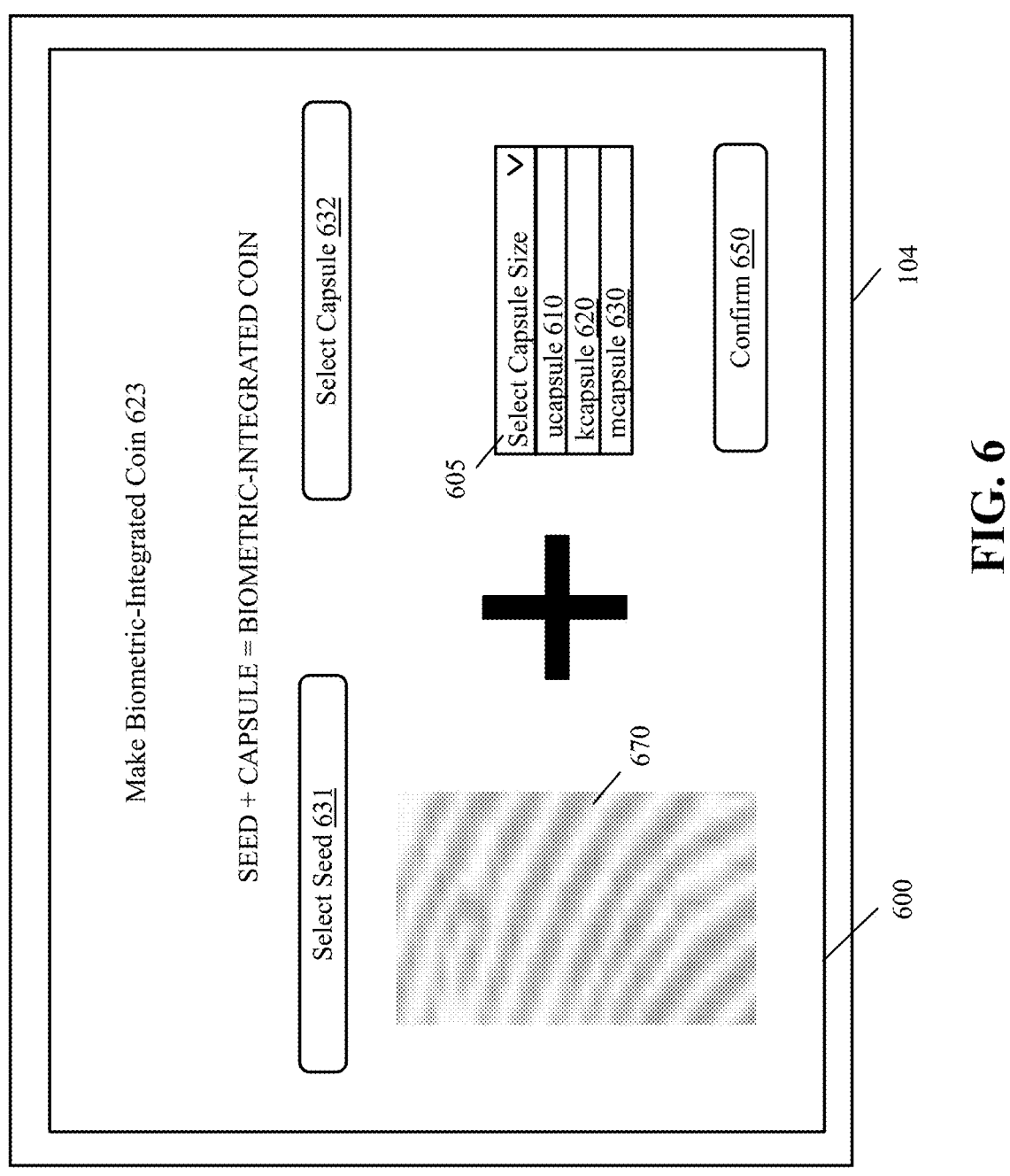
FIG. 6 illustrates a schematic front view of the display of an electronic device that includes a user interface displaying the make biometric-integrated coins page of the biometric integrated coin system, according to various aspects of the present disclosure.

FIG. 6 illustrates a schematic front view of the display of an electronic device 104 that includes a user interface 600 displaying the make biometric-integrated coins page of the biometric-integrated coin system, according to various aspects of the present disclosure. The electronic device may be any of the electronic devices 104 of FIG. 1 and the UI 600 may be an example of the UI 102 of FIG. 1. The make biometric integrated coins page 623, in some embodiments, may be displayed when the make biometric integrated coins option 323 of FIG. 3 is selected.

With reference to FIG. 6, the users may make their own biometric-integrated coins by providing seeds and capsules. The UI 600 may provide an option (e.g., a dropdown menu) 631 to select seeds. The UI 600 may display the selected seed 670. The UI 600 may provide an option (e.g., a dropdown menu) 632 to select capsules to make biometric-integrated coins. The UI 600 may provide an option 605 for selecting the size of the capsule for the biometric-integrated coins. The user may use the option 605 to choose, for example, and without limitations, ucapsules 610, kcapsules 620, or mcapsules 630, etc., to use.

When capsules with larger size, such as kcapsules or mcapsules, are selected, the users may need to provide seeds with larger size so that the biometric information may be more accurately verified. The biometric-integrated coins made with the larger capsule sizes have larger values than the biometric-integrated coins made with smaller capsule sizes. For example, the user may get kcoins by using kcapsules for making the coins, and the user may get mcoins by using mcapsules for making the coins. When the confirm option 650 is selected, the user-made biometric-integrated coin may be sent from the electronic device 104 of the user to the biometric-integrated coin platform server 115.

The biometric-integrated coin platform server 115 may burn the corresponding capsules and seeds. For example, the biometric-integrated coin platform server 115 may call the burn ABI 122 (FIG. 1) of the biometric-integrated coin platform 112 to submit one or more requests to the smart contract burn function 155 to burn the capsules and seeds. The biometric-integrated coin platform server 115 may mint the corresponding coins to the user's account (e.g., minting the coins and updating the account of the user as the owner of the minted coins). For example, the biometric-integrated coin platform server 115 may call the mint ABI 121 (FIG. 1) of the biometric-integrated coin platform 112 to submit a request to the smart contract mint function 154 to mint a coin to the user's account. The request may include the value associated with the cryptocurrency (e.g., the same value as the capsule that is selected to make the coin). It should be noted that when a coin is generated and the corresponding seed and capsule are burnt, the information about the capsule (e.g., the kind of capsule) and the information about the seed (e.g., an encrypted version, such as a hash value, of the user-generated image of the fingerprint) may be stored in the blockchain. Furthermore, the user-generated image of the fingerprint may be stored in a database by the biometric-integrated platform server 115.

The stored seed information may be used to confirm the user's ownership and the information regarding the capsule may be used to mint a new capsule for the owner when the owner decomposes the coin (e.g., as described below with reference to FIG. 7).

Figure 7:
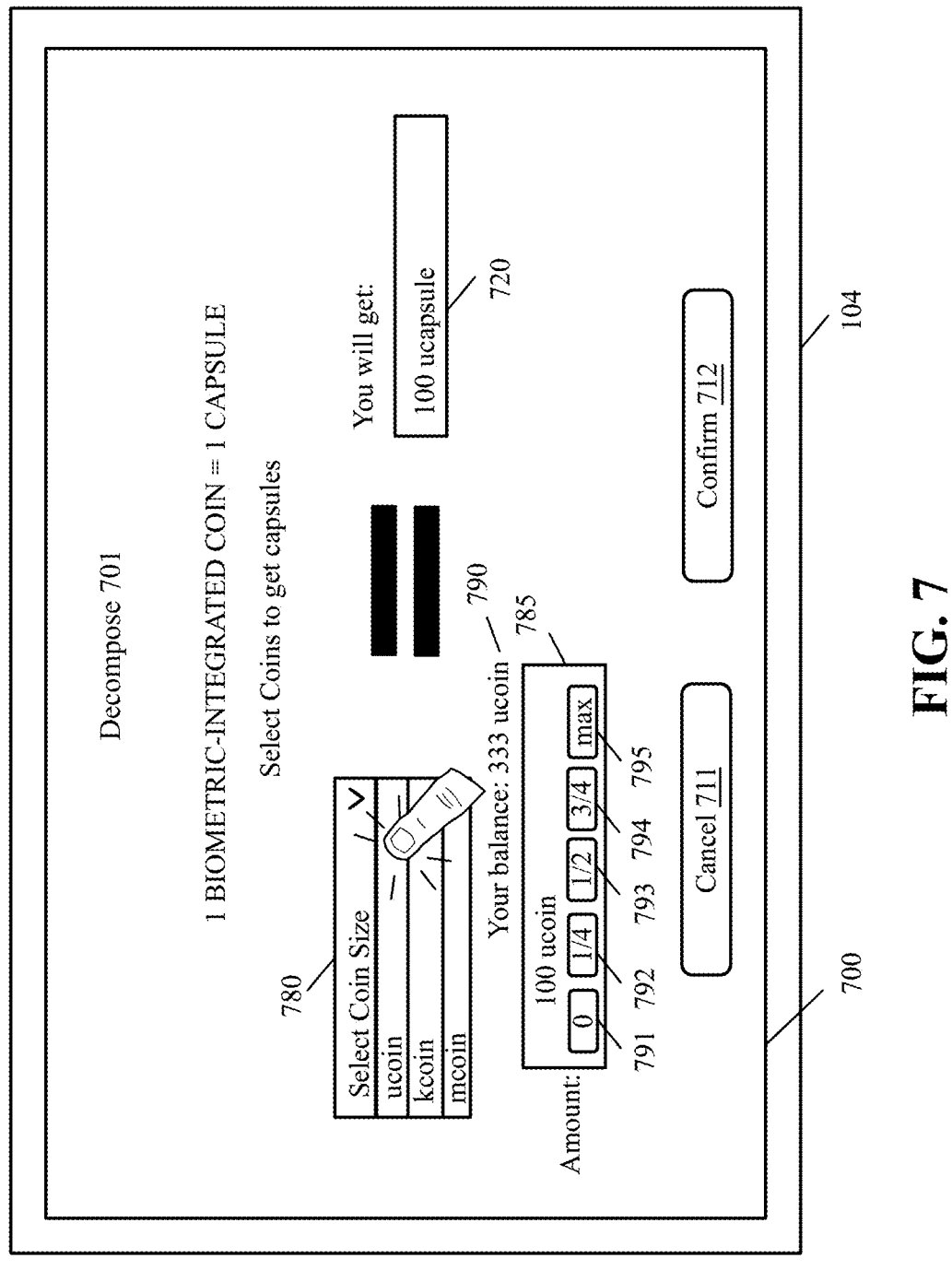
FIG. 7 illustrates a schematic front view of the display of an electronic device that includes a user interface displaying the decompose component of the biometric-integrated coin system, according to various aspects of the present disclosure.

FIG. 7 illustrates a schematic front view of the display of an electronic device 104 that includes a user interface 700 displaying the decompose component 701 of the biometric integrated coin system, according to various aspects of the present disclosure. The electronic device may be any of the electronic devices 104 of FIG. 1 and the UI 700 may be an example of the UI 102 of FIG. 1.

When a user gets biometric-integrated coins from others, the user cannot directly use those biometric-integrated coins because those biometric-integrated coins contain biometric information which are not the user's biometric information. The user has to first decompose these biometric-integrated coins and then use the capsules that result from the decomposition of the biometric-integrated coins to make new biometric-integrated coins of his or her own.

The decompose component may be used by a user to decompose biometric-integrated coins that the user has received from other users. The option 780 may be used to choose the kind of biometric-integrated coins to decompose. In the example of FIG. 7, the ucoin is selected as the kind of the biometric-integrated coins to decompose. In response, the total number of the user's ucoins 790 may be displayed in the UI 700.

The option 785 may be used to choose the number of the biometric-integrated coins that are selected by the option 780 to decompose. The user may select one of the multipliers 791-795 to determine the number of biometric-integrated coins for decomposition. In the example of FIG. 7 where the user has 333 ucoins, selecting the multiplier 793 selects half of the user's ucoins, or 166.5 ucoins for decomposition. As another example, selecting the multiplier 795 results in all 333 ucoins that the user owns to be selected for decomposition. The user may also type a number 790 to select the number of ucoins for decomposition.

In the example of FIG. 7, the user has typed 100 as the amount of the ucoins to decompose. The UI 700 may provide a display area 720 to display the number of capsules the user may get after decomposing. Selecting any number and any kind of coins (e.g., selecting 100 ucoins) by the option 785 may result in the user getting the same number and the same kind of capsules (e.g., 100 ucapsules) after the selected coins are decomposed. The confirm option 712 may be selected to confirm the decompose operation.

When the confirm option 712 is selected, the capsule made from decomposition of the coins may be sent from the electronic device 104 of the user to the biometric-integrated coin platform server 115. The biometric-integrated coin platform server 115 may burn the corresponding coins. For example, the biometric-integrated coin platform server 115 may call the burn ABI 122 (FIG. 1) of the biometric-integrated coin platform 112 to submit a request to the smart contract burn function 155 to burn the coins. The biometric-integrated coin platform server 115 may mint new capsules corresponding to the decomposed capsules. For example, the biometric-integrated coin platform server 115 may call the mint ABI 121 (FIG. 1) of the biometric-integrated coin platform 112 to submit a request to the smart contract mint function 154 to mint a capsule to the user's account. The request may include the corresponding value of the capsule. The cancel option 711 may be selected to cancel this operation and restart the decompose process.

Figure 8A:
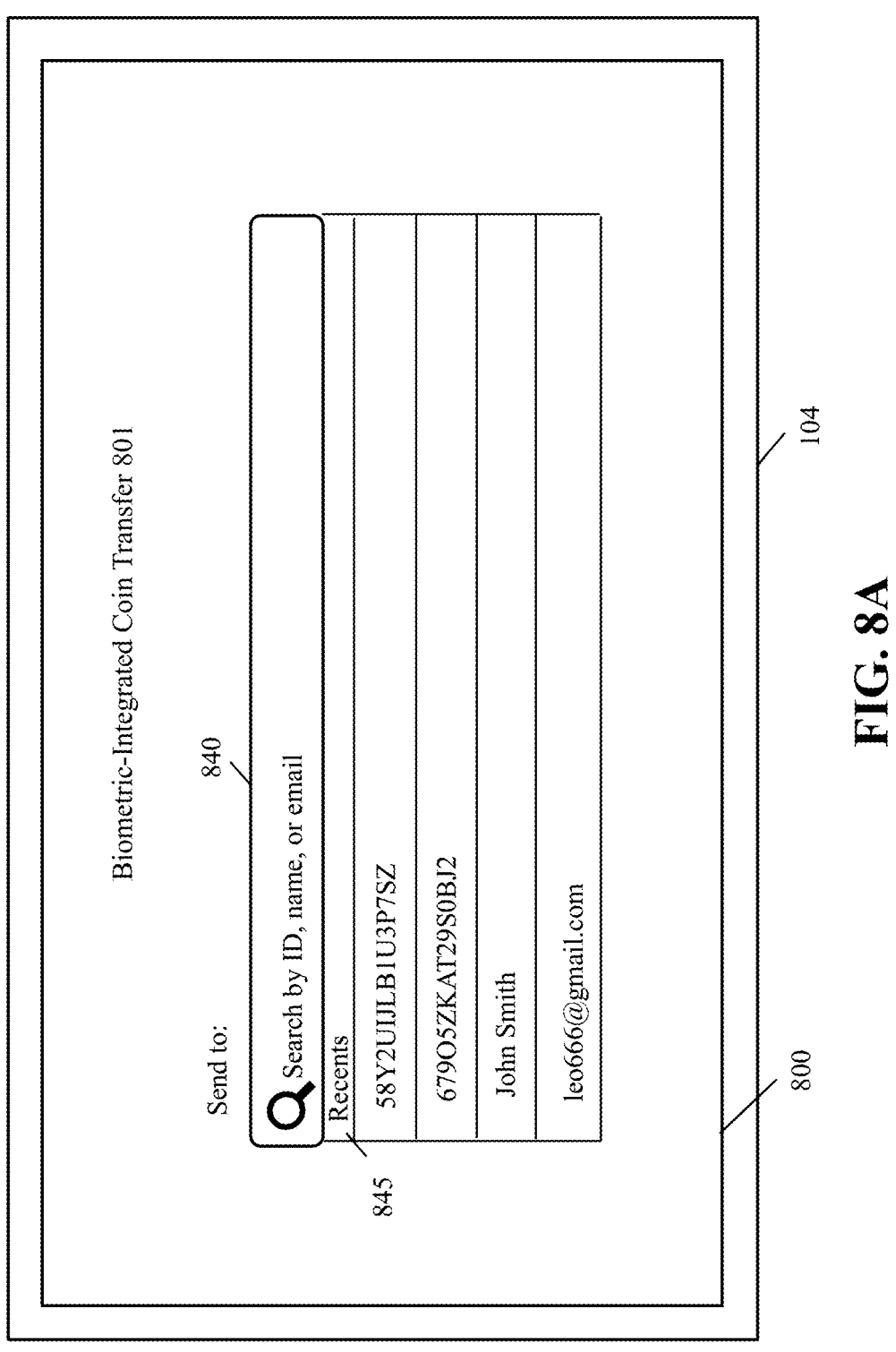
FIG. 8A illustrates a schematic front view of the display of an electronic device that includes a user interface displaying the transfer component in the biometric-integrated coin management component of the biometric-integrated coin system, according to various aspects of the present disclosure.

FIG. 8A illustrates a schematic front view of the display of an electronic device 104 that includes a user interface 800 displaying the transfer component 801 in the biometric-integrated coin management component of the biometric-integrated coin system, according to various aspects of the present disclosure. The electronic device may be any of the electronic devices 104 of FIG. 1 and the UI 800 may be an example of the UI 102 of FIG. 1.

With reference to FIG. 8A, the biometric-integrated coin transfer page 801 may provide the option for the user to transfer biometric-integrated coins to other users. The UI 800 may provide a search area 840 for searching for the target user (the receiver). The target user may be searched by the ID, name, or email. The UI 800 may display the user's recent searches 845, for example, below the search area 840. It should be noted that the users may search for another user's email or name only when the other user has used their emails and names to enroll in the system.

Figure 8B:
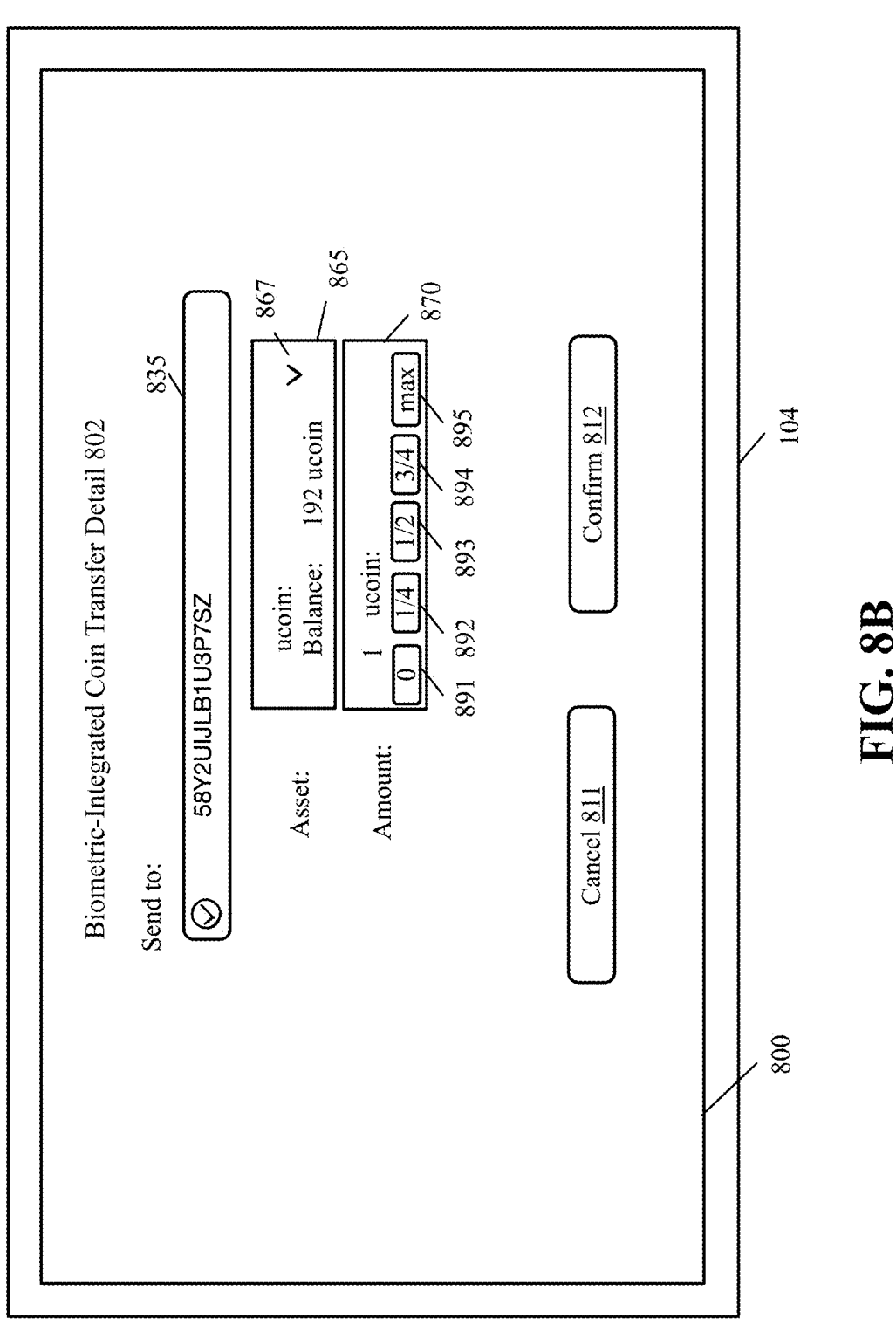
FIG. 8B illustrates the user interface of FIG. 8A after the identification of the target user and the details of the transfer are provided, according to various aspects of the present disclosure.

FIG. 8B illustrates the user interface 800 of FIG. 8A after the identification of the target user and the details of the transfer are provided, according to various aspects of the present disclosure. With reference to FIG. 8B, after the user confirms the identification of the target user to whom the user wants to transfer biometric-integrated coins, the transfer detail The kind of biometric integrated coins to transfer may be chosen using the display area 865 (e.g., by using the drop-down option 867). In the example of FIG. 8A, the user has selected ucoin as the kind of biometric-integrated coin to transfer. In response, the number of ucoins owned by the user may be displayed in the display area 865.

The options provided in the display area 870 may be used to choose the number of the biometric-integrated coins to transfer. The user may select one of the multipliers 891-895 to determine the number of biometric-integrated coins for decomposition. In the example of FIG. 8B where the user has 192 ucoins, selecting the multiplier 892 selects ¼ of the user's ucoins, or 48 ucoins for transfer. The user may also type a number 890 to select the number of ucoins for transfer. In the example of FIG. 8A, the user has typed 1 in the display area 870 as the number of the ucoins to transfer. After the user chooses the coin and types in the amount, the option 812 may be selected to confirm the transfer. When the confirm option 812 is selected, the information regarding the transfer may be sent from the electronic device 104 of the user to the biometric-integrated coin platform server 115. The biometric-integrated coin platform server 115 may transfer the coins to the target user. For example, the biometric-integrated coin platform server 115 may call the transfer ABI 123 (FIG. 1) of the biometric-integrated coin platform 112 to submit a request to the smart contract transfer function 156 to transfer the coins to the target user. The option 811 may be selected to cancel the transfer.

Figure 9:
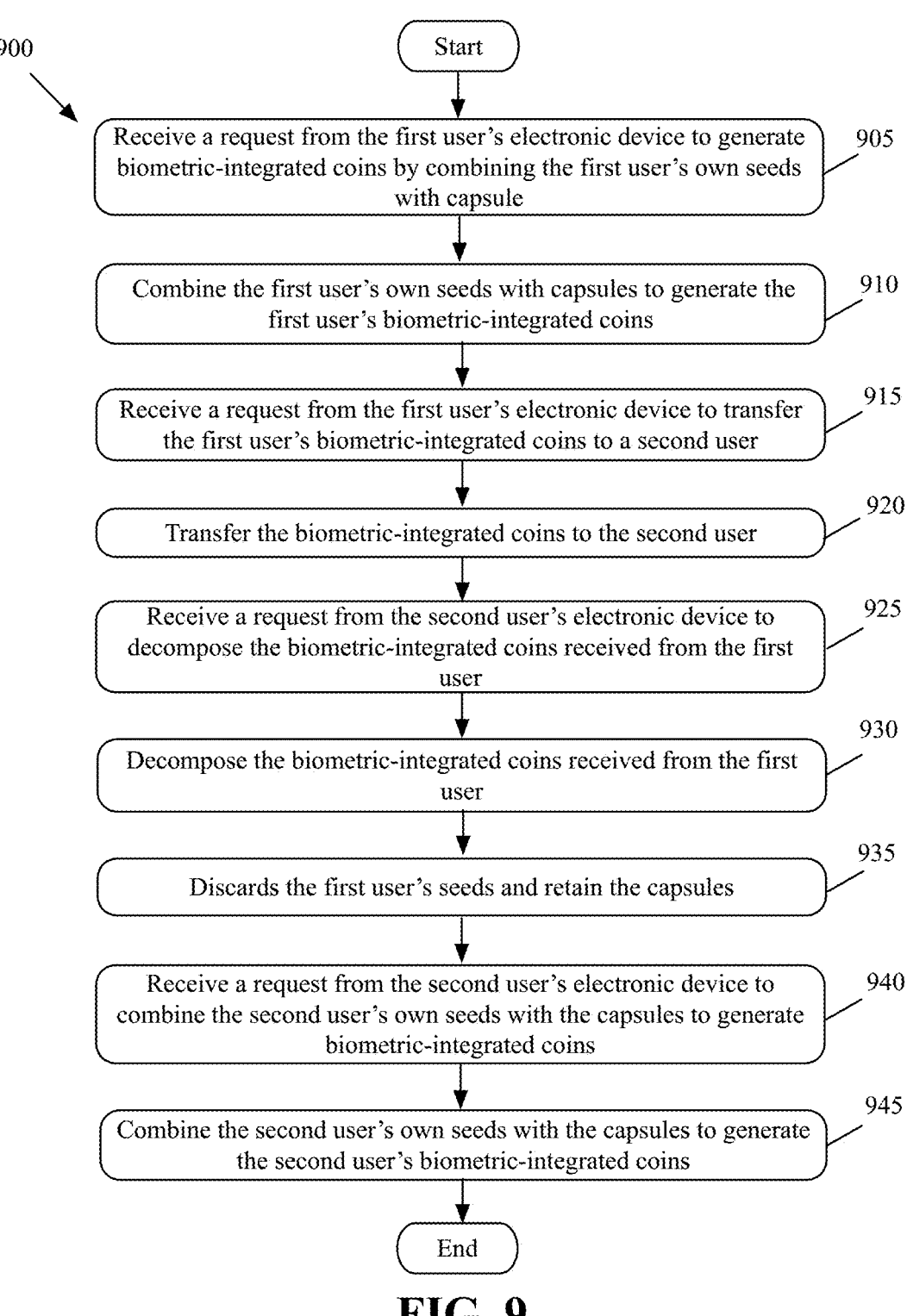
FIG. 9 is a flowchart illustrating an example process for getting biometric integrated coins by a first user and transferring the ownership to a second user, according to various aspects of the present disclosure.

FIG. 9 is a flowchart illustrating an example process 900 for getting biometric integrated coins by a first user and transferring the ownership to a second user, according to various aspects of the present disclosure. In some embodiments, the process 900 may be performed by a processor of an electronic device, such as the biometric-integrated coin platform server 115 of FIG. 1. With reference to FIG. 9, a request may be received (at block 905) from the first user's electronic device to generate biometric-integrated coins by combining the first user's own seeds with capsule. For example, as described above with reference to FIG. 6, a user may combine the user's own seeds and capsules to generate biometric-integrated coins.

The first user's biometric-integrated coins may be generated (at block 910) by combining the first user's own seeds with capsules. The biometric-integrated coin platform server 115 may use the information regarding the seeds and the capsules that the first user has selected and may generate the first user's biometric-integrated coins. The first user's own seeds may be combined with capsules such that the biometric-integrated coins contain the biometric information of the first user.

A request may be received (at block 915) from the first user's electronic device to transfer the first user's biometric-integrated coins to a second user. For example, as described above with reference to FIGS. 8A-8B, the biometric-integrated coin platform server 115 may receive the request to transfer from the electronic device 104 when the confirm option 812 is selected.

The biometric-integrated coins may be transferred (at block 920) to the second user. For example, the biometric-integrated coins may be transferred from the first user's account to the second user's account. However, the second user still cannot use the biometric-integrated coins received from the first user because the biometric information on those coins does not belong to the second user but belongs to the first user.

A request may be received (at block 925) from the electronic device of the second user to decompose the biometric-integrated coins received from the first user. For example, the request may be received by the biometric-integrated coin platform server 115 when the confirm option 712 is selected in the UI of FIG. 7, resulting in the decomposition information (e.g., the identification of the decomposed coins and the identification of the resulting capsules) to be sent from the electronic device of the second user to the biometric-integrated coin platform server 115. The biometric-integrated coins received from the first user may be decomposed (at block 930).

At block 935, the seeds (the first user's biometric information) may be discarded, and the capsules of the decomposed biometric-integrated coins may be retained. A request may be received (at block 940) from the second user's electronic device to combine the second user's own seeds with the capsules to generate biometric-integrated coins. For example, the request may be received by the biometric-integrated coin platform server 115 when the confirm option 650 is selected in the UI 700 of FIG. 7. The request may include the identification of the second user's seeds and capsules that the second user has selected to combine to generate the biometric-integrated coins. The second user's own seeds may be combined (at block 945) with the retained capsules to generate the second user's own biometric-integrated coins. The process 900 may then end. The second user may use the second user's own biometric-integrated coins to do different operations such as, for example, transferring the biometric-integrated coins to other users, burning (destroying) the second user's own biometric-integrated coins, lend out the second user's biometric-integrated coins to get money, etc.

Figure 10:
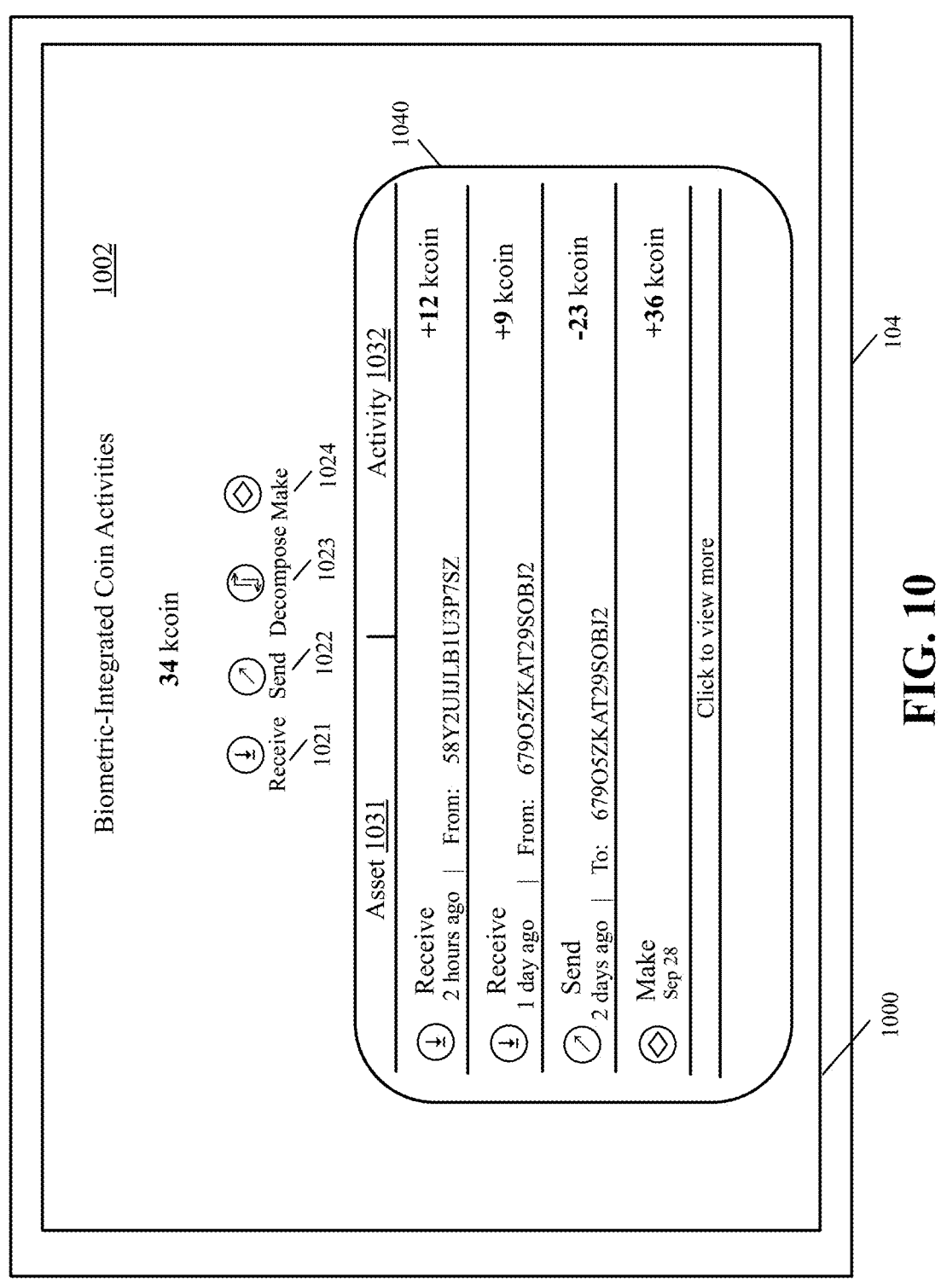
FIG. 10 illustrates a schematic front view of the display of an electronic device that includes a user interface displaying the activity page in the biometric-integrated coin management component of the biometric-integrated coin system, according to various aspects of the present disclosure.

FIG. 10 illustrates a schematic front view of the display of an electronic device 104 that includes a user interface 1000 displaying the activity page 1002 in the biometric-integrated coin management component of the biometric-integrated coin system, according to various aspects of the present disclosure. The electronic device may be any of the electronic devices 104 of FIG. 1 and the UI 1000 may be an example of the UI 102 of FIG. 1.

With reference to FIG. 10, the activity page 1002 may show the history of the activities of the user's biometric-integrated coins. There may be at least four activities: receive 1021, send 1022, decompose 1023, and make 1024. The receive activity 1021 may be used to receive biometric integrated coins sent from other users. The send activity 1022 may be used to send biometric-integrated coins to other users. The decompose activity 1003 may be used to decompose biometric-integrated coins to get capsules. The make activity 1024 may be used to make biometric-integrated coins by combining capsules and seeds.

The users may choose the four activities 1021-1024 to operate their own biometric integrated coins. The UI 1000 may include a display area 1040 for displaying the detailed history of the four activities 1021-1024. For each activity, brief descriptions may be displayed. For example, the identification of the person who the user transferred to and the number of coins the user transferred. The users may also click on an activity to see the detailed information of that activity.

Figure 11:
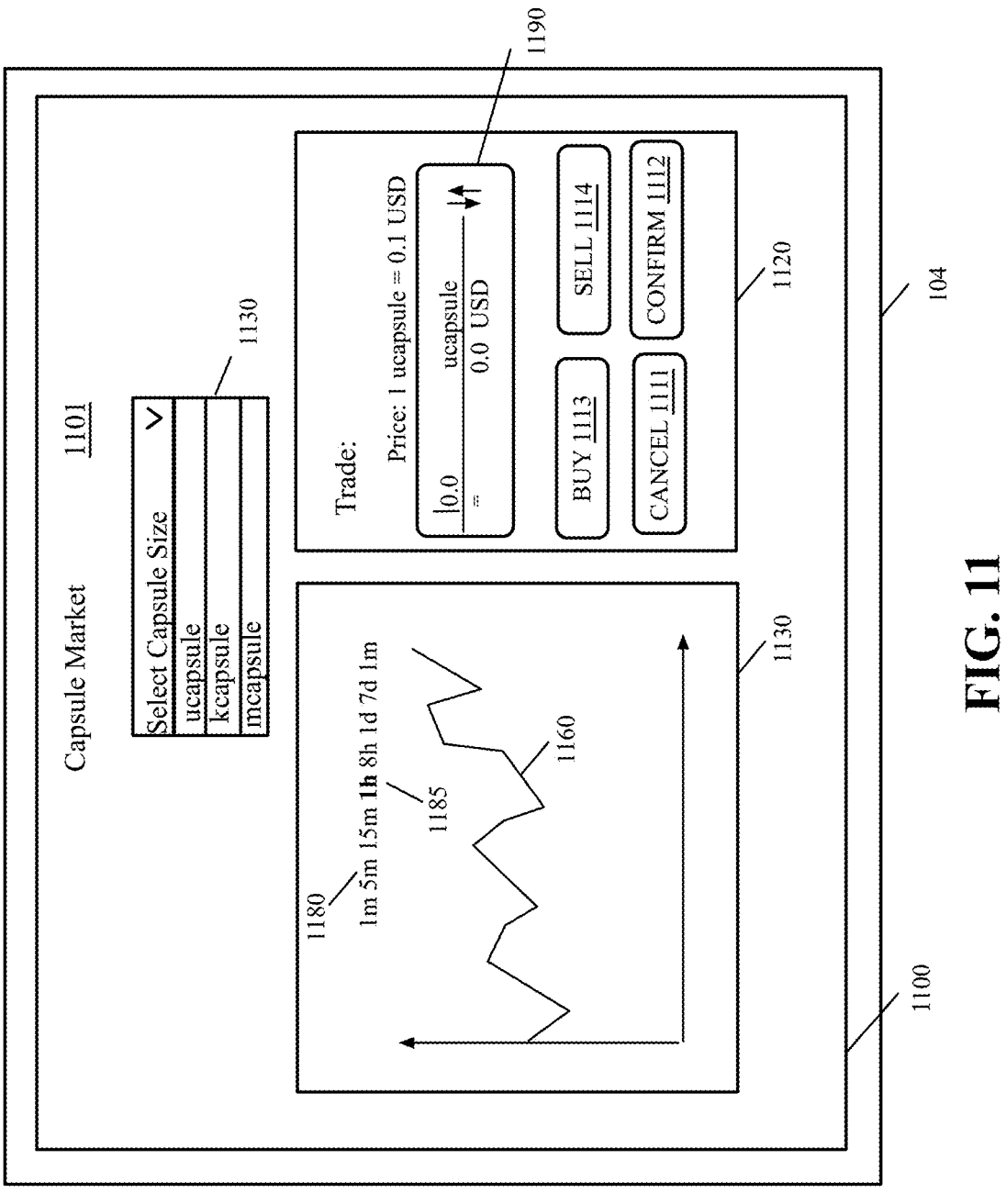
FIG. 11 illustrates a schematic front view of the display of an electronic device that includes a user interface displaying the market component in the biometric-integrated coin management component of the biometric-integrated coin system, according to various aspects of the present disclosure.

FIG. 11 illustrates a schematic front view of the display of an electronic device 104 that includes a user interface 1100 displaying the market component in the biometric-integrated coin management component of the biometric-integrated coin system, according to various aspects of the present disclosure. The electronic device may be any of the electronic devices 104 of FIG. 1 and the UI 1100 may be an example of the UI 102 of FIG. 1.

With reference to FIG. 11, the market page 1101 in the market component may display the price tendency. The market page 1101 may provide a display area 1120 for the users to buy capsules using fiat money or sell capsules to get fiat money. It should be noted that the users who own biometric-integrated coins and want to sell or trade them have to first decompose the biometric-integrated coins and mint the same number and the same kind of capsules as the coins (e.g., as described above with reference to FIG. 7). The user may then sell or trade the capsules (e.g., as described with reference to FIG. 11). The users who want to have biometric-integrated coins, have to buy capsules (e.g., as described with reference to FIG. 11) and then use their own biometric information to generate seeds (e.g., as described with reference to FIG. 5). The user-generated seeds and the purchased capsules may be combined (e.g., as described with reference to FIG. 6) to make biometric-integrated coins.

The market page 1101 may provide a display area 1130 to display the price chart 1160 of the capsules to provide an overview for the user of what the price of the capsules is. The UI 1100 may provide a tool 1180 to choose the time range, for example, 1 minute, 5 minutes, 15 minutes, 1 hour, 4 hours, 8 hours, 1 day, 7 days, 1 month, etc. In the example of FIG. 11, the 1-hour range 1185 is selected. The UI 1100 may provide a display area 1190 to display the operations for exchanging the capsules. The option 1130 may be a drop-down to choose the kind of capsule to buy or sell. In the example of FIG. 11, the ucapsule is selected as the kind of the capsule to buy or sell.

After the kind of capsule to exchange is selected, the price may be displayed in the display area 1190. The user may type in the number of biometric-integrated coins that the user may want to buy or sell. The user may select option 1113 to buy capsules and option 114 to sell capsule. The user may select the confirm option 1112 to confirm the exchange. The user may select the cancel option 1111 to cancel that exchange.

I. A Lightweight Bio-Traceable Blockchain Verification System

Combined zero-knowledge proof with biometric identification technology precisely tracks users' identities as well as maximizes their privacy and security protection. The blockchain technology creates mutual trust and ensures the authenticity of transactions by consensus. Bio-stamped transactions greatly strengthen the security which could reveal the hackers in the real world.

Other than transactions, such consensus generated by biometric verified people may also be used as vote, jury service etc. For example, results of voting may be recorded on the blockchain. Since everyone may only have one account on the biometric-integrated platform of the present embodiments, recording the results of voting on the blockchain of the present embodiment guarantees that nobody can cast multiple votes. Also, the decentralized characteristic of the blockchain ensures the result is immutable and ensure consensus by all participants. No centralized organization may manipulate the voting result.

Some of the present embodiments provide a lightweight, decentralized, bio-traceable and privacy protecting blockchain transactions verification system. The system utilizes personal biometric information with blockchain and privacy-preserving technology to enhance the security, traceability, and transparency of transactions.

Some of the present embodiments provide an algorithm to generate a personal digital wallet's private key, public key, and identifier. The users may easily restore access to their digital wallet through biometric authentication. This approach addresses the issue of permanent asset loss in a digital wallet if the private key is lost.

Some of the present embodiments solve the existing problems of zero-knowledge verification for personal biometric sensitive information on the blockchain. By constructing a black-box validator built on the blockchain, these embodiments achieve verification of each biometric signature transaction without disclosing any related biometric information. Since the verification process is on the blockchain, the immutability of blockchain may ensure the authenticity of verification.

Some of the present embodiments provide a new solution for storing users' sensitive data, performing data masking, and utilizing decentralized protocols for data integrity verification. The desensitized data generates commitments which are totally maintained on blockchain and integrated with on-chain verifiers. There is no centralized datacenter to store users' sensitive biometric data.

In addition, the verification system of the present embodiments is lightweight utilizing the Merkle Patricia Trie structure. A trie, or a prefix tree, is a k-ary search tree used to locate specific keys from a set. The nodes in the trie do not store their associated key. Instead, a node's position in the trie defines the key with which it is associated.

A Merkle Patricia Trie, also known as a hash tree, is a tree in which each leaf node is labeled with the cryptographic hash of a data block, and each non-leaf node is labeled with the cryptographic hash of its child nodes' labels. Only the identity root is kept on the blockchain header as the identity verifier data trace. This data structure not only minimizes the blockchain header size but also verifies input efficiently.

A Merkle Patricia Trie allows verifying the inclusion of a key-value pair without accessing the entire key-value pairs. In other words, Merkle Patricia Trie may provide the proof that a certain key-value pair is included in a key-value mapping that produces a certain Merkle root hash. Compared with traditional blockchain, the blockchain integrated biometric information of the present embodiments achieves personhood verification without significantly impacting the throughput.

Some of the present embodiments provide an algorithm for fuzzy matching of biometric information that aims to achieve both high accuracy and ease of matching. Fuzzy Matching is a technique that helps identify two elements of text, strings, or entries that are approximately similar but are not exactly the same. Only the most prominent feature points from each image that includes a user's biometric information are selected, enabling the user to personally match them with the previous record. The fuzzy code algorithm may generate fuzzy code with only few prominent feature points which make it easy to match by users themselves. Moreover, the distinctive combination of multiple biometric information (e.g., multiple fingerprints) guarantees the precision of matching for each user.

Although several examples are described with reference to FIGS. 12-18 that use images of a person's fingerprint as the images with the user's biometric information, it should be understood that the operations of FIGS. 12-18 may be performed on images that include other types of the user's biometric information, such as the images of face, iris, retina, palm, palm vein, etc., of the user in the operations of FIGS. 12-18. As described above with reference to FIGS. 1 and 2, the electronic device of a user may include a biometric receiver that may take the images that include different biometric information of the user.

Figure 12:
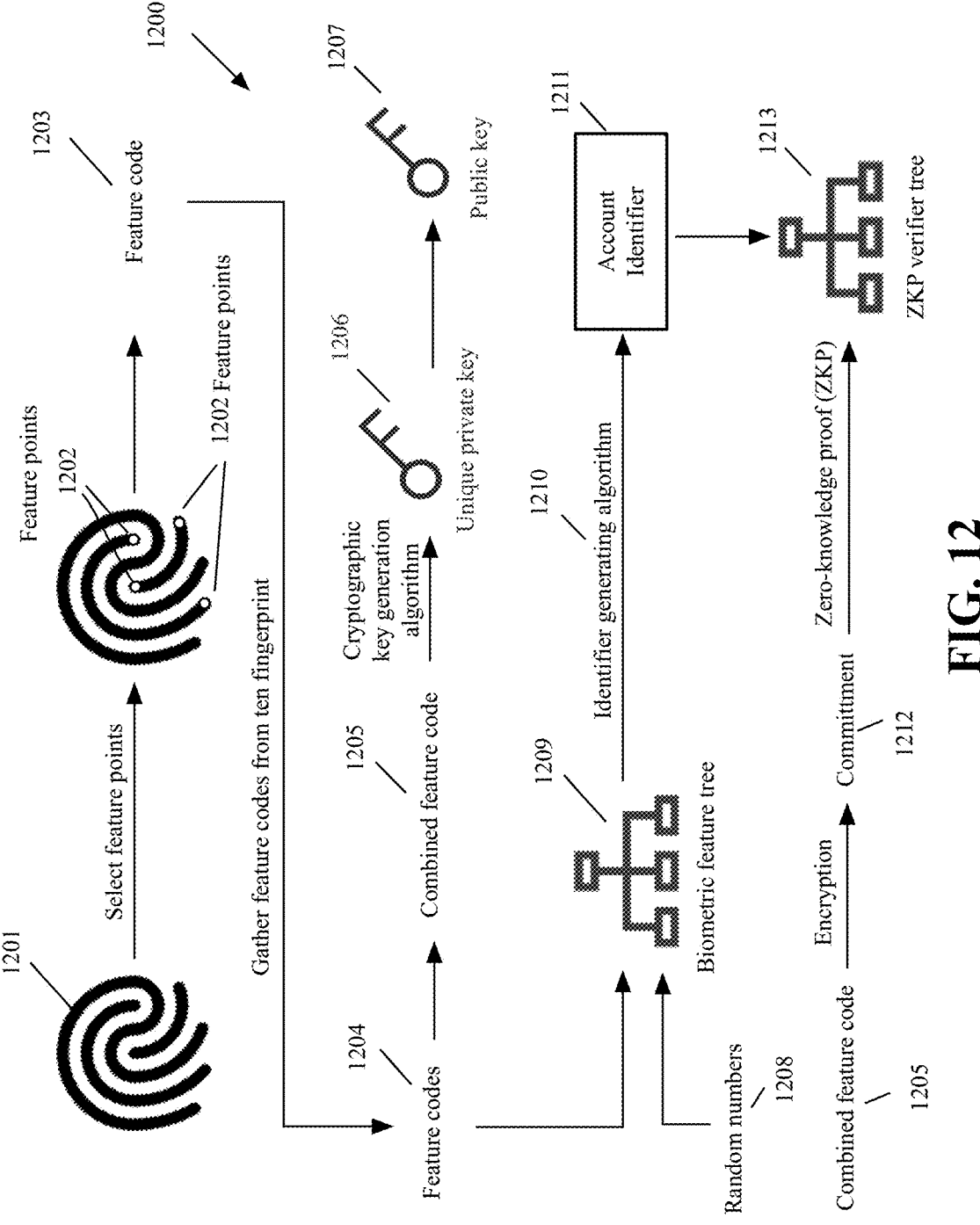
FIG. 12 illustrates the process of utilizing the fuzzy matching algorithm to generate the unique private, the public key, and the account identifier, according to various aspects of the present disclosure.

FIG. 12 illustrates the process 1200 of utilizing the fuzzy matching algorithm to generate the unique private key 1206, the public key 1207, and the account identifier 1211, according to various aspects of the present disclosure. The process 1200, in some embodiments, may be performed by a processor of an electronic device, such as an electronic device of a user.

The process 1200 may receive several fingerprints 1201 (e.g., fingerprints from 2 to 10 fingers) from the user (only one fingerprint is shown in FIG. 12 for clarity). The user's electronic device may acquire high-quality fingerprint images by using a camera or a fingerprint pressure sensor and may send the images to a blockchain server. The process 1200 may extract feature points 1202 from the fingerprints. Extracting the feature points 1202 from the fingerprints 1201 may include performing image processing and pattern recognition.

Next, the specific feature points 1202 may be identified. For the embodiments that use fingerprints as the biometric information, the feature points 1202 may primarily include minutiae, such as ridge endings, bifurcations, etc. For the embodiments that use images with other biometric information (e.g., face iris, retina, palm, etc.) other minutiae in the images may be used to identify the feature points. The features points may then be analyzed for their position, shape, and orientation. The process 1200 may employ specialized image processing software or libraries like OpenCV and may perform image processing and pattern recognition to effectively extract and analyze the minutiae details from the fingerprints 1201. The minutiae details, such as shapes and patterns, of each fingerprint may then be digitized into a feature code 1203, which may be a long number (e.g., a 256 digits number, a 512 digits number, etc.). The process 1200 may generate one feature code for each fingerprint. The process may generate one feature code for each fingerprint. For example, if the fingerprints from ten fingers are used, ten feature codes 1204 may be generated.

Next, the multiple feature codes may be combined into a combined feature code 1205. For example, if 10 feature codes are generated from 10 fingers and each feature code has 256 digits, the 10 feature codes may be concatenated to generate a combined feature code 1205 with 2560 digits. The existing methods of extracting feature points that use only one fingerprint to verify the identification of a user, have to extract many feature points from the single fingerprint to accurately identify a person from their fingerprint. In contrast to the existing methods of extracting feature points, the fuzzy matching extracts less feature points from one single fingerprint and instead uses feature points from several fingerprints (e.g., from up to 10 fingerprints) to identify the person. Research has shown that the main reason for fingerprint matching failures is not that someone else may match a user's fingerprint, but rather that users themselves are unable to match their own fingerprints due to many feature points to be matched. Fuzzy matching only uses the most prominent feature points from each fingerprint, and thereby greatly reduces the false negative rate (i.e., when the user cannot match their own fingerprint).

Using only the most prominent feature points and their positions for matching dramatically increases the matching rate of users themselves but may also decrease the matching accuracy. To address the accuracy issue, the present embodiments use more fingerprints for matching. The fundamental idea is that while other user may happen to match one of a person's individual fingerprints, it is highly unlikely that they may match all 10 of the person's fingerprints. The combination of these 10 fingerprints possesses high uniqueness that may be used for precise identification matching, which is a technical advantage of gathering multiple fingerprints (e.g., up to 10) fingerprint feature codes 1204 by the present embodiments.

The combination of several (e.g., 10) fingerprint feature codes 1204 is unique for each individual. Therefore, the combination will be used as the seed to generate a unique private key 1206 and public key 1207 by applying a cryptographic key generation algorithm such as, for example, and without limitations, Elliptic Curve Cryptography (ECC). Generating a public-private key pair from a seed involves cryptographic principles, particularly in systems like ECC. The seed, which is the feature codes combination, serves as the basis for key generation, ensuring unpredictability. The private key is derived from the seed using a cryptographic algorithm. In the ECC, this may be a large randomly chosen number that May be directly taken from the seed or produced via a pseudo-random number generator. The public key is then computed from the private key through specific mathematical operations. In ECC, this involves multiplying the private key with a fixed point on the elliptic curve, yielding another curve point as the public key. The direct mathematical relationship between the keys makes it computationally infeasible to deduce the private key from the public key, ensuring security. The seed's randomness and unpredictability are crucial for the security of the generated keys.

The feature codes may also be used to generate a unique account identifier 1211. For each feature code, the process 1200 may generate a random number (e.g., a 5-digit random number, a 10-digit random number, etc.) 1208. Each feature code and the corresponding random number may be inserted as a key-value pair in a biometric feature tree 1209. The unique account identifier 1211 may then be generated by the identifier generating algorithm 1210 as a combination of the random numbers 1208 associated with the feature codes 1204. Generation of the account identifier 1211 using the identifier generation algorithm 1210 is described below with reference to FIG. 13.

The combination feature code 1205 may be encrypted to generate the commitment tree 1212. Some embodiments may use a ZKP commitment algorithm, such as, for example, and without limitations, the Pedersen Commitment Scheme to generate the commitment. For example, the commitment may be a 256 digit or larger number. The account identifier 1211 may be used to insert the commitment 1212 into the ZKP verifier tree 1213 to be used for account recovery. Using the ZKP verifier tree 1213 for account recovery is described below with reference to FIG. 14. The commitment is stored in the blockchain as a proof that the user knows the user's password. The user cannot store the original password on the blockchain as the stored password is visible to everybody and everybody may find out the user's password. The use of the commitment is to prove the user knows the password as only the user associated with the original password is able to provide the biometric information that may pass the commitment's verification. Therefore, storing the commitment on the blockchain is like setting the lock/password on the blockchain. Everybody may see the user's commitment, but they cannot derive the user's original password from the commitment. The proof is like the key, only the correct proof may pass the commitment's verification.

Figure 13:
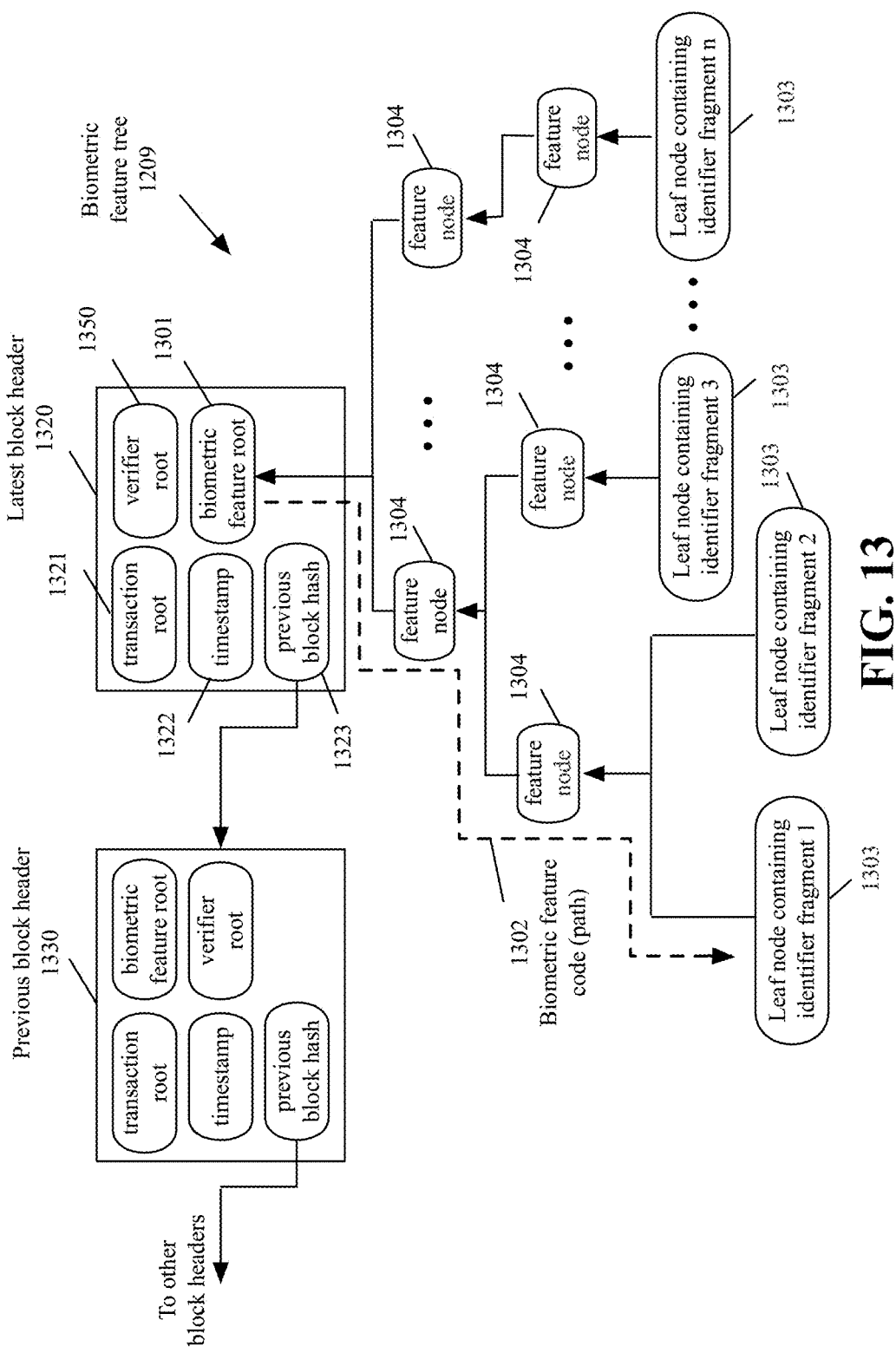
FIG. 13 illustrates the structure of the biometric feature tree, which is used for storing biometric information and identification, according to various aspects of the present embodiments.

FIG. 13 illustrates the structure of the biometric feature tree, which is used for storing biometric information and identification, according to various aspects of the present embodiments. As shown in FIG. 13, the latest header block 1320 may include the biometric feature root 1301, the verifier root 1350, the transaction root 1321, the timestamp 1322, and the previous block hash 1323. The transaction root 1321, the timestamp 1322, and the previous block hash 1323 are common concepts in many blockchain systems. The transaction root 1321 contains the root hash of the Merkle Patricia Trie of transactions of the block. The root hash is the proof that the block contains all the transactions in the proper order. The timestamp 1322 is the time the header block 1320 was generated. The previous block hash 1323 is a pointer to the previous block's header 1330.

Figure 14:
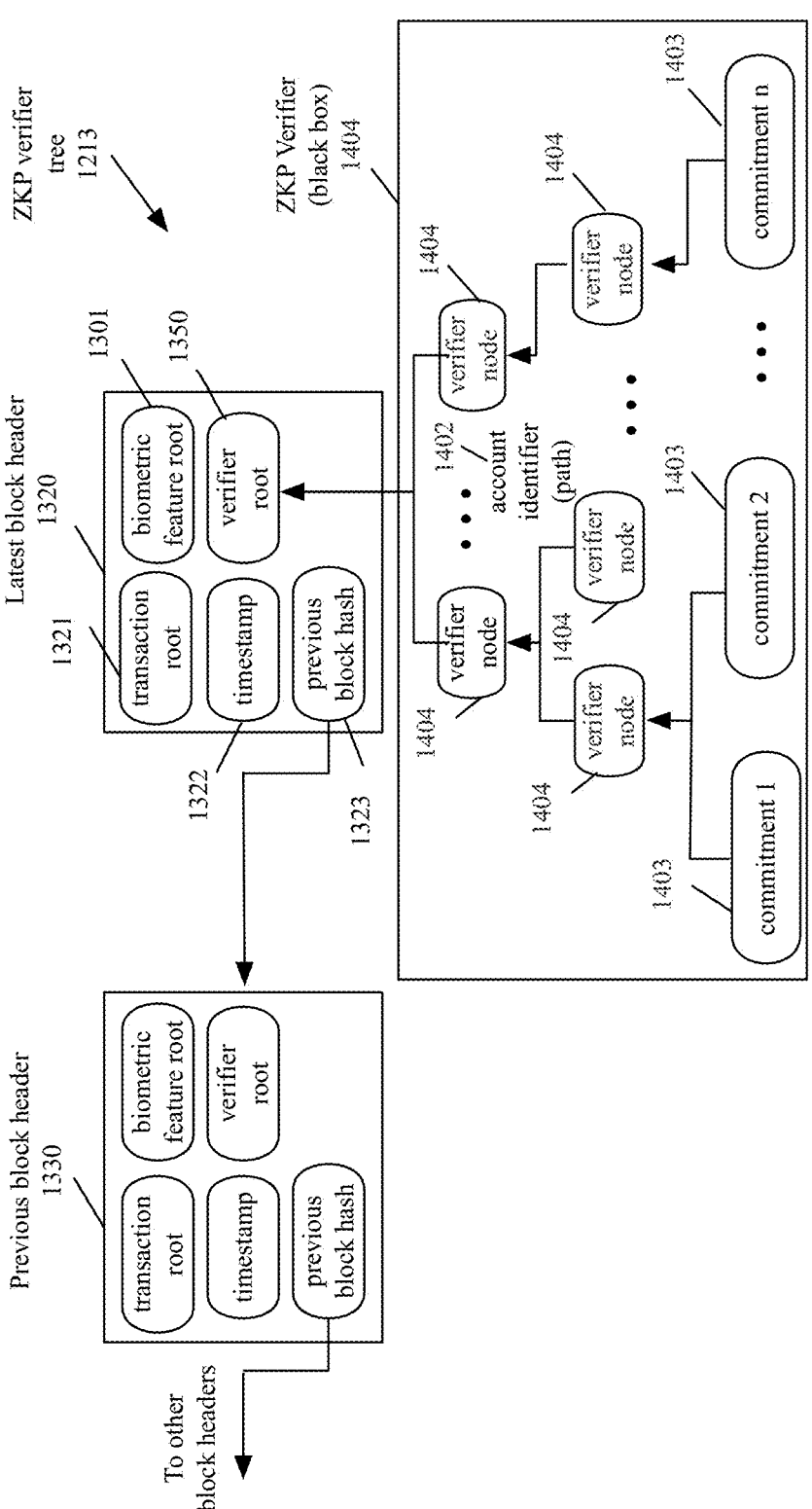
FIG. 14 illustrates the structure of the zero-knowledge proof verifier, according to various aspects of the present disclosure.

The verifier root 1350 of the present embodiments is described below with reference to FIG. 14. To store everyone's desensitization fingerprint data on the blockchain, the present embodiments apply a data structure referred to herein as the biometric feature tree 1209 on the blockchain. The biometric feature tree 1209 utilizes the Merkle Patricia Trie data structure mentioned above. The biometric feature code 1302 is one of the user's fingerprint feature codes 1203 that servers as the key in the storage structure. The biometric feature code 1302 servers as a path from the biometric feature root 1301 to the leaf node 1303 that stores the final part of the key (e.g., the final part of the feature code which is not stored in any feature nodes 1204) and a value. The value is referred to herein as the identifier fragment and is one of the random numbers 1208 generated by the process 1200 of FIG. 12.

Similar to the inner nodes of any Merkle Patricia Trie, the feature nodes 1304 in the middle of the biometric feature tree 1209 are used to improve data compression based on the Merkle Patricia Trie definition. The feature nodes 1304 may be either a branch node or an extension node. A branch node may have links to a maximum of 16 distinct child nodes, corresponding to 16 hex characters. A branch node has also a value field that may store a fragment of the key (e.g., a fragment of a feature code). An extension node is a shortcut node that stores a part of the key based on a common prefix, and a link to the next node.

Applying the identifier generation algorithm 1210 (FIG. 12) to the biometric generating tree 1209 to generate the account identifier for a new user is as follows. If a biometric feature code existed in the biometric feature tree 1209 (e.g., if one of another user's feature codes matches the feature code of the new user), then there is nothing required to do. For example, there is no need to insert the biometric feature code in the biometric feature tree 1209 again. Otherwise, the biometric feature code is inserted in the biometric feature tree 1209. The insertion process is the same as inserting a key-value pair in any Merkle Patricia Trie. The new biometric feature code is the key and the corresponding random number 1208 (FIG. 12) is the value, which is stored in the leaf node 1303 as an identifier fragment along with the final portion of the feature code.

Utilizing the Merkle Patricia Trie data structure expedites the searching process especially for large scale key-value pair storage. For users, the verification process involves utilizing the biometric feature root 1301 to validate the integrity of the entire biometric tree's hash as any unauthorized change to the biometric tree also changes the root's hash value. When a user intends to create a new account using their fingerprints, the system of the present embodiments automatically computes the biometric feature code path 1302. Subsequently, the system may navigate the biometric feature tree to locate the corresponding identifier fragment 1303.

In the biometric feature tree 1209, each valid fingerprint feature code is used as a particular biometric path 1302 which points to an account identifier fragment 1303. Only the correct ten fingerprints combination may generate a valid identifier. Based on the uniqueness of ten fingerprints' feature code combination, each identifier represents the particular user accurately. Therefore, the fuzzy matching algorithm provides the technical advantage of high accuracy and ease of matching.

The fuzzy matching also provides the technical advantage of preserving the user's privacy. Only some of the feature points 1202 of the biometric data 1201 of FIG. 12 are selected to generate feature code 1203 which contains just part of the fingerprint information. It is impossible to extract complete fingerprint information from the partial fingerprint information carried by a fingerprint feature code 1203. This protects the privacy of the users in protecting their fingerprint information.

Unlike Bitcoin and Ethereum, which only include the transaction tree, timestamps, and previous block hashes in a block, the system of the present embodiments takes a significant step further by incorporating biometric feature tree and biometric verifier on the blockchain. This approach provides the technical advantage of the inclusion of traceable biometric information alongside each transaction, enhancing the security and transparency of the blockchain system of the present embodiments, and facilitating account recovery even if a user loses the account password.

Within the biometric feature tree of FIG. 13, each individual has multiple identifier fragments. For example, when the biometric information is fingerprint, each individual may have from 2 to 10 identifier fragments. During the sign-up process, if all fingerprint feature codes (e.g., the feature codes corresponding to all 10 fingerprints of the user) already exist within the biometric feature tree, it is determined that the user is not new, and the sign-up attempt fails, as nobody is allowed to have more than one account.

Conversely, if any of the fingerprints feature code does not exist in the biometric feature tree 1209, the system calculates a new identifier fragment (e.g., as a random number 1208 of FIG. 12) and incorporates the new identifier fragment into the biometric feature tree. Consequently, the system generates a unique biometric identifier for the individual using their multiple (e.g., 10) identifier fragments 1303. For example, the identifier fragments may be concatenated to generate the account identifier 1211 of FIG. 12. The user's 10 fingerprints feature codes represent ten keys, and it is only when these 10 keys are combined that the safe box may be unlocked (e.g., the user may login to their account). It should be noted that the biometric feature tree 1209 contains all the inserted fingerprint feature codes (as shown by identifier fragment 1 to identifier fragment n. Out of the n identifier fragments, 10 identifier fragments may correspond to each individual's account identifier 1211.

The utility of the biometric feature tree extends beyond new account creation. In the event that individuals lose access to their accounts or devices, they may utilize their fingerprints to retrieve their accounts. This feature provides a convenient and secure method for account recovery. FIG. 14 illustrates the structure of the zero-knowledge proof (ZKP) verifier, according to various aspects of the present disclosure. The ZKP verifier tree 1213 may apply Merkle Patricia Trie data structure for key-value storage. The account identifier 1402 is served as the key and the user's personal commitment is served as the value. The account identifier is the combination of a user's 10 identifier fragments 1303. The commitment is generated by the user's secret biometric data and is used for the user's zero-knowledge identification proof. Generally, the commitment may be considered as the encrypted data which not only keeps the secret but also proves the user knows the secret. The ZKP enables a prover to demonstrate knowledge of a fact to a verifier without revealing any specific details. The ZKP allows the prover to prove the validity of a statement without disclosing the underlying information. By leveraging mathematical computations and interactions, the prover convinces the verifier while preserving privacy.

The ZKP may operate in a similar manner to the biometric feature tree. Just like in the biometric feature tree, users may utilize the verifier root 1350 to verify the correctness of the hash for the entire verifier tree. This provides a simplified verification process for users. The blockchain may calculate the corresponding ZKP verifier nodes 1404 based on the user's biometric data points and may insert them under the verification root. Ultimately, at the leaf node, the user's commitment 1403 may be stored or found using ZKP for validation purposes. It should be noted that commitment for each user is stored in one of the leaves 1403 of the ZKP verifier tree 1213. Therefore, commitments 1 to commitment n shown in FIG. 14 correspond to the commitments for all n users of the system for whom an account identifier is generated. As described above with reference to FIG. 12, the commitment for each user is generated by encrypting the user's combined feature code 1205 and is inserted into the ZKP verifier tree 1213 by the ZKP process using the account identification 1211 is the key.

It should be noted that, unlike the biometric feature tree, the ZKP verifier serves as a black box. The system leverages the fingerprint to compute a commitment using the ZKP method. The verification process initiated by an individual is explained below with reference to FIG. 17. Simultaneously, the identifier may be employed to determine the account identifier path 1402 within the verifier tree. This path leads to the specific commitment leaf node 1403 that needs to be compared for verification purposes. Only the account identifier 1211 (FIG. 12) and commitment 1212 are needed for input and the result whether passing the ZK verification or not may be given. The black box encapsulates the computation and verification procedures, preventing any exposure of sensitive information or transaction details to external entities. Both the user and the blockchain nodes may not detect the data inside the box which ensures the effective protection of user privacy and account safety.

By conducting the verification process within this secure black box environment, the system of the present embodiments ensures that user privacy is safeguarded at all times. Users may confidently engage in transactions, knowing that their personal information and transactional data remain protected from unauthorized access or disclosure. Furthermore, this design may achieve users' sensitive data desensitization and completely stored on chain. There is absolutely no central authority to process such users' data.

Both biometric feature tree 1209 and ZKP verifier 1213 leverage the Merkle Patricia Trie data structure which realizes fast searching and lightweight properties. A Merkle Patricia Trie provides a cryptographically authenticated data structure that may be used to store all (key, value) bindings. The on-chain nodes may find the proper leaf nodes from a large dataset by path 1302 or 1402 effectively. On the other hand, only the Merkle Patricia Trie root hash is stored on the blockchain header which does not impose a significant burden on the throughput of the blockchain.

With traceable biometric information written with each transaction, cryptocurrency transactions could acquire more transparency. By biometric information verification, cryptocurrency transactions related to criminal activities will greatly reduce. Cryptocurrency tumbler services such as Tornado Cash will not be able to achieve functionality because each transaction needs verification. For regulatory authorities, the application of this technology may also bring great convenience in supervision, playing a significant role in areas such as taxation, investigation of criminal transactions and providing valuable and trustworthy evidence. For individuals, cryptocurrency transactions have become more transparent and secure, providing greater protection for personal assets.

To register an account, users are required to link their biometric information with the account. This process prevents Sybil attacks since everyone's biometric information is unique. A Sybil attack is a type of attack in which an attacker subverts a computer network service's reputation system by creating a large number of pseudonymous identities (or aliases) and uses them to gain a disproportionately large influence.

The biometric information may be easily acquired by mobile device. The sensitive biometric information will be processed by hash function and encryptions to generate personal private key 1206, public key 1207, identifier 1211, and encrypted commitments. The data desensitization process is irreversible which mitigates the original biometric information leakage threat. The generated encrypted personal biometric commitments and identifiers are broadcast to the network and totally stored on-chain. There is absolutely no central authority to process such sensitive data. The commitment is stored as a Merkle Patricia Trie leaf node 1403 and the root 1350 of the Merkle Patricia Trie 1213 is stored in every block. The biometric feature free 1209 (FIG. 13) is updated when a new biometric information commitment is added which ensures the latest block possesses the most recent updated identity information.

Figure 15:
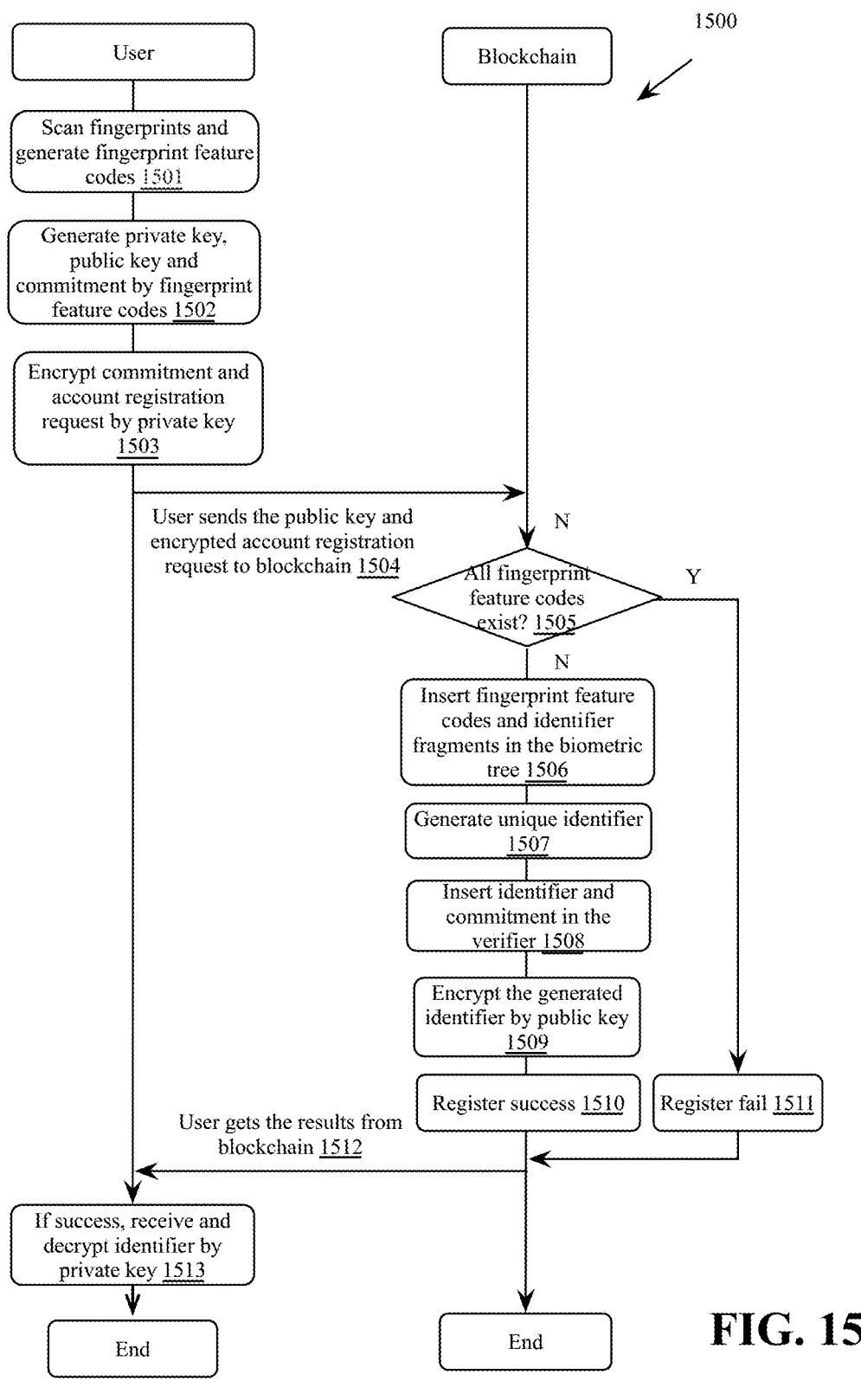
FIG. 15 illustrates the account registration process, according to various aspects of the present disclosure.

FIG. 15 illustrates the account registration process 1500, according to various aspects of the present disclosure. In FIG. 15, operations 1501-1504 and 1512-1513 may be performed by the electronic device of a user and operations 1505-1511 may be performed by a node/server of the blockchain network. The user's fingerprints images may be received, and the fingerprint feature codes may be generated (at block 1501) by fuzzy code algorithm. The fingerprint feature codes are used to generate (at block 1502) digital wallet's private key, public key, and commitment. After that, the feature codes' combination included in the account registration request is encrypted (at block 1503) by private key. The user may send (at block 1504) the public key and the account registration request to the blockchain network. Then the on-chain nodes check (at block 1505) whether the combination existed. If such a combination does not appear in the latest block header of the biometric feature tree, the user is considered a new user and the process 1500 continues to block 1506 for the rest of the registration process. Otherwise, the user is considered a registered user, and the registration process may terminate (at block 1511).

The new user's fingerprint feature codes' combination and identifier fragments are inserted (at block 1506) in the biometric feature tree (e.g., the biometric feature tree 1209 of FIGS. 12 and 13). The unique account identifier (e.g., the account identifier 1211 of FIG. 12) is generated (at block 1507) during the insertion process. New fingerprint feature codes ensure the generated account identifier is unique. The on-chain nodes then insert (at block 1508) the generated identifier and the user's biometric commitment in the verifier. The generated identifier is encrypted (at block 1509) by the user's public key (e.g., the public key 1207 of FIG. 12). The server may consider the registration process successful (at block 1510). The encrypted account identifier is sent (at block 1512) to the user's electronic device. The user's electronic device may decrypt (at block 1513) the user's account identifier by the user's private key (e.g., the private key 1206 of FIG. 12) and finish the registration process.

This registration process may avoid the user duplicate registration problem. Registered fingerprint feature code may be verified quickly and effectively based on Merkle Patricia Trie data structure. Every user may only register with their own fingerprint once. Also, the identifier generation process is extremely unique which ensures the identifier mapping to the user accurately. Those two properties make the system highly suitable for universal basic income (UBI) distribution.

Everyone's biometric information possesses uniqueness, and based on this uniqueness, it is possible to establish a tighter correlation between users and their accounts. Personal biometric information may be applied for account recovery. A hacker may steal accounts but may not spend any cryptocurrency because the hacker cannot provide valid biometric information. The original account owner may retrieve accounts easily by the owner's unique biometric information. Also, such unique biometric information is linked with personal identity. Hereby, a traceable peer to peer transaction system is achieved by biometric information verification.

Figure 16:
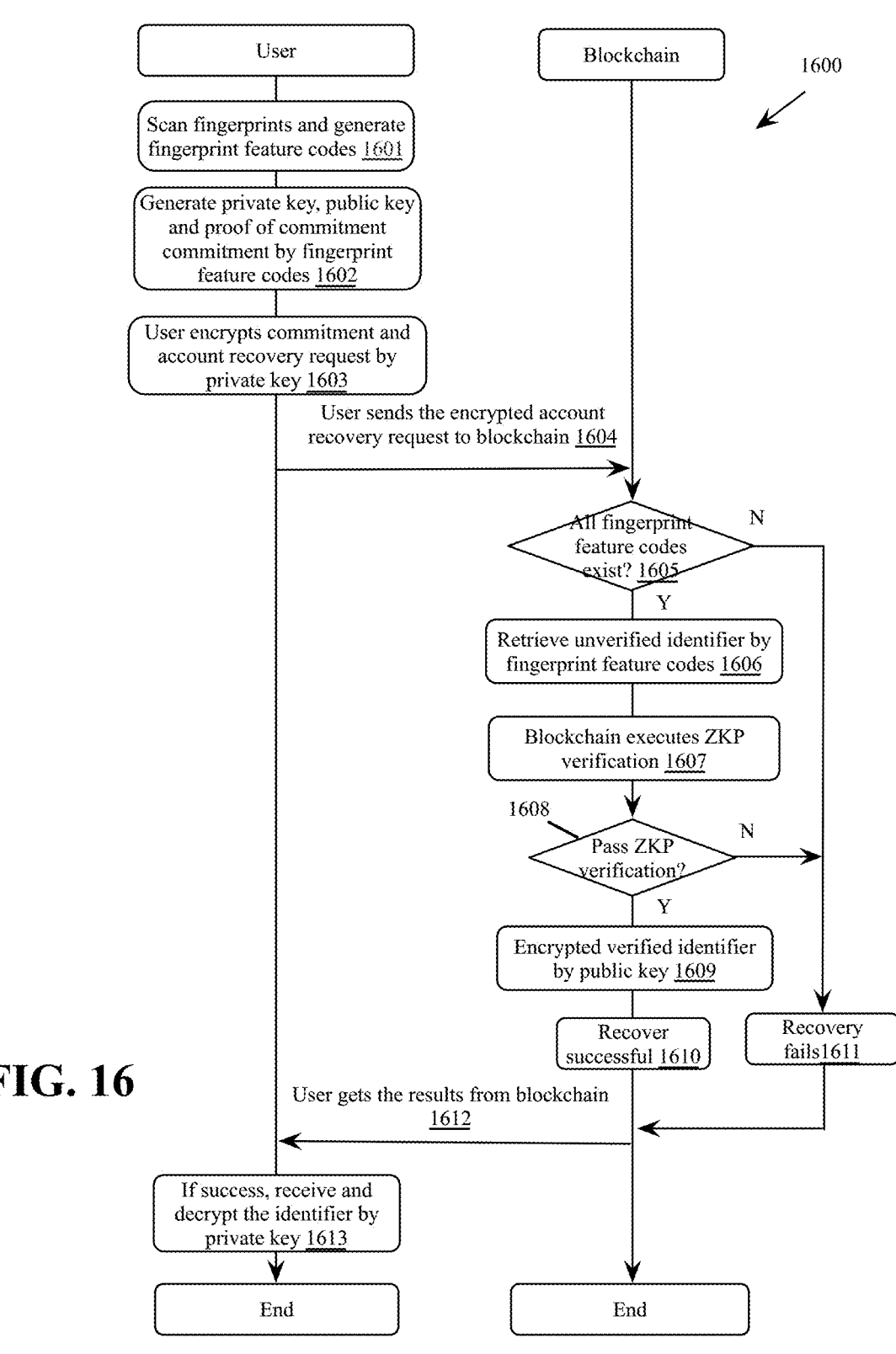
FIG. 16 illustrates the account recovery process, according to various aspects of the present disclosure.

FIG. 16 illustrates the account recovery process 1600, according to various aspects of the present disclosure. In FIG. 16, operations 1601-1604 and 1613 may be performed by the electronic device of a user and operations 1605-1612 may be performed by a node/server of the blockchain network. The objective of the recovery process is to retrieve the user's account identifier (e.g., the account identifier 1211 of FIG. 12), the private key 1206 and the public key 1207 by user's biometric information (e.g., and without limitations, the fingerprints). The user's electronic device providers the user's biometric information (e.g., by scanning the user's fingerprints) and generates (at block 1601) the feature codes by fuzzy code algorithm. The private key, the public key, and the proof of commitment (e.g., the values a and z, as described below with reference to FIG. 25) are generated (at block 1602) based on those feature codes. Then the features codes and the proof of commitment are encrypted (at block 1603) with the user's private key. The account recovery request including the encrypted feature codes and the proof of commitment is sent (as shown by 1604) to the server. The on-chain nodes check (at block 1605) whether the biometric feature codes exist in biometric feature tree. If not, the recovery fails (at block 1611). An unverified identifier may be retrieved (at block 1606) from the biometric feature tree using the registered biometric feature codes.

The blockchain may perform (at block 1607) the ZKP verification. Through the unverified identifier, the ZKP verifier may check (at block 1608) whether the unverified identifier has already been stored in the system. If not, the user is not a registered user, and the account recovery process fails (at block 1611). If the unverified identifier has already been stored, the commitment may be found according to the identifier. If the verification is successful, the verified account identifier (e.g., the account identifier 1211 of FIG. 12) may be encrypted (at block 1609) by the user's public key. The server considers the recovery as successful (at block 1210). The server may send (as shown by 1612) the encrypted account identifier to the user's electronic device. The user's electronic device may decrypt (at block 1613) the account identifier by the user's private key.

According to the non-interactive ZKP definition, the prover generates a proof by committing to certain values related to the secret knowledge (e.g., the user's biometric information). This proof is then sent to the verifier. The verifier checks the proof against the commitment that is already stored in the ZKP verifier tree without any back-and-forth interaction. The proof is structured such that it can only be constructed if the prover knows the secret, yet it reveals nothing about the secret itself. The verifier ensures the proof aligns with the commitment rules and standards, confirming the prover's knowledge without any interaction.

After that, the on-chain nodes execute the ZKP verification by unverified identifier and commitment, as described above in block 1607. The commitment and unverified identifier may go through the zero-knowledge verification process. If passing the verification, the verified account identifier may be encrypted by user's public key and may be sent to the user's electronic device. Otherwise, the account recovery process fails.

Figure 17:
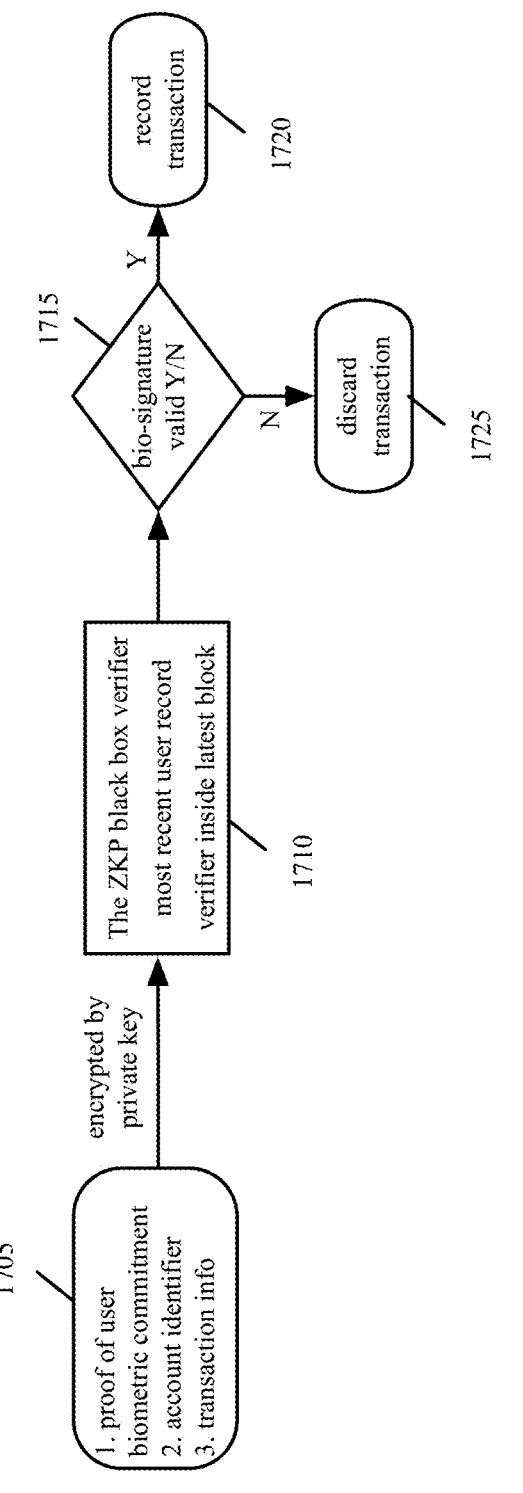
FIG. 17 illustrates the workflow for ZKP verification process that is required before a transaction may be performed, according to various aspects of the present disclosure.

FIG. 17 illustrates the workflow for ZKP verification process that is required before a transaction may be performed, according to various aspects of the present disclosure. With reference to FIG. 17, the users may send at block 1705 three pieces of information to blockchain if they want to start a transaction: proof of user biometric commitment (e.g., the values a and z, as described below with reference to FIG. 25), account identifier and the transaction information. This information may be encrypted by private key and sent to the ZKP verifier black box (e.g., the ZKP verifier black box 1404 of FIG. 14). The black box verifier 1404 may verify (at block 1710) the biometric information by the latest user record. A determination may be made (at block 1715) whether the verification is successful. If the verification is successful, the transaction succeeds (at block 1720), else, the system may discard (at block 1725) the transaction.

Figure 18:
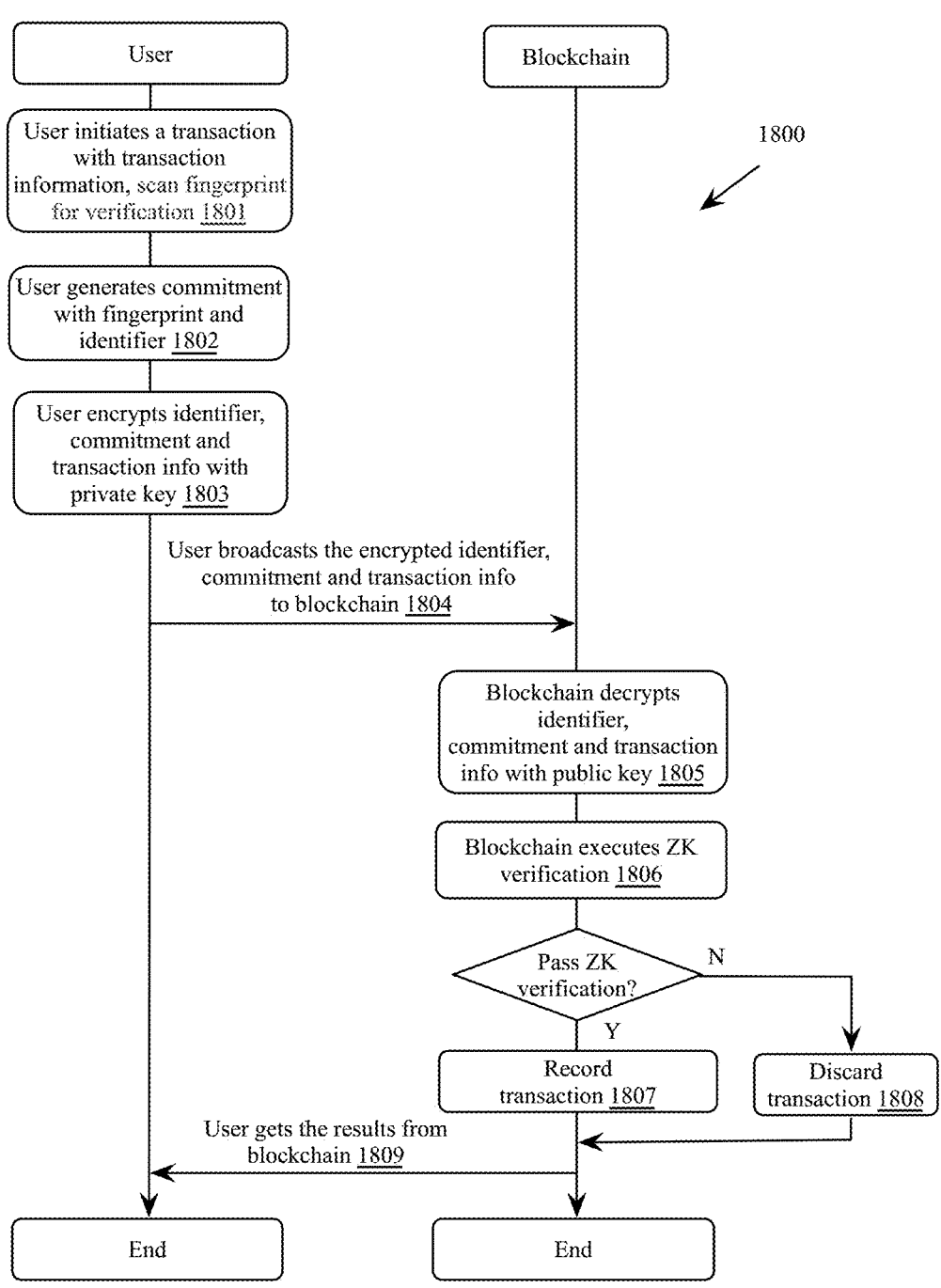
FIG. 18 illustrates the verification process for every broadcasted transaction, according to various aspects of the present disclosure.

FIG. 18 illustrates the verification process for every broadcasted transaction, according to various aspects of the present disclosure. As shown in 1801, the user, acting as the initiator, begins by providing the transaction information along with their own biometric information. This biometric information serves as a crucial element in verifying the user's identity during the transaction process. Subsequently, an identifier of the biometric information, referred to as the "Biometric Identifier" is generated, along with a corresponding commitment known as the "Identity Commitment" 1802.

To secure the transaction details and the associated biometric information, encryption is employed using the user's private key 1803. The identifier, commitment, and transaction information are encrypted, forming the "Encrypted Data Package". As shown in 1804, this package is then transmitted to the blockchain for further processing.

Upon receipt of the encrypted data, the blockchain decrypts the information using the corresponding public key 1805. Following decryption, a ZKP verification is executed to verify the authenticity and integrity of the provided information 1806. If the verification process successfully passes, indicating that the user's identity and transaction details are valid, the transaction will be recorded in the subsequent block of the blockchain 1807. Conversely, if the verification fails, the transaction will be discarded 1808. Users may retrieve the outcome of their transactions by accessing the blockchain. Once recorded, the transaction status (recorded or discarded) is available on blockchain 1809.

This verification system enhances the security of transactions by leveraging the user's own biometric information for signing each transaction. As biometric information is unique to individuals, it ensures that the transaction may not be forged by unauthorized parties. The identity commitments are derived from personal biometric information; however, they do not reveal the actual biometric data. Moreover, the identity verification process is combined with the transaction request, ensuring that only verified transactions are recorded. This safeguards personal biometric information and prevents unauthorized impersonation within the network.

The system also prioritizes the privacy of sensitive information, specifically users' personal biometric data. Through the utilization of ZKP, the verification process is designed not to disclose any personal information while still ensuring the authenticity of the provided data. Although the data is maintained on the public blockchain, it is inaccessible to other users, providing a secure and private environment. The on-chain verification system may be likened to a black box 1404, where users solely verify their own identities for their respective transactions.

Currently, the penetration rate of cryptocurrencies is quite low, at about 3%. Which means only 3 percent of the population are involved in blockchain technology and decentralized finance. Combining identity verification with cryptocurrencies may encourage more people to participate. The prosperous development of mobile internet and the proliferation of smartphones facilitate biometric information collection. A smartphone may easily obtain personal fingerprints, facial characteristics etc. With the support of mobile devices and networks, this convenient, decentralized, personalized and secure transaction method acquires essential factors for popularization and the widespread application of this verification technique will dramatically evolve people's transaction habits.

II. Dynamic Biometric Verification System

Some embodiments provide a system referred to as the dynamic biological verification system, which combines dynamic passwords with biometric authentication. This innovative system offers an effective solution to overcome the vulnerabilities associated with static biometric authentication methods. By integrating dynamic passwords with facial recognition, the system provides the technical advantage of enhancing security and mitigating the risks of unauthorized access or data breaches.

Although several examples are described with reference to FIGS. 19-21 that use images of a person's face as the images with the user's biometric information, it should be understood that the operations of FIGS. 19-21 may be performed on images that include other types of the user's biometric information, such as the images of fingerprint, iris, retina, palm, palm vein, etc., of the user in the operations of FIGS. 19-21. As described above with reference to FIGS. 1 and 2, the electronic device of a user may include a biometric receiver that may take the images that include different biometric information of the user.

Figure 19:
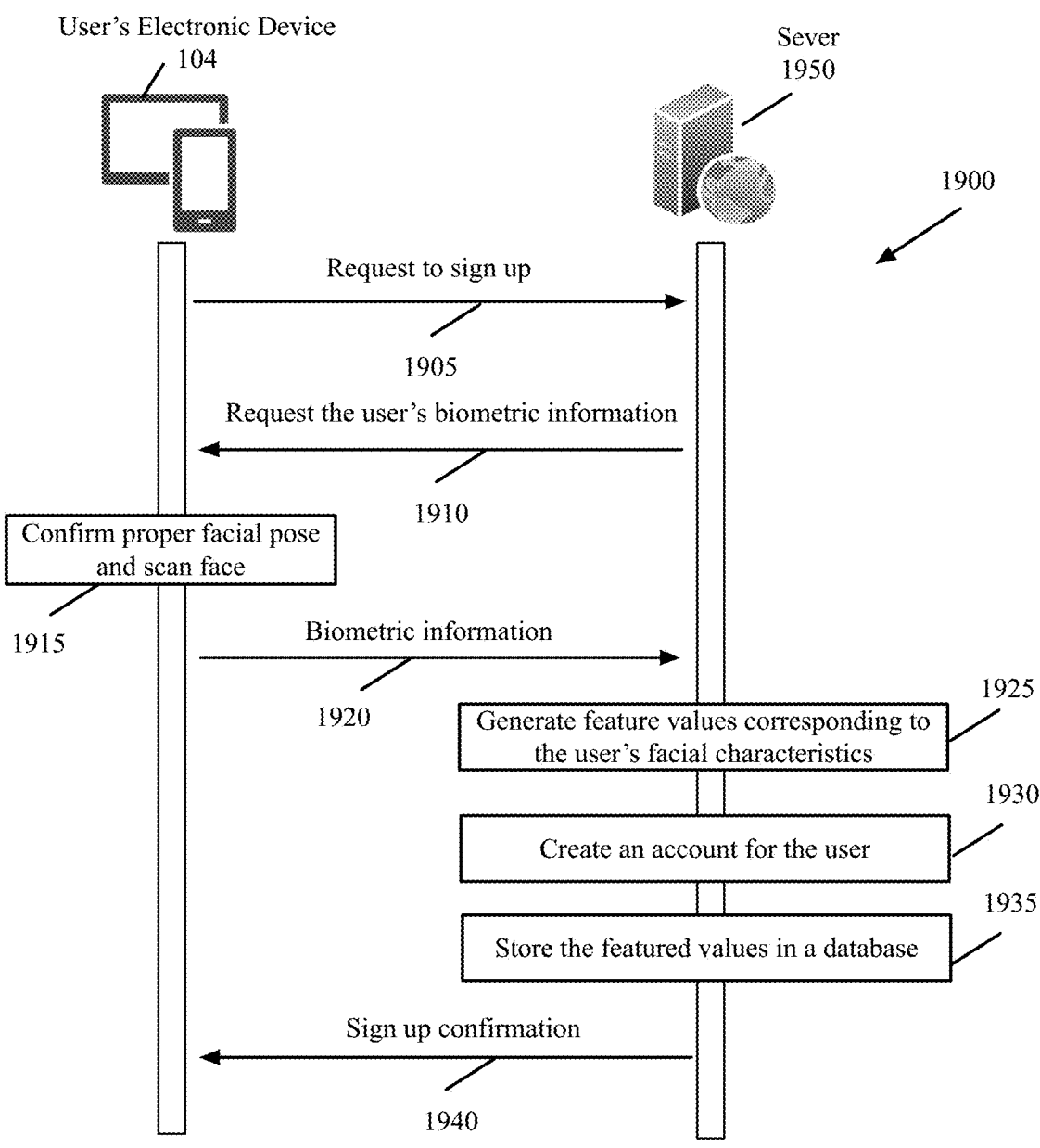
FIG. 19 is an example sequence diagram illustrating data items exchanged during the user registration for the dynamic biological verification system, according to various aspects of the present disclosure.

FIG. 19 is an example sequence diagram 1900 illustrating data items exchanged during the user registration for the dynamic biological verification system, according to various aspects of the present disclosure. In the example of FIGS. 19 and 20, facial data is provided as the user's biometric information. Alternatively, other types of biometric information, such as fingerprints, palm prints, iris patterns, etc., that are derived from images may be provided. The server 1950 may be any server that manages user accounts in order for the user to access the services of a system. Non-limiting examples of such as system include such as for example, and without limitation a social networking system, an ecommerce system, an online marketplace, an online retailer, a technology provider, a financial system, the biometric-integrated coin server of FIG. 1, etc.

With reference to FIG. 19, the user's electronic device 104 may send (at step 1905) a request to the server 1950 to sign up the user to the system. The server 1950 may request (at step 1910) the user's biometric information in order to sign up the user.

The electronic device 104 may receive (at block 1915) the user's facial data (or other biometric information in the embodiments that use biometric information other than facial features), usually by capturing and uploading the user's facial image through the registration interface. The electronic device 104 may send (at step 1920) the biometric information (e.g., the facial images) to the server 1950.

The server 1950 may generate (at block 1925) several (e.g., and without limitations a set of 20) feature values that correspond to the user's facial characteristics. For example, the server's facial analysis algorithms may analyze the facial data and may extract N (e.g., 15, 20, 30, etc.) feature values. It should be noted that the server 1950 and the user's electronic device 104 are both configured to know how to extract the same N feature values from the images that include the user's biometric data.

The server 1950 may create (at block 1930) an account for the user. Additionally, the user may complete the registration process by providing (e.g., as part of the request to sign up 1905) other necessary information such as username, password, and contact details.

The server 1950 may securely store (at block 1935) the extracted feature values in the user's account profile in a database. The featured values may be linked to the user's unique identifier or username. The server 1950 may verify the provided information and may confirm (at step 1940) the successful registration of the user. With the registration complete, the user may now utilize the dynamic biological verification system for authentication, leveraging the stored 20 feature values associated with their facial characteristics.

Figure 20:
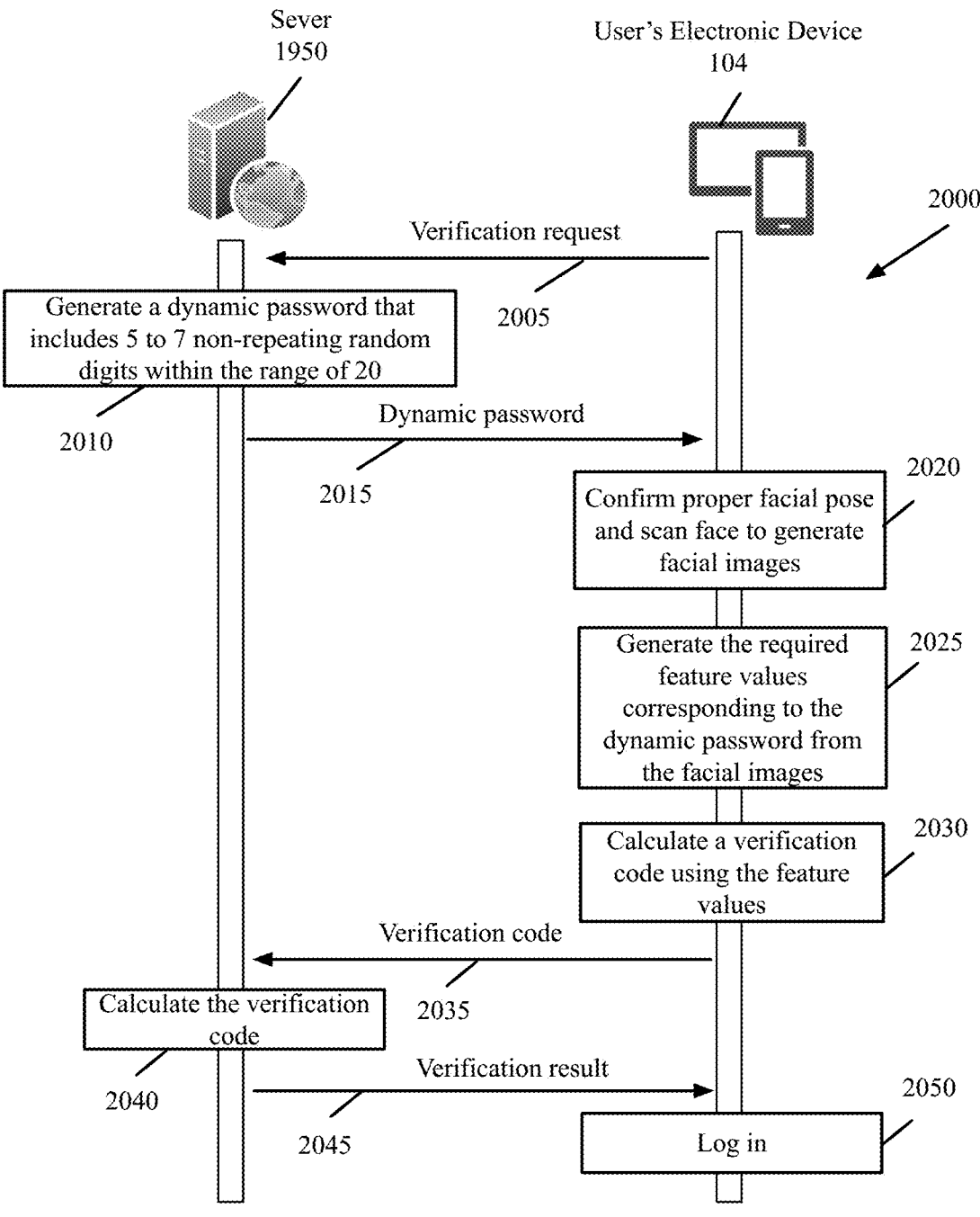
FIG. 20 is an example sequence diagram illustrating data items exchanged for generating a dynamic password during the user log in, according to various aspects of the present disclosure.

FIG. 20 is an example sequence diagram 2000 illustrating data items exchanged for generating a dynamic password during the user log in, according to various aspects of the present disclosure. The example of FIG. 20 assumes that N (e.g., 15, 20, 30, etc.) facial feature codes are generated from the user's facial characteristics and stored in the user's account profile as described above with reference to FIG. 19. With reference to FIG. 20, the user's electronic device 104 may send (at step 2005) a verification request to the server 1950. For example, the verification request may be sent when the user attempts to log in to the user's account.

The server 1950 may generate (at block 2010) a dynamic password that may include several non-repeating random numbers, each number may be within the range of 1 to N, where N is the number of facial feature codes generated from the user's facial characteristics and stored in the database at step 1930 (FIG. 19) during registration. It should be noted that the number of the non-repeating random numbers is less than N. For example, if N is 20, the non-repeating random numbers may include 5 to 7 numbers selected from the 20 integer numbers integer numbers between 1 to 20. The server 1950 may send (at block 2015) the dynamic password to the electronic device 104.

After the electronic device 104 receives the random dynamic password, the user undergoes a biometric identification process, such as facial recognition. The electronic device 104 may confirm (at block 2020) proper facial pose and may scan the user's face to generate one or more facial images. After scanning the user's facial image, the electronic device 104 may run relevant intelligent algorithms and may generate (at block 2025) the required feature values corresponding to the dynamic digits from the facial images. For example, from 20 feature values of the facial images, 5 to 7 feature values corresponding to the dynamic digits may be calculated.

The electronic device 104 may calculate (at block 2030) a verification code using the calculated featured values. The electronic device 104 may send (at step 2035) the verification code to the server 1950. Even if this verification code is intercepted by hackers, they would be unable to use it to access the user's account. This is because each time the verification is performed, only partial biometric data is included. In an insecure network, the verification code the user sends to the server may be sniffed by a hacker. However, the dynamic password is only used once, and the hacker cannot retrieve the full biometric data from encrypted partial biometric data. Even if the verification code is intercepted, the hacker cannot impersonate the user and pass the future verification process. The use of the dynamic password provides the technical advantage of enhancing the security.

Furthermore, unlike traditional mobile verification codes that require users to receive and input the code into the terminal, the user is not aware of the operational flow of the dynamic password throughout the entire verification process yet achieves the effect of dynamic authentication. After the server 1950 receives the user's verification code, the server 1950 may also calculate the verification code using the feature points stored in the database (e.g., as described with reference to block 1930 of FIG. 19). The server 1950 may then compare the verification code received from the user's electronic device with the verification code calculated by the server 1950.

compare the verification code with the corresponding feature points stored in the database (e.g., as described with reference to block 1930 of FIG. 19). If the two verification codes match, the authentication is successful. The server 1950 may send (at step 2040) the verification results to the electronic device 104. After the successful authentication, the electronic device 104 may log in (at block 2045) the user to the system and may use the services provided by the server.

Figure 21:
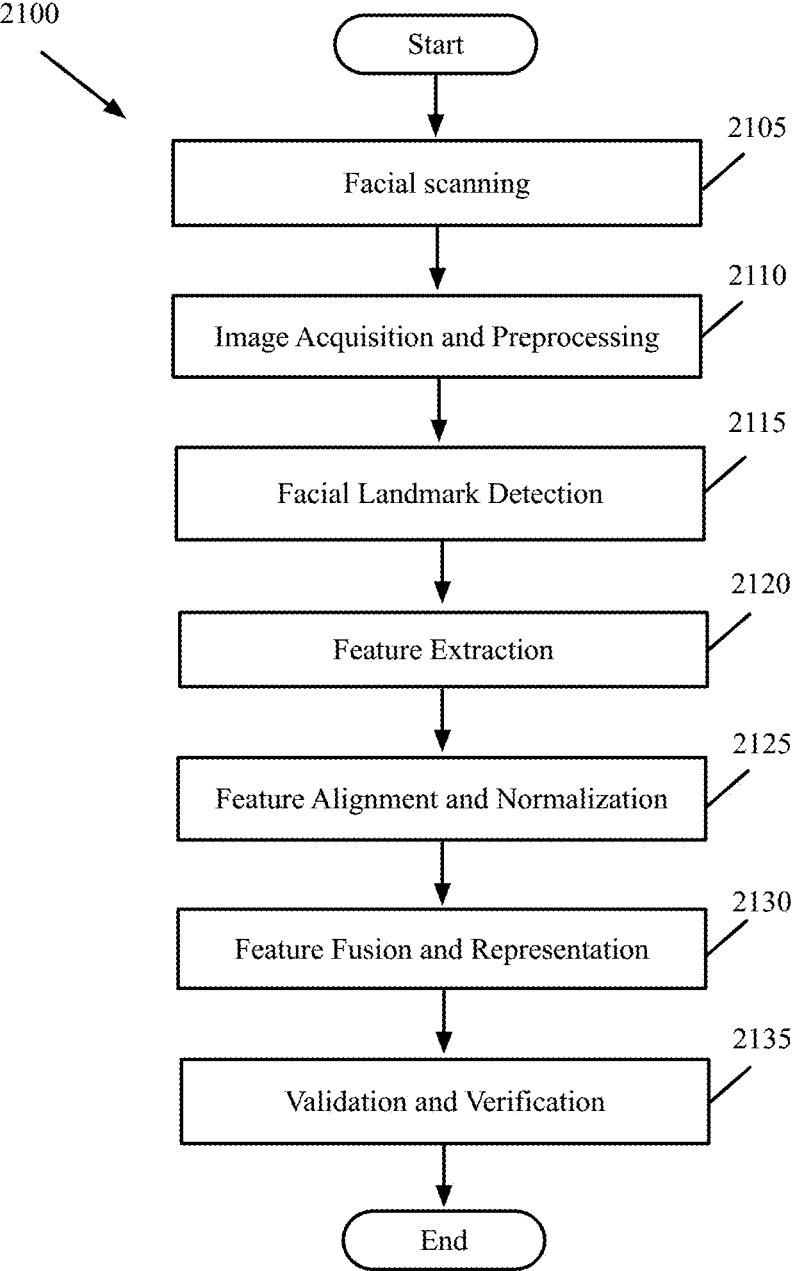
FIG. 21 illustrates a method for extracting consistent facial features from multiple images of the same person, according to various aspects of the present disclosure.

FIG. 21 illustrates a process 2100 for extracting consistent facial features from multiple images of the same person, according to various aspects of the present disclosure. With reference to FIG. 21, facial scanning may be performed (at block 2105). For example, algorithms to verify the authenticity of the captured subject may be utilized ensuring, the user may be prompted to assume proper facial poses and several images of a user's face may be received. Next, image acquisition and preprocessing may be performed (at block 2110). For example, that the system may extract accurate feature values from the obtained images.

Facial landmark detection may be performed (at block 2115). For example, facial landmark detection techniques may be employed to identify key points on the face, such as the eyes, nose, mouth, and other facial landmarks. Robust algorithms may analyze the preprocessed images to locate and precisely define these landmarks. Next feature extraction may be performed (at block 2120). To extract consistent facial features, the process 2100 may employ advanced feature extraction algorithms. These algorithms may analyze the regions around the facial landmarks to capture distinctive patterns, textures, and geometrical characteristics. Feature extraction techniques, such as Local Binary Patterns (LBP), Scale-Invariant Feature Transform (SIFT), or Convolutional Neural Networks (CNN), may be utilized to obtain discriminative feature representations.

Next, feature alignment and normalization may be performed (at block 2125). To achieve consistency across different images, the extracted features may be aligned and normalized. Geometric transformations, such as affine transformations or image warping, may be applied to align the facial features based on the detected landmarks. This ensures that corresponding features in different images are accurately aligned. Feature fusion and representation may be performed (at block 2130). The aligned features from multiple images may be fused to generate a unified and consistent representation of the person's facial characteristics. Techniques like averaging, weighted fusion, or principal component analysis (PCA) may be employed to create a compact and representative feature vector.

Next, validation and verification may be performed (at block 2135). The extracted and fused features may be evaluated using validation and verification processes. Validation may include assessing the quality and reliability of the extracted features to ensure consistency. Verification may include comparing the extracted features against reference data or stored templates to verify the person's identity. The process 2100 may then end.

III. A New Digital Currency Based on One-Time Passcode

Figure 22:
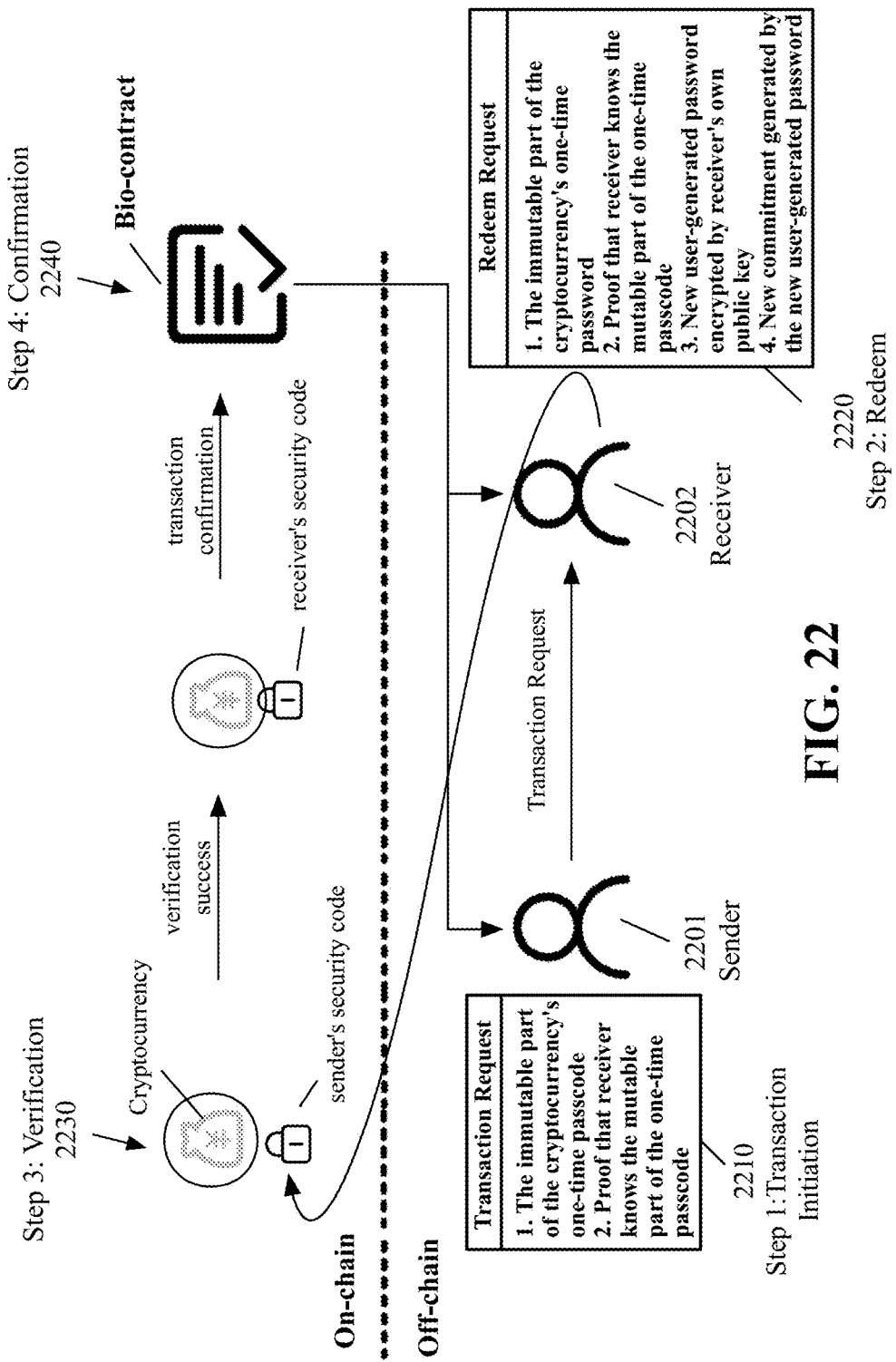
FIG. 22 illustrates a decentralized transaction model in which only cryptocurrency and its ownership has been recorded on blockchain's public ledger and a bio-contract is used for proof of completion of a transaction, according to various aspects of the present disclosure.

Some of the present embodiments provide enhanced privacy and security features, scalability solutions, facilitating transaction processes, and achieving the blockchain system with high throughput and low latency. FIG. 22 illustrates a decentralized transaction model in which only cryptocurrency and its ownership has been recorded on blockchain's public ledger and a bio-contract is used for proof of completion of a transaction, according to various aspects of the present disclosure. The embodiment of FIG.

22 provides the technical advantage of eliminating the need to record any transaction information such as the sender, receiver, amount, and timestamp etc., in the blockchain. The major part of the transaction process and communication is performed off chain, thereby speeding up the operations of the blockchain and reducing the blockchain's storage usage. To achieve this design, a one-time passcode (e.g., a one-time use passcode) with each cryptocurrency is implemented to provide security.

As described below with reference to FIG. 23, the one-time passcode 2300 includes an immutable part 2310 that identifies the cryptocurrency, and a mutable part 2320 that identifies the current owner of the cryptocurrency. Each user may have a pair of private and public keys. Each user may have a user-generated password. The blockchain may store the user-generated password encrypted by the user's public key as a part of the mutable part of the one-time passcode (e.g., as shown by item 2322 of FIG. 23). The blockchain may store a commitment generated by the current owner of the cryptocurrency to verify transaction requests for the cryptocurrency. Details of the commitment generation is described below with reference to FIG. 25. The blockchain may store the users' biometric information when the users generate an account (e.g., register) with the blockchain.

The transaction process of FIG. 22 may be divided into four steps. The first step 2210 is the transaction initiation which is performed off-chain, for example, by the electronic device of the sender 2201. The sender knows the receiver's a unique number (e.g., the unique account number or the public key) before the transaction. The electronic device of the sender uses the sender's own user-generated password and the receiver's unique number to generate a proof of knowledge of the mutable part of the one-time passcode (e.g., as described below with reference to FIG. 25). The proof of knowledge may be a number of digits or a QR code.

This proof can only be used by the receiver for redemption because the receiver's unique number is applied in the encryption. In this case, hackers may hack the message but are unable to redeem the coin. The electronic device of the sender sends the immutable part of the one-time passcode and the proof of knowledge of the mutable part of the one-time passcode in a transaction request to the electronic device of the receiver. The sender may send the transaction request to the receiver by any messenger, such as, email, text, WhatsApp, Telegram, etc.

The second step 2220 is the redeem process which is performed off-chain, for example, by the electronic device of the receiver 2202. The electronic device of the receiver 2202 receives the transaction request from the electronic device of the sender. The electronic device of the receiver then generates a new user-generated one-time password and encrypts it with the receiver's own public key. The electronic device of the receiver also generates a new commitment by this new one-time passcode (for e.g., $x = g^s$, as described below with reference to FIG. 25). After that, the electronic device of the receiver sends the immutable part of the one-time passcode, the proof of knowledge of the mutable part of the one-time passcode, the encrypted user-generated password of the sender, and the sender's commitment to the blockchain system as the redeem request.

The third step 2230 is the verification process, which is performed on-chain, for example, by the server of a blockchain node. The server receives the receiver's redeem request. The immutable part of the one-time passcode is used to identify the cryptocurrency. The proof of knowledge of the mutable part of the one-time passcode and the sender's commitment stored in the blockchain are used to verify that the redeem request is authorized by the current owner of the cryptocurrency. If the proof passes the zero-knowledge verification (e.g., as described below with reference to FIG. 25), the blockchain server uses the receiver's encrypted user-generated password, the receiver's commitment, and the receiver's account number as a new security code 2390 (as described below with reference to FIG. 23) of the cryptocurrency. After the security code has been changed, the ownership of that cryptocurrency is changed from the sender to the receiver.

The fourth step 2240 is the confirmation step, which is performed on-chain, for example, by the server of a blockchain node. After the cryptocurrency with a new security code has been recorded in the public ledger for a few blocks, for example after 6 blocks, the transaction is finally confirmed. The system may generate confirmation message referred to herein as a bio-contract and may send it back to sender and receiver. In the generated bio-contract, both the sender's and the receiver's biometric information are included (e.g., the user's biometric information that was received by blockchain at the time of account generation). The bio-contract may be used by the sender as a proof that the sender has sent the cryptocurrency to the receiver and may be used by the receiver as a proof that the receiver has paid for the cryptocurrency.

Figure 23:
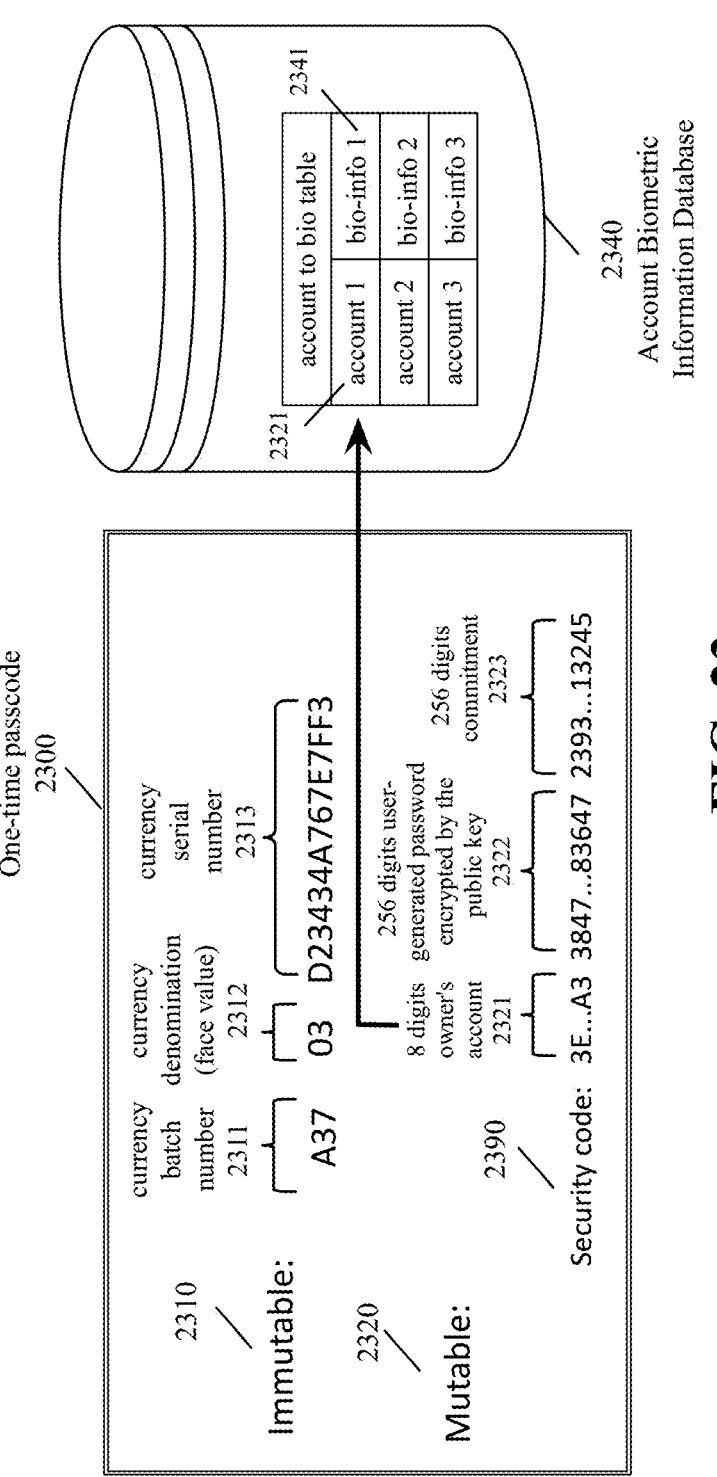
FIG. 23, illustrates the detailed components of the one-time passcode, according to various aspects of the present disclosure.

FIG. 23, illustrates the detailed components of the one-time passcode 2300, according to various aspects of the present disclosure. The one-time passcode 2300 may include two parts, the immutable part 2310 and the mutable part 2320. The immutable part 2310 includes the cryptocurrency's batch number 2311, the denomination 2312, and the serial number 2313. The immutable part 2310 is used to identify the cryptocurrency. The batch number 2311 depends on when the cryptocurrency is generated. For example, a specific batch number may be designated for the cryptocurrency issued during each monthly period. The denotation number 2312 represents how much value that cryptocurrency possesses. The serial number 2313 is used to separate the cryptocurrencies issued in the same batch and with the same face value. Each cryptocurrency has a unique serial number in the same batch. Those numbers are determined when a cryptocurrency is generated.

The mutable part 2320 may be used to identify the current owner of the cryptocurrency. The mutable part 2320 may include the current owner's account number 2321, the encrypted user-generated password 2322 of the current owner, and the current owner's commitment 2323. Each account may have a unique account number. Some of the present embodiments may use an 8-digit account number format, with each digit represented in hexadecimal. These account numbers may be utilized as unique account identifiers for different users (e.g., as shown by item '3E . . . A3' in FIG. 23). In that way, the system may support up to 4.3 billion users. When registering a new account, the users may be required to upload their own biometric information. The system may generate a unique account number and map the user's account number 2321 with the user's biometric information 2341 in a database 2340. The one-time passcode is encrypted by the owner's public key. This field is designed for users if they lose their cryptocurrency's one-time passcode. Users may use their private key to decrypt the one-time passcode. To ensure its security, it utilizes 256-digit RSA hash encryption. The commitment 2323 is used for zero-knowledge verification, enabling owners to prove their knowledge of the passcode without revealing the passcode itself. After each transaction, the owner's account number 2321, the encrypted password 2322, and the commitment 2323 generated by the new passcode are changed from sender to receiver. This dynamic process is why these components are mutable in the system. The combination of the owner's account number 2321, the encrypted user-generated password 2322, and the commitment 2323 is the security code 2390, which is the mutable part of the one-time passcode used to represent the ownership of the coin during coin transactions.

Figure 24:
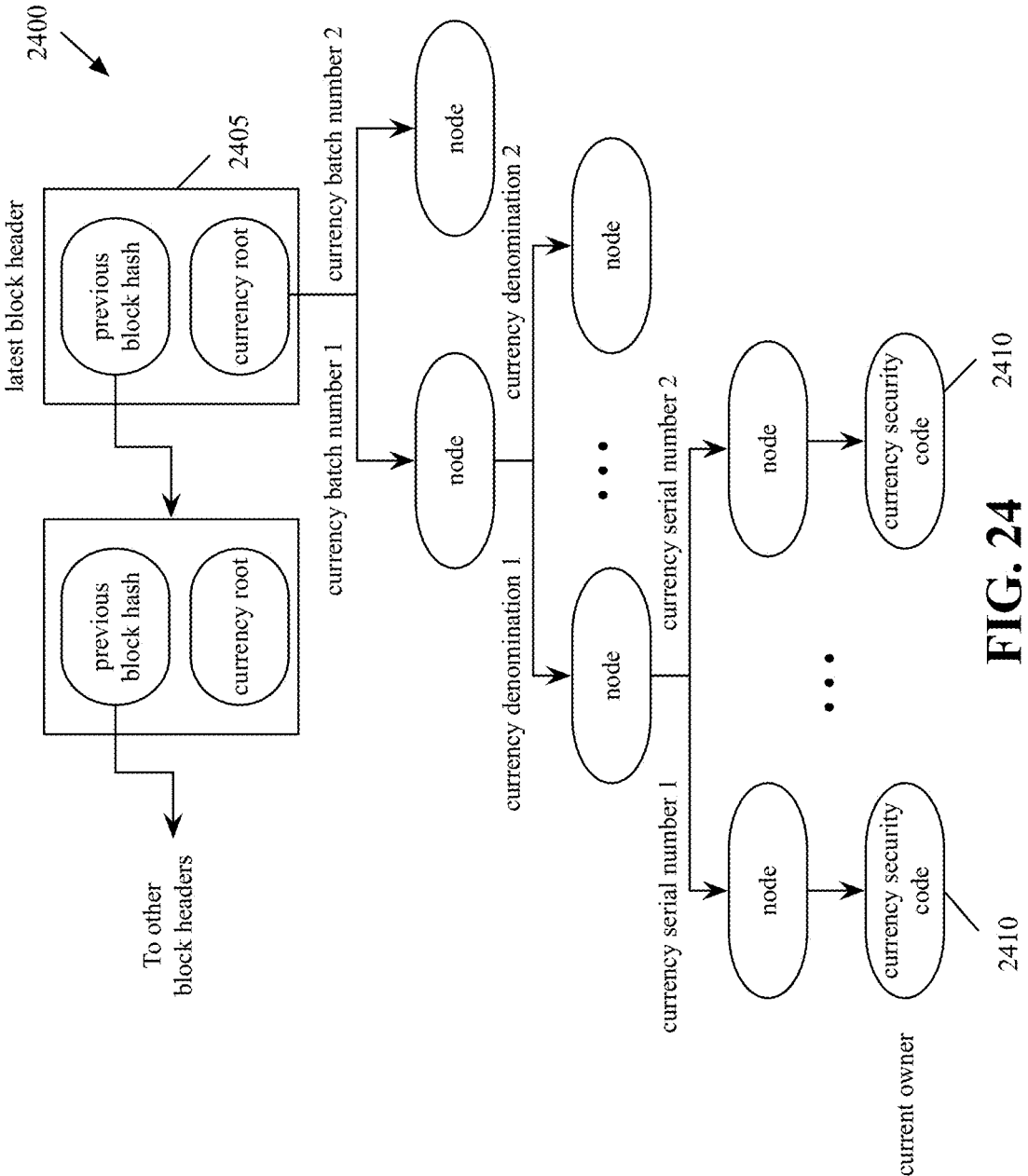
FIG. 24 illustrates the Merkle Patricia Trie that is used to store the coins on blockchain.

FIG. 24 illustrates the Merkle Patricia Trie 2400 that is used to store the coins on blockchain, according to various aspects of the present disclosure. Since only the cryptocurrency itself is recorded on public ledger, the blockchain header 2405 is concise and straightforward. The immutable numbers described above with reference to FIG. 23 represent the cryptocurrency's path in the cryptocurrency's Merkle Patricia Trie 2400. Since these numbers are immutable, the path is fixed for a cryptocurrency when the cryptocurrency is generated. The mutable security code defines who is the current owner of that cryptocurrency. The security code is contained in the leaf node 2410. The transfer of cryptocurrency's ownership is represented by replacing the old security code with a new security code in the leaf node 2410. Compared to traditional recording transaction details, recording the cryptocurrency itself ensures that regardless of how many times it is traded, only one copy of the data is preserved.

Since the one-time passcode of the present embodiments is essential in the cryptocurrency's ownership transition process, broadcasting passwords directly to the blockchain network may lead to password leakage and financial loss. A zero-knowledge proof of password with identification may solve this problem. The owner of cryptocurrency proves to the blockchain system that he knows the password but without revealing the actual password.

Figure 25:
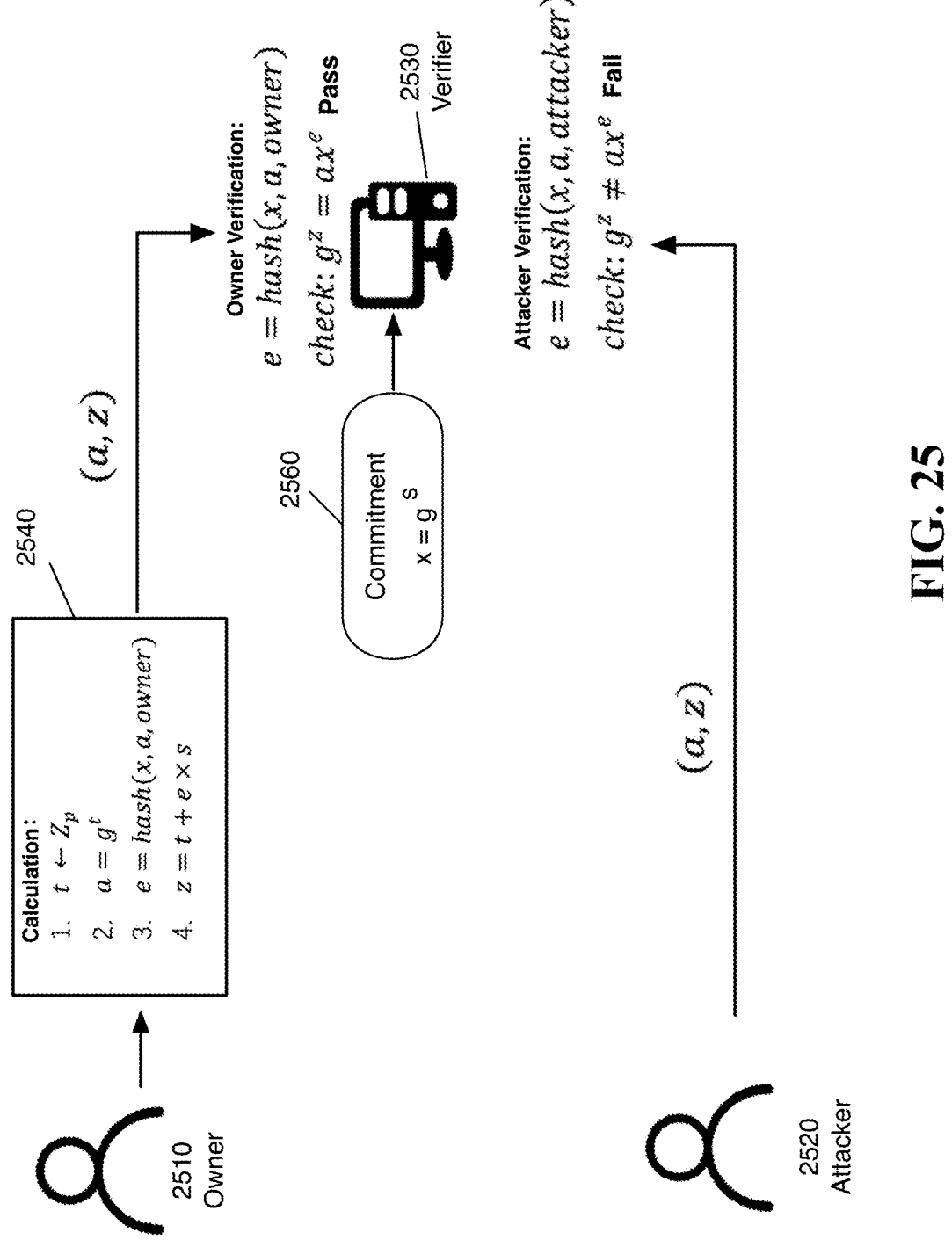
FIG. 25 illustrates the proof-of-knowledge process for a user's secret in a blockchain system and introduces a denomination method for simplifying large-scale transactions, according to various aspects of the present disclosure.

FIG. 25 illustrates the proof-of-knowledge process for a user's secret in a blockchain system and introduces a denomination method for simplifying large-scale transactions, according to various aspects of the present disclosure. With reference to FIG. 25, s may be the user's secret (e.g., the user-generated password) that may be used by the owner of an account as proof of knowledge. The term g refers to a generator of a cryptographical group, which may function as an encryptor. Zp is a large group of integers modulo p. The integer t is a number within Zp that is randomly selected by the account owner. The parameters owner and attacker in the formulas refer to the owner's and attacker's unique account numbers or public keys. It should be noted that when the current owner of a cryptocurrency wants to create the proof of knowledge for a cryptocurrency that the user wants to transfer to a new owner (e.g., as described above with reference to FIG. 22), the current owner uses the new owner's unique account number in the owner parameter.

With further reference to FIG. 25, the commitment 2560 that is calculated as $x=g^s$ is stored on the public ledger when the cryptocurrency was redeemed by the current owner. The electronic device of the cryptocurrency's owner 2510 may perform the following four operations 2540 to provide proof-of-knowledge to recover the owner's account (e.g., after the owner has lost the account's password or when the owner wants to transfer the cryptocurrency to a new owner). In the first step, the account owner 2510 may randomly select a number t from Zp group. In the second step, the account owner may encrypt t by g to resulting in a (shown as $a=g^t$). In the third step, the account owner 2510 may calculate e as the hash of x, a, and the owner's unique account number. In the fourth step, the account owner 2510 may calculate z as $t+e*s$. Particularly, the account owner calculates e with the owner's own unique account number. Subsequently, the electronic device of the account owner may send a, z to the blockchain system as proof the owner knows the user's secret corresponding to the user's account to recover the owner's account. The verifier 2530 receives the account owner's proof and calculates e with the owner's account number. Finally, the verifier checks whether $g^z=ax^e$. It should be noted that since z is equal to $t+e*s$, then $g^z=g^{t+e*s}=g^t*g^{e*s}$. Since $a=g^t$, then $g^z=a*(g^s)^e$. As $g^s$ is equal to x, then $g^z$ has to be equal to $ax^e$.

Obviously, the owner passes the verification because the owner knows the user's secret.

In the example of FIG. 25, the attacker 2520 does not know the user's secret of the owner 2510 but eavesdrops the owner, intercepts the account owner's proof (a, z), and sends (a, z) to the verifier 2530 to utilize that proof to bypass the verification process. Since the attacker's unique account number is different from the owner, for a request that comes from the attacker 2530, the verifier 2530 calculates the value of e by using the attacker's account number. As a results, the attacker does not pass the verification by using the same proof as the owner.

To address the issue that large-scale transactions cause updating too many passcodes, the denomination is introduced in the system. Let's assume cryptocurrency symbol (or unit) is P (e.g., Ethereum's cryptocurrency unit is ETH). With the help of denomination, a 15000 P transaction may be simplified to one 10000 P face value cryptocurrency and one 5000 P face value cryptocurrency exchange. So, it only updates two passcodes instead of updating 15000 passcodes.

Figure 26:
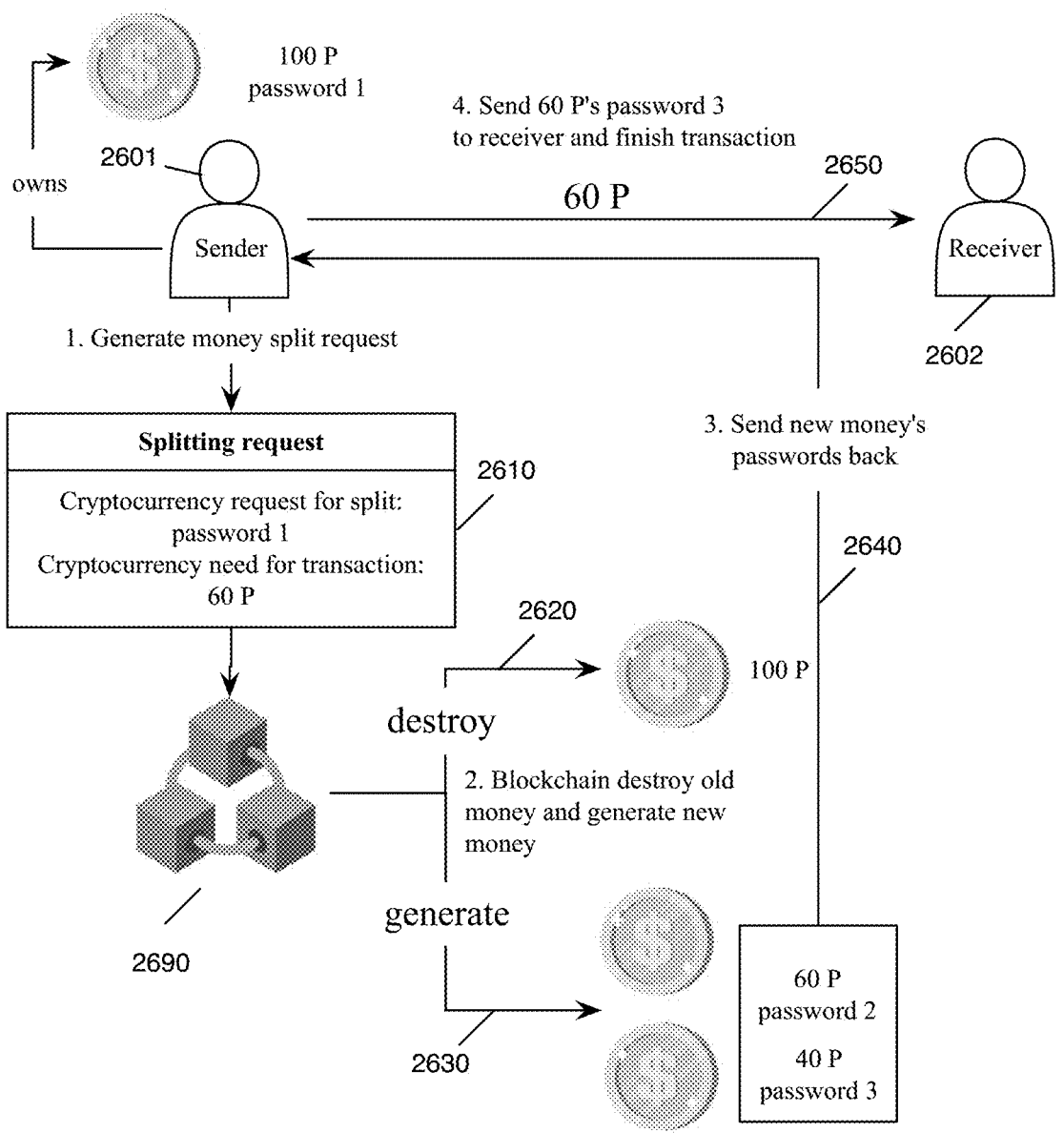
FIG. 26 illustrates the cryptocurrency's split process, according to various aspects of the present disclosure.
Figure 27:
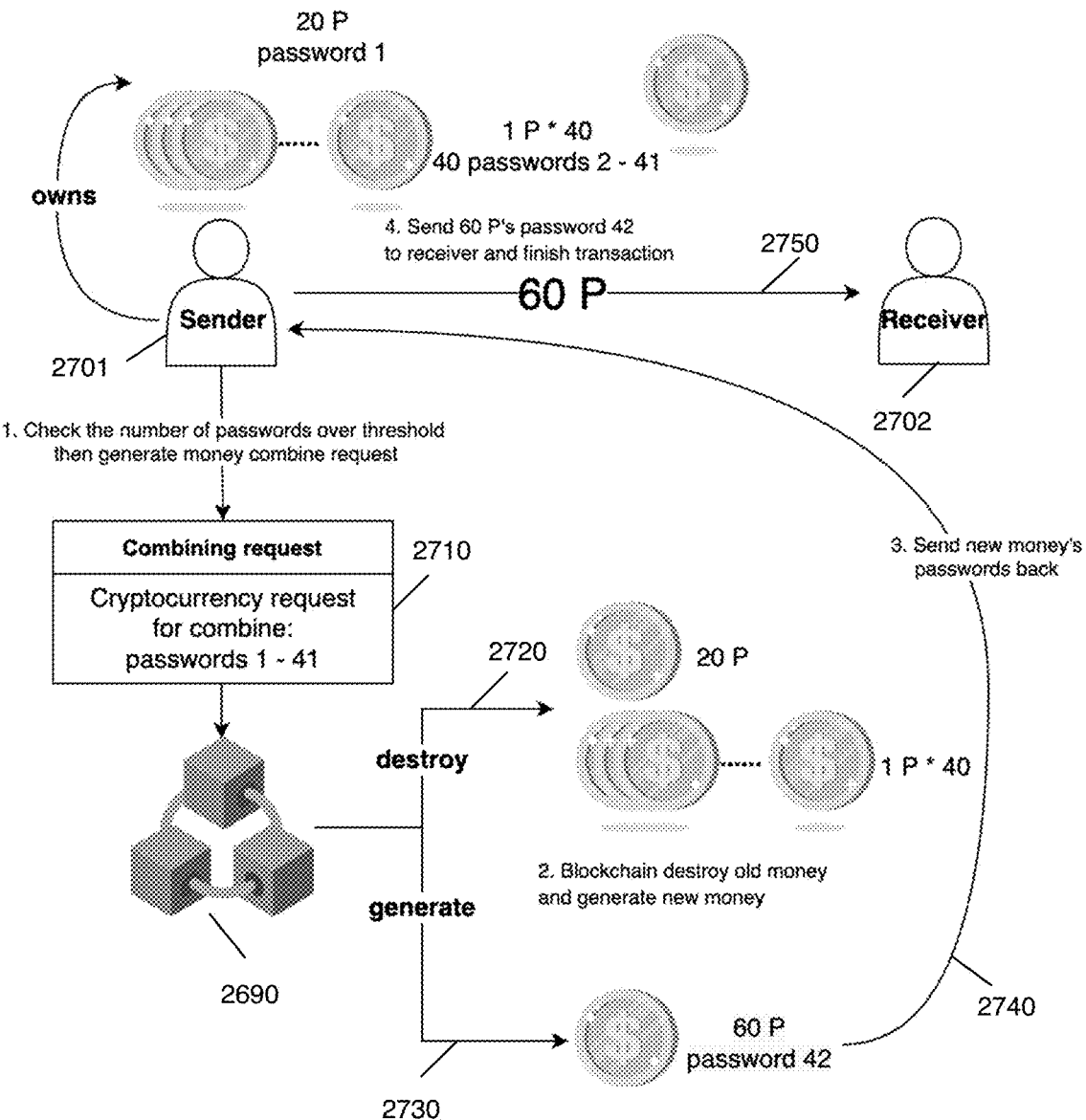
FIG. 27 illustrates the cryptocurrency's combination process, according to various aspects of the present disclosure.

FIG. 26 illustrates the cryptocurrency's split process, according to various aspects of the present disclosure. FIG. 27 illustrates the cryptocurrency's combination process, according to various aspects of the present disclosure. With the denomination applied, the cryptocurrency's split and combination process are shown in FIGS. 26 and 27, respectively. Both the split and combination processes are totally conducted by user's electronic device without requiring the user's input. The user may only be aware of the total account balance but may be unaware of the denominations of cryptocurrency that comprise that balance. To initiate a transaction with a particular amount, the sender 2601 may check whether that transaction amount may be gathered by smaller face value cryptocurrencies. If the smaller face value cryptocurrencies are not enough to cover the transaction amount, it requires the large denomination cryptocurrency split process. For example, in FIG. 26, the sender 2601 only has one 100 P cryptocurrency (P being the unit of cryptocurrency), but the transaction amount is 60 P. Then a splitting request 2610 is generated to the blockchain including the 100 P's password and the transaction amount 60 P.

The blockchain (e.g., a server of a blockchain node) 2690 receives the request and verifies the authenticity of that 100P cryptocurrency. If the verification succeeds, the blockchain system may destroy (as shown by 2620) the original 100 P cryptocurrency and may generate (as shown by 2630) the minimal numbers of cryptocurrencies that satisfy the transaction and the rest balance. In this case, a 60 P cryptocurrency and a 40 P cryptocurrency are generated and sent back (as shown by 2640) to the sender 2601. Then the sender 2601 receives 60 P and 40 P split cryptocurrencies and utilizes 60 P to initiate the transaction with the receiver 2602 (as shown by 2650).

If only the split process occurs, the cryptocurrency in the system may gradually turn into smaller amounts as transactions take place. That's why there is also a need for the combination process. As mentioned before, the sender will check whether that transaction amount may be gathered by smaller face value cryptocurrencies. In FIG. 27, the transaction amount 60 P may be made up of one 20 P cryptocurrency and forty 1 P cryptocurrencies. Before sending the 41 passcodes to the receiver 2702, the system checks whether the number of cryptocurrencies sent is over the threshold. Suppose the threshold allows at most 10 cryptocurrency's passcodes per transaction. Then 41 is over that limit and that triggers the combining request 2710 to the system. In a combining request, only the cryptocurrency's passcodes are included. The system receives the smaller changes' passcodes and destroys them (as shown by 2720). At the same time, the least number of cryptocurrencies to cover the transaction amount is generated (as shown by 2730). In the example, one 60 P cryptocurrency is generated and sent back (as shown by 2740) to the sender. The sender 2701 sends (as shown by 2750) 60 P cryptocurrency to the receiver and finishes the transaction.

Recording only the cryptocurrency itself on the public ledger by the present embodiments provides the technical advantage of greatly reducing the on-chain storage. The global M1 supply, which includes all the money in circulation plus travelers checks and demand deposits like checking and savings accounts, was \$48.9 trillion as of November 2022. The cryptocurrency in one embodiment may have a maximum face value of 1 million US dollars. Obviously, not all cryptocurrencies are represented with a face value of 1 million. Let's assume that the face value of 1 million is represented by an average of 10,000 different denominations of cryptocurrencies. So, the total cryptocurrencies need for current global use is $48.9\times10^{12}\div10^{6}\times10^{4}=48.9\times10^{10}$. Suppose it takes 10 years to issue that amount of cryptocurrency, so $48.9\times10^{9}$ cryptocurrencies are issued each year. Since each passcode is 256 Byte, the total storage increment per year is $48.9\times10^{9}\times256$ Byte$\approx$12.5 TB. NYSE generates more than 4 PB (4000 TB) transaction related data per year. Furthermore, the NYSE represents only a small fraction of the global transaction volume. In the present embodiments, recording only the cryptocurrency itself greatly reduces on-chain storage. All the present embodiments need to record is the cryptocurrency itself with the ownership and one-time passcode on it. The middle process of how the cryptocurrency is transferred in the system, which is referred to as a transaction, is not needed. Compared to recording transactions, it is much more storage efficient to record cryptocurrency itself.

Figure 29:
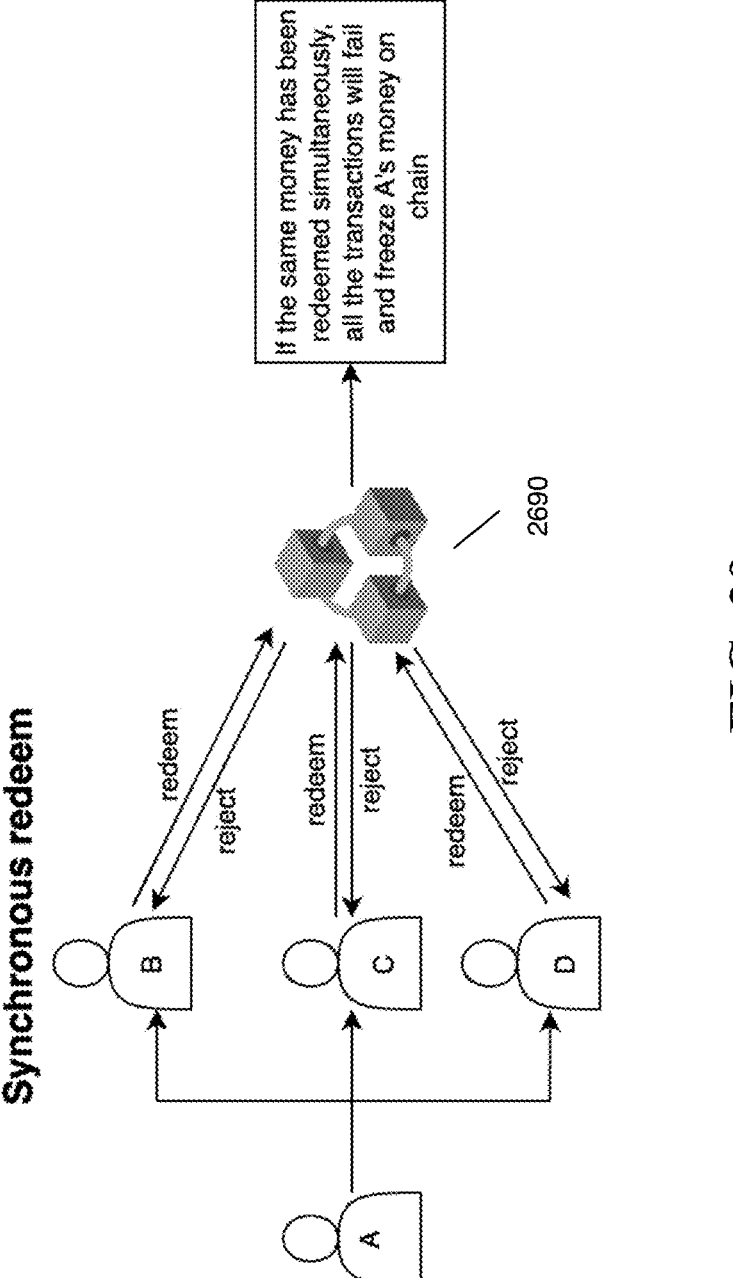

One major attack that the system of the present embodiments addresses is double spending. FIGS. 28 and 29 illustrate two scenarios in which A spends the same cryptocurrency's passcode to several individuals, for example B, C, and D, according to various aspects of the present disclosure. FIG. 28 depicts a non-simultaneous situation where A first transfers the passcode to C. C successfully applies for the transaction on the blockchain, and the blockchain system issues a bio-contract to A and C. In this case, the system verifies that the transaction between A and C is successful and issues the newly generated passcode to C. The password is then changed using the owner's account 2321 (FIG. 23) and the cryptocurrency's ownership record on the blockchain has been change to C.

Afterwards, when A attempts to double spend by transferring the old passcode to B and D, B's and D's transaction requests on the chain result in an error for using a wrong passcode, and the transactions are canceled. A does not gain any profits throughout this process. This procedure eliminates double spending attacks because the password is only valid once as each transaction changes the owner and therefore the password changes. The present embodiments provide the technical advantage of eliminating the blockchain's complex transaction verification process to determine whether a double spending happens.

FIG. 28 explained that if a double spending happened at different times, the password on the blockchain has already been changed. Redeems that are initiated that occurred later cannot pass the new password verification with the previous password. FIG. 29 presents another scenario of this process, where multiple redeem requests happen simultaneously. In the example of FIG. 29, A tries to double spend his coin to many people by generating the coin's proof of password to all of them. In other words, B, C and D all received valid proofs to acquire that particular coin. A can send the proofs at the same time to B, C and D. Possibly, B, C and D will send the request to the blockchain to redeem that coin which causes B, C, and D to redeem the same cryptocurrency at the same time. Once the blockchain system finds multiple transactions happening with the same time in the same block. None of these duplicate redeem requests are confirmed by the blockchain. In this case, the system detects that A is attempting a double-spending attack based on the passcode's front-end information and freezes A's funds while imposing penalties.

Figure 30:
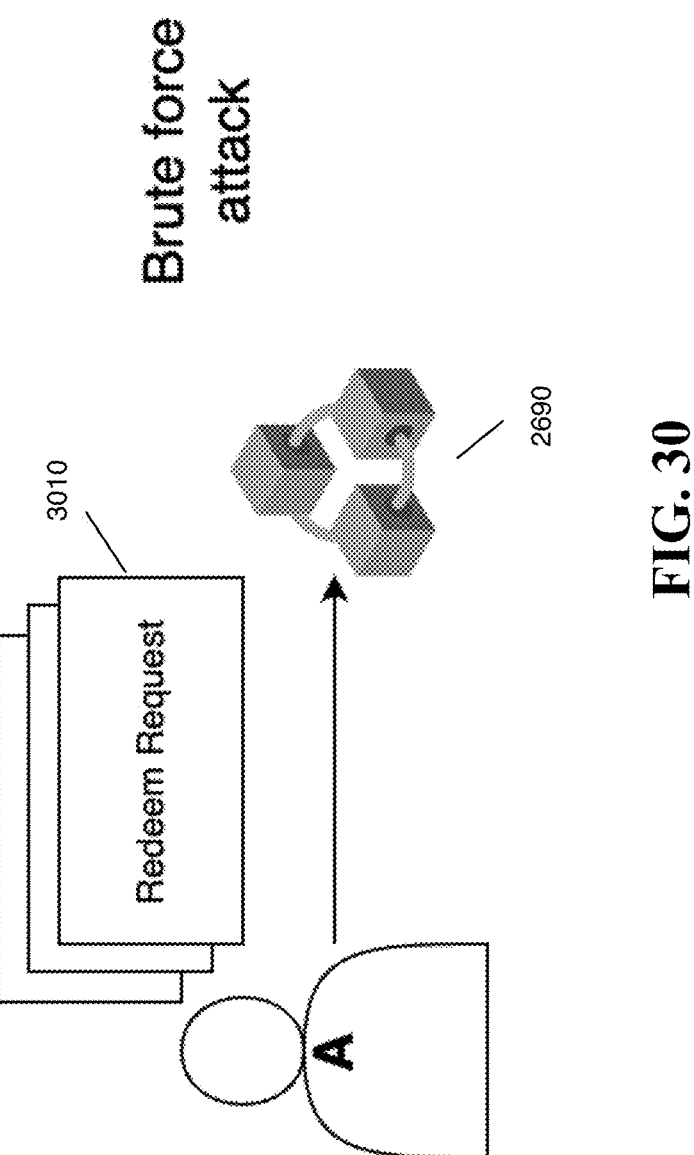
FIGS. 30 and 31 depict two scenarios of Denial-of-Service (DOS) attacks, according to various aspects of the present disclosure.
Figure 31:
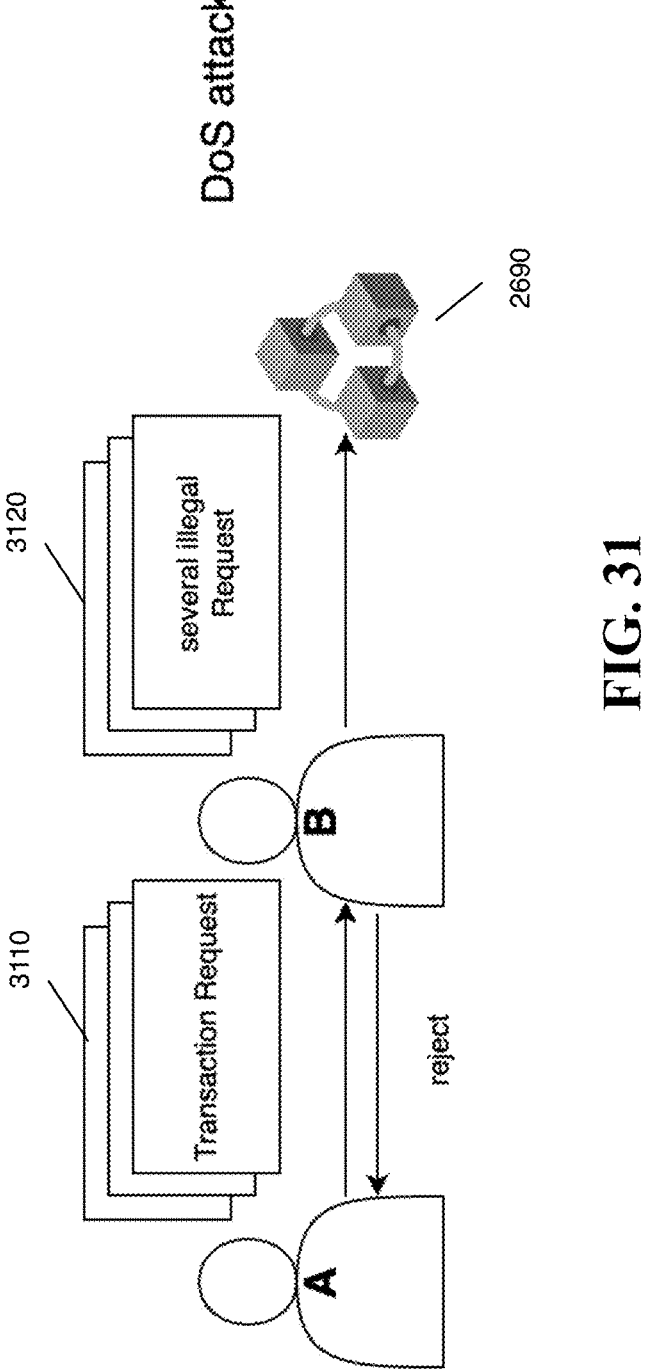

FIGS. 30 and 31 depict two scenarios of Denial-of-Service (DOS) attacks, according to various aspects of the present disclosure. FIG. 30 shows a situation where A performs a brute force attack by keep on sending a large number of redeem coin requests 3010 to the blockchain. In this example, the system receives a significant number of incorrect proofs from A. At this point, the system identifies A as a DoS attacker and imposes penalties on A. Additionally, the system mitigates the risk of such attacks by restricting the number of transactions a single individual may perform within a given time period.

FIG. 31 illustrates another type of DOS attack, where A keeps sending a large number of requests 3110 to its peer B. Different from direct DOS attack to the blockchain as explained with reference to FIG. 30, a hacker A in FIG. 31 may attack another peer B by sending multiple requests 3110 to the B pretending A wants to send money to B. If B executes and sends these illegal redeem requests to the blockchain, the blockchain system may consider B is conducting the DOS attack to the blockchain and may punish B as described above with reference to FIG. 30. But B is aware that A keeps sending unsuccessful transactions to him and rejects A's illegal requests after a threshold of failure number exceeds. In this case, B may initially respond to A's first few requests by sending several redeem requests 3120 to the blockchain. However, upon realizing that the transaction requests fail to be approved by the blockchain, B directly rejects the remaining transactions from A. As a result, the blockchain only receives a few redeem requests, while the remaining attacks are intercepted off-chain. In our embodiment, this kind of DOS attack is mainly addressed off-chain and will not affect the on-chain process. The DoS attacker A's attacks do not propagate to the blockchain, thereby further strengthening the security of the system.

Another major attack is Sybil attack which refers to the creation of numerous fake identities or nodes by an attacker in an attempt to control the network. By having multiple false identities, the attacker may manipulate voting, influence consensus algorithms, and spread false information, thereby disrupting the normal operation and security of the blockchain. In the system of the present embodiments, registration requires individuals to register with their biometric information, which effectively prevents the generation of forged identities and solves the sybil attack problem.

IV. Electronic System

Some of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 32:
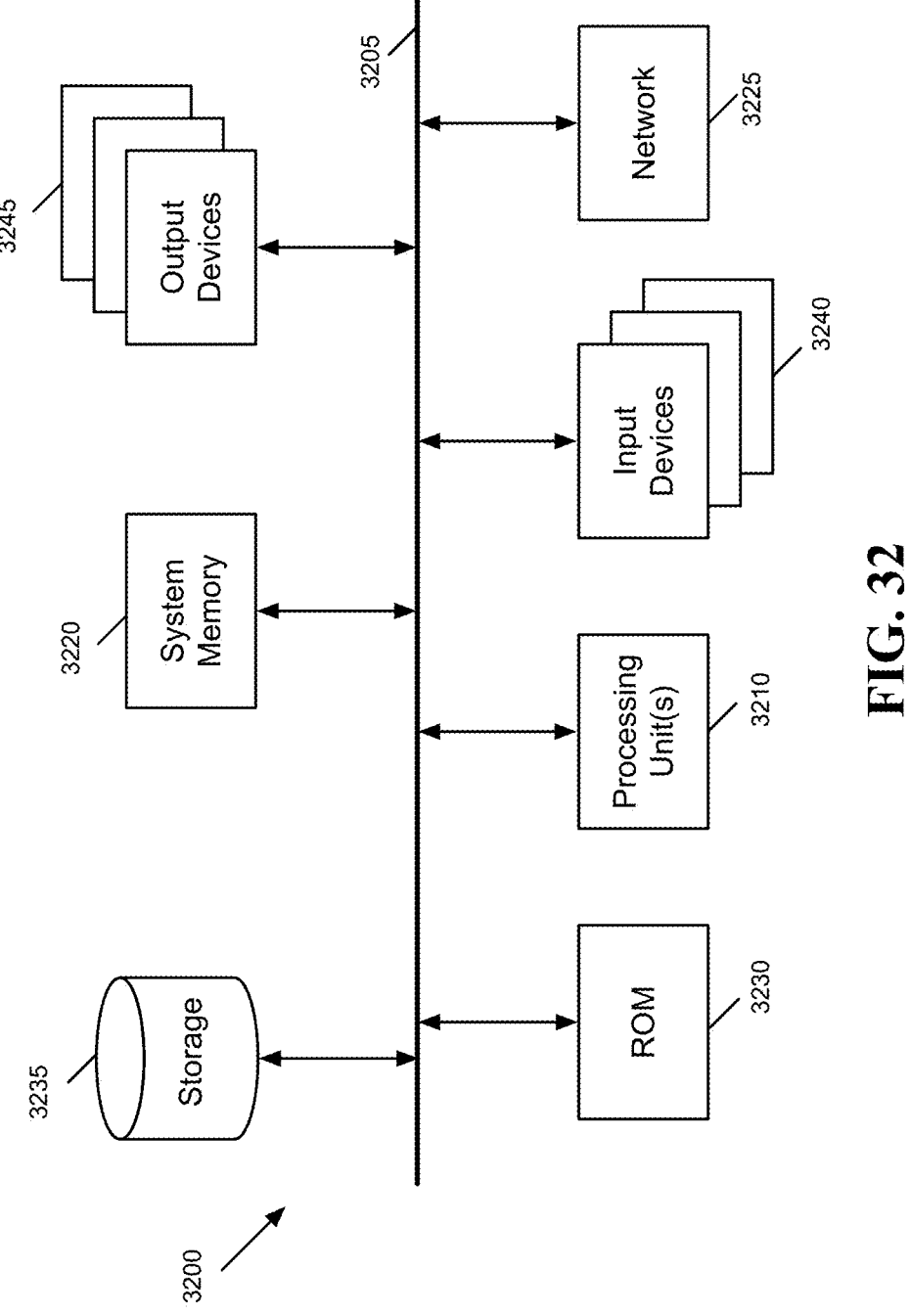
FIG. 32 conceptually illustrates an electronic system with which some embodiments of the invention are implemented.

FIG. 32 conceptually illustrates an electronic system 3200 with which some embodiments of the invention (e.g., the biometric-integrated coin platform, the servers, the client devices, etc., described above) are implemented. The electronic system 3200 may be used to execute any of the control, virtualization, or operating system applications described above. The electronic system 3200 may be a computer (e.g., desktop computer, personal computer, tablet computer, server computer, mainframe, blade computer etc.), phone, PDA, or any other sort of electronic device. Such an electronic system includes various types of computer readable media and interfaces for various other types of computer readable media. Electronic system 3200 includes a bus 3205, processing unit(s) 3210, a system memory 3220, a read-only memory (ROM) 3230, a permanent storage device 3235, input devices 3240, and output devices 3245.

The bus 3205 collectively represents all system, peripheral, and chipset buses that communicatively connect the numerous internal devices of the electronic system 3200. For instance, the bus 3205 communicatively connects the processing unit(s) 3210 with the read-only memory 3230, the system memory 3220, and the permanent storage device 3235.

From these various memory units, the processing unit(s) 3210 retrieve instructions to execute and data to process in order to execute the processes of the invention. The processing unit(s) may be a single processor or a multi-core processor in different embodiments.

The read-only-memory 3230 stores static data and instructions that are needed by the processing unit(s) 3210 and other modules of the electronic system. The permanent storage device 3235, on the other hand, is a read-and-write memory device. This device is a non-volatile memory unit that stores instructions and data even when the electronic system 3200 is off. Some embodiments of the invention use a mass-storage device (such as a magnetic or optical disk and its corresponding disk drive) as the permanent storage device 3235.

Other embodiments use a removable storage device (such as a floppy disk, flash drive, etc.) as the permanent storage device. Like the permanent storage device 3235, the system memory 3220 is a read-and-write memory device. However, unlike storage device 3235, the system memory is a volatile read-and-write memory, such as random-access memory. The system memory stores some of the instructions and data that the processor needs at runtime. In some embodiments, the invention's processes are stored in the system memory 3220, the permanent storage device 3235, and/or the read-only memory 3230. From these various memory units, the processing unit(s) 3210 retrieve instructions to execute and data to process in order to execute the processes of some embodiments.

The bus 3205 also connects to the input and output devices 3240 and 3245. The input devices enable the user to communicate information and select commands to the electronic system. The input devices 3240 include alphanumeric keyboards and pointing devices (also called "cursor control devices"). The output devices 3245 display images generated by the electronic system. The output devices include printers and display devices, such as cathode ray tubes (CRT) or liquid crystal displays (LCD). Some embodiments include devices, such as a touchscreen, that function as both input and output devices.

Finally, as shown in FIG. 32, bus 3205 also couples electronic system 3200 to a network 3225 through a network adapter (not shown). In this manner, the computer may be a part of a network of computers (such as a local area network ("LAN"), a wide area network ("WAN"), an Intranet, or a network of networks, such as the Internet. Any or all components of electronic system 3200 may be used in conjunction with the invention.

Some embodiments include electronic components, such as microprocessors, storage, and memory, that store computer program instructions in a machine-readable or computer readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion may refer to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals. As used in this specification, the term user refers to a person who is accessing the system and/or the network of the present embodiments through an electronic device.

In a first aspect, a method of providing secure access to a distributed ledger system is provided. The distributed ledger system is in communication with a server via a network. The method receives a request by the server to create an account for a user. The request includes a first plurality of images that include biometric information of the user. The method determines, by the server, that no account exists for a user with the same biometric information. The method, in response to the determining, creates an account for the user. The method stores the first plurality of images as the biometric information of the user. The method receives a plurality of biometric seed definitions by the server. Each biometric seed definition corresponds to an image generated from a portion of at least one of the first plurality of images. The image that corresponds to each biometric seed definition is different from the images that correspond to other biometric seed definitions. The method causes the distributed ledger system, by the server, to mint a plurality of biometric seeds to the account of the user, where each biometric seed includes a hash value of the image corresponding to one of the biometric seed definitions in the of a plurality of biometric seed definitions. The method causes the distributed ledger system, by the server, to mint a plurality of capsules to the account of the user, where each capsule includes a value in a native cryptocurrency of the distributed ledger system. The method receives a request by the server from an electronic device of the user to generate a biometric-integrated cryptocurrency from a capsule in the plurality of capsules and a biometric seed in the plurality of biometric seeds. The method causes the distributed ledger system, by the server, to mint a biometric-integrated cryptocurrency to the account of the user, where the biometric-integrated cryptocurrency includes the hash value of the biometric seed, and the cryptocurrency includes the same value as the capsule. The method causes the distributed ledger system, by the server, to burn the biometric seed and the capsule.

In an embodiment of the first aspect, the method receives a request by the server from the electronic device of the user to log in the user. The request includes a second plurality of images that includes biometric information of the user. The method compares the second plurality of images with the first plurality of images. The method logs in the user when the second plurality of images matches the first plurality of images.

In another embodiment of the first aspect, receiving each biometric seed definition includes displaying one of the first plurality of images on a display area on a display of the electronic device of the user, receiving an identification of a region of the displayed image, and receiving the identified region as the biometric seed definition by the server from the electronic device of the user.

In another embodiment of the first aspect, the method further receives a request at the server from the electronic device of the user to decompose the biometric-integrated coin. The method causes the distributed ledger system, by the server, to mint a first capsule to the account of the user, the first capsule includes the same value as the value of the biometric-integrated cryptocurrency. The method causes the distributed ledger system, by the server, to burn the biometric-integrated cryptocurrency.

In another embodiment of the first aspect, the user is a first user, the method further receives a request at the server from the electronic device of the first user to sell the first capsule, provides the information regarding the first capsule to the electronic device of a plurality of users other than the first user, receives an offer at the server to buy the first capsule by a second user in the plurality of user, forwards the offer from the server to the electronic device of the first user, receives a confirmation to sell the capsule to the second user at the server from the electronic device of the first user, and transfers the first capsule to an account of the second user.

In another embodiment of the first aspect, the biometric-integrated cryptocurrency is a first biometric-integrated cryptocurrency, the method further receives a request by the server from the electronic device of the second user to generate a biometric-integrated cryptocurrency from a biometric seed of the second user and the first capsule. The method causes the distributed ledger system, by the server, to mint a second biometric-integrated cryptocurrency to the account of the second user. The second biometric-integrated cryptocurrency includes the hash value of the second user's biometric seed, and the second cryptocurrency includes the same value as the first capsule. The method causes the distributed ledger system, by the server, to burn the biometric seed of the second user and the first capsule.

In another embodiment of the first aspect, the user is a first user, the method further receives a request from the electronic device of the first user to transfer the biometric-integrated cryptocurrency from the first user to a second user. The method transfers the biometric-integrated cryptocurrency from the account of the first user to an account of the second user. The method receives a request at the server from an electronic device of the second user to decompose the biometric-integrated coin. The method causes the distributed ledger system, by the server, to mint a capsule that includes the same value as the value of the biometric-integrated cryptocurrency to the account of the second user. The method causes the distributed ledger system, by the server, to burn the biometric-integrated cryptocurrency.

In another embodiment of the first aspect, the method stores, by the server, the images corresponding to the plurality of biometric seed definitions. The method receives a selection of a first image corresponding to a biometric seed definition of a first biometric seed. The method receives a selection of a second image corresponding to a biometric seed definition of a second biometric seed. The method combines the first and second images into a third image. The method receives a third biometric seed definition corresponding to the third image by the server from the electronic device of the user. The method causes the distributed ledger system, by the server, to mint a biometric seed that includes a hash value of the third image to the account of the user. The method causes the distributed ledger system, by the server, to burn the first and second seeds.

In another embodiment of the first aspect, the first plurality of images includes one of a plurality of fingerprint images, a plurality of facial images, a plurality of iris images, a plurality of retina images, a plurality of palm images, or a plurality of palm vein images In a second aspect, a method of providing secure access to a distributed ledger system is provided. The method receives, at an electronic device of a first user, a first plurality of images that include biometric information of the first user. The electronic device of the first user is in communication with the distributed ledger system via a network. For each image in the first plurality of images, the method identifies a plurality of feature points on the image, calculates a feature code from the plurality of feature points, and generates a random number corresponding to the feature code. The method concatenates, by the electronic device of the first user, the feature codes to generate a combined feature code. The method generates, by the electronic device of the first user, a commitment for the first user by applying a zero-knowledge proof (ZKP) commitment algorithm to the combined feature code. The method sends the commitment and an account identifier of the first user from the electronic device of the first user to a server of the distributed ledger system. The method inserts, by the server, the first user's commitment and the first user's account identifier into a ZKP verifier tree. The ZKP verifier tree is a Merkle Patricia Trie that includes a root, a plurality of inner nodes, and a plurality of leaves. The pair of a user's account identifier and the user's commitment is used as a key-value pair for inserting the key-value pair in the ZKP verifier tree. The account identifier of the user is a key determines a path from the root to a leaf node. The user's commitment is stored in the leaf node. The method sends a transaction request that includes the first user's commitment, the first user's account identifier, and information regarding a transaction from the electronic device of the first user to the server. The method searches the ZKP verifier tree by the server using the first user's account identifier as a key and the first user's commitment as a value. The method verifies, by the server, that the first user's commitment exists in the ZKP verifier tree. The method performs the transaction after verifying the first user's commitment exists in the ZKP verifier tree.

In an embodiments of the second aspect, the method, prior to generating the first user's commitment, sends the feature codes and the corresponding random numbers from the electronic device of the first user to a server of the distributed ledger system. The method determines, by the server, that at least one feature code does not exist in a biometric feature tree that stores pairs of feature code and the corresponding random numbers for a plurality of users. The biometric feature tree is a Merkle Patricia Trie that includes a root, a plurality of inner nodes, and a plurality of leaf nodes. Each pair of feature code and the corresponding random number is used as a key-value pair for inserting the key-value pair in the biometric feature tree. Each feature code is a key determining a path from the root to a leaf node, and the corresponding random number is stored in the leaf node. The method generates the account identifier of the first user by concatenating the random numbers corresponding to feature codes.

In another embodiment of the second aspect, the method receives a request at the server from the electronic device of the first user to recover the first user's account identifier. The request to recover the first user's account identifier includes the first user's commitment and the first user's feature codes. The method retrieves a first account identifier from the biometric feature tree using the first user's feature codes. The method searches the ZKP verifier tree by the server using the unverified account identifier as a key and the first user's commitment as a value. The method determines, by the server, that the first user's commitment exists in the ZKP verifier tree. The method sends the first account identifier as the account identifier of the first user from the server to the electronic device of the first user.

In another embodiment of the second aspect, the method generates a private key and a public key for the first user by applying a cryptographic key generation algorithm to the combined feature code. The method sends the public key to the distributed ledger system.

In another embodiment of the second aspect, sending the transaction request includes encrypting, by the electronic device of the first user, the transaction information with the private key of the first user, and decrypting the transaction information by the server using the public key of the first user.

In another embodiment of the second aspect, the first plurality of images includes one of a plurality of fingerprint images, a plurality of facial images, a plurality of iris images, a plurality of retina images, a plurality of palm images, or a plurality of palm vein images.

In a third aspect, a method of providing dynamic biometric verification is provided. The method receives one or more images that include biometric information of the user by a server. The method generates, from the one or more images, a first plurality of feature values corresponding to biometric characteristics of the user. The method stores the first plurality of feature values by the server. The method receives a request at the server to log in the user to the account of the user. The method generates a dynamic password that includes a randomly selected identification of a second plurality of feature values from the first plurality of featured values. The second plurality of feature values includes fewer feature values than the first plurality of feature values. The method sends the dynamic password from the server to the electronic device of the user. The method receives one or more images that includes biometric information of the user by the electronic device of the user. The method generates the second plurality of feature codes from the one or more images by the electronic device of the user based on the randomly selected identification in the dynamic password. The method calculates a first verification code by the electronic device of the user using the second plurality of feature codes. The method sends the first verification code from the electronic device of the first user to the server. The method calculates a second verification code by the server using the first plurality of feature codes and the randomly selected identification of the second plurality of feature values. The method determines, by the server, that the first verification code matches second verification code. The method allows the user to log in to the user's account based on the determination.

In an embodiment of the third aspect, logging in to the user's account gives the user access to a plurality of services provided by the server.

In another embodiment of the third aspect, the first plurality of feature values are hash values generated by applying a hash algorithm to the one or more images received by the server. The second plurality of feature values are hash values generated by applying a hash algorithm to the one or more images received by the electronic device of the user.

In another embodiment of the third aspect, the dynamic password is a first dynamic password. The one or more images are a first set of one or more images. The method receives a request at the server to log in the user to the account of the user after the user logs out of the user's account. The method generates a second dynamic password that includes a randomly selected identification of a third plurality of feature values from the first plurality of featured values. The third plurality of feature values includes fewer feature values than the first plurality of feature values. At least one feature value in the third plurality of feature values is different than the feature values in the second plurality of feature values. The method sends the second dynamic password from the server to the electronic device of the user. The method receives a second set of one or more images that includes biometric information of the user by the electronic device of the user. The method generates, by the electronic device of the user, the third plurality of feature codes from the second set of one or more images based on the randomly selected identification in the second dynamic password. The method calculates a third verification code by the electronic device of the user using the third plurality of feature codes. The method sends the third verification code from the electronic device of the first user to the server. The method calculates a fourth verification code by the server using the first plurality of feature codes and the randomly selected identification of the third plurality of feature values. The method determines, by the server, that the third verification code matches fourth verification code. The method allows the user to log in to the user's account based on the determination.

In another embodiment of the third aspect, the one or more images includes biometric information of the user that includes one or more fingerprint images, one or more facial images, one or more iris images, one or more retina images, one or more palm images, or one or more palm vein images.

In a fourth aspect, a method of providing security for a distributed ledger system is provided. The method receives, by the electronic device of a first user, a public key of a second user. The first user owns a cryptocurrency associated with a one-time passcode. The one-time passcode includes an immutable part that identifies the cryptocurrency and a mutable part that identifies an ownership of the cryptocurrency. The mutable part includes a commitment generated by the first user and an encrypted user-generated password of the first user. The distributed ledger system has stored the one-time passcode and biometric information of the first and second users. The method generates a proof of knowledge of the mutable part of the one-time passcode by the electronic device of the first user as a function of the public key of the receiver and the user-generated password of the first user. The method sends a transaction request that includes the immutable part of the one-time passcode and the proof of knowledge of the mutable part of the one-time passcode from the electronic device of the first user to an electronic device of the second user. The method generates, by the electronic device of the second user, a user-generated password and a commitment generated by the second user's user-generated password. The method sends a redeem request from the electronic device of the second user to a server of the distributed ledger system, the redeem request includes the immutable part of the one-time passcode, the proof of knowledge of the mutable part of the one-time passcode, the second user's user-generated password, and the second user's commitment. The method identifies the cryptocurrency, by the server, using the immutable part of the one-time passcode. The method uses the proof of knowledge of the mutable part of the one-time passcode to verify that the proof of knowledge matches the first user's commitment. The method updates the mutable part of the cryptocurrency with the second user's user-generated password and the second user's commitment. The method sends a confirmation message from the server to the electronic devices of the first and second users. The confirmation message includes the biometric information of the first and second users as a proof that the first user has sent the cryptocurrency to the second user.

In an embodiment of the fourth aspect, the mutable part of the one-time passcode includes an account number of the owner of the cryptocurrency. Updating the mutable part of the cryptocurrency further includes replacing an account number of the first user in the mutable part of the cryptocurrency with an account number of the second user.

In an embodiment of the fourth aspect, the biometric information of the first and second users includes information extracted from one of fingerprint images, facial images, iris images, retina images, palm images, or palm vein images of the first and second users.

While the invention has been described with reference to numerous specific details, one of ordinary skill in the art will recognize that the invention may be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method of providing secure access to a distributed ledger system, the distributed ledger system in communication with a server via a network, the method comprising:

receiving a request by the server to create an account for a user, the request comprising a first plurality of images comprising biometric information of the user;

determining, by the server, that no account exists for a user with a same biometric information;

in response to the determining, creating an account for the user;

storing the first plurality of images as the biometric information of the user;

receiving a plurality of biometric seed definitions by the server, each biometric seed definition corresponding to an image generated from a portion of at least one of the first plurality of images, the image corresponding to each biometric seed definition being different from the images corresponding to other biometric seed definitions;

causing the distributed ledger system, by the server, to:
    mint a plurality of biometric seeds to the account of the user, each biometric seed comprising a hash value of the image corresponding to one of the biometric seed definitions in the of a plurality of biometric seed definitions; and
    mint a plurality of capsules to the account of the user, each capsule comprising a value in a native cryptocurrency of the distributed ledger system;
receiving a request by the server from an electronic device of the user to generate a biometric-integrated cryptocurrency from a capsule in the plurality of capsules and a biometric seed in the plurality of biometric seeds;
causing the distributed ledger system, by the server, to:
    mint a biometric-integrated cryptocurrency to the account of the user, the biometric-integrated cryptocurrency comprising the hash value of the biometric seed, and the cryptocurrency comprising a same value as the capsule; and
    burn the biometric seed and the capsule.

2. The method of claim 1 further comprising:
receiving a request by the server from the electronic device of the user to log in the user, the request comprising a second plurality of images comprising biometric information of the user;
comparing the second plurality of images with the first plurality of images; and
logging in the user when the second plurality of images matches the first plurality of images.

3. The method of claim 1, wherein receiving each biometric seed definition comprises:
    displaying one of the first plurality of images on a display area of a display of the electronic device of the user;
    receiving an identification of a region of the displayed image; and
    receiving the identified region as the biometric seed definition by the server from the electronic device of the user.

4. The method of claim 1 further comprising:
receiving a request at the server from the electronic device of the user to decompose the biometric-integrated cryptocurrency;
causing the distributed ledger system, by the server, to:
    mint a first capsule to the account of the user, the first capsule comprising a same value as the value of the biometric-integrated cryptocurrency; and
    burn the biometric-integrated cryptocurrency.

5. The method of claim 4, wherein the user is a first user, the method further comprising:
    receiving a request at the server from the electronic device of the first user to sell the first capsule;
    providing the information regarding the first capsule to the electronic device of a plurality of users other than the first user;
    receiving an offer at the server to buy the first capsule by a second user in the plurality of users;
    forwarding the offer from the server to the electronic device of the first user;
    receiving a confirmation to sell the first capsule to the second user at the server from the electronic device of the first user; and
    transferring the first capsule to an account of the second user.

6. The method of claim 5, wherein the biometric-integrated cryptocurrency is a first biometric-integrated cryptocurrency, the method further comprising:

receiving a request by the server from the electronic device of the second user to generate a biometric-integrated cryptocurrency from a biometric seed of the second user and the first capsule;
causing the distributed ledger system, by the server, to:
    mint a second biometric-integrated cryptocurrency to the account of the second user, the second biometric-integrated cryptocurrency comprising the hash value of the second user's biometric seed, and the second cryptocurrency comprising a same value as the first capsule; and
    burn the biometric seed of the second user and the first capsule.

7. The method of claim 1, wherein the user is a first user, the method further comprising:
    receiving a request from the electronic device of the first user to transfer the biometric-integrated cryptocurrency from the first user to a second user;
    transferring the biometric-integrated cryptocurrency from the account of the first user to an account of the second user;
    receiving a request at the server from an electronic device of the second user to decompose the biometric-integrated cryptocurrency;
    causing the distributed ledger system, by the server, to:
        mint a capsule comprising a same value as the value of the biometric-integrated cryptocurrency to the account of the second user; and
        burn the biometric-integrated cryptocurrency.

8. The method of claim 1 further comprising:
    storing, by the server, the images corresponding to the plurality of biometric seed definitions;
    receiving a selection of a first image corresponding to a biometric seed definition of a first biometric seed;
    receiving a selection of a second image corresponding to a biometric seed definition of a second biometric seed;
    combining the first and second images into a third image;
    receiving a third biometric seed definition corresponding to the third image by the server from the electronic device of the user; and
    causing the distributed ledger system, by the server, to:
        mint a biometric seed comprising a hash value of the third image to the account of the user; and
        burn the first and second biometric seeds.

9. The method of claim 1, wherein the first plurality of images comprises one of a plurality of fingerprint images, a plurality of facial images, a plurality of iris images, a plurality of retina images, a plurality of palm images, or a plurality of palm vein images.

10. A non-transitory computer readable medium storing a program for providing secure access to a distributed ledger system, the program executable by at least one processor of a server in communication with the distributed ledger system via a network, the program comprising sets of instructions for:
    receiving a request by the server to create an account for a user, the request comprising a first plurality of images comprising biometric information of the user;
    determining, by the server, that no account exists for a user with a same biometric information;
    in response to the determining, creating an account for the user;
    storing the first plurality of images as the biometric information of the user;
    receiving a plurality of biometric seed definitions by the server, each biometric seed definition corresponding to an image generated from a portion of at least one of the first plurality of images, the image corresponding to each biometric seed definition being different from the images corresponding to other biometric seed definitions;

causing the distributed ledger system, by the server, to:
mint a plurality of biometric seeds to the account of the user, each biometric seed comprising a hash value of the image corresponding to one of the biometric seed definitions in the of a plurality of biometric seed definitions; and
mint a plurality of capsules to the account of the user, each capsule comprising a value in a native cryptocurrency of the distributed ledger system;

receiving a request by the server from an electronic device of the user to generate a biometric-integrated cryptocurrency from a capsule in the plurality of capsules and a biometric seed in the plurality of biometric seeds;

causing the distributed ledger system, by the server, to:
mint a biometric-integrated cryptocurrency to the account of the user, the biometric-integrated cryptocurrency comprising the hash value of the biometric seed, and the cryptocurrency comprising a same value as the capsule; and
burn the biometric seed and the capsule.

11. The non-transitory computer readable medium of claim 10, the program comprising sets of instructions for:
receiving a request by the server from the electronic device of the user to log in the user, the request comprising a second plurality of images comprising biometric information of the user;
comparing the second plurality of images with the first plurality of images; and
logging in the user when the second plurality of images matches the first plurality of images.

12. The non-transitory computer readable medium of claim 10, wherein the set of instructions for receiving each biometric seed definition comprises sets of instructions for:
displaying one of the first plurality of images on a display area of a display of the electronic device of the user;
receiving an identification of a region of the displayed image; and
receiving the identified region as the biometric seed definition by the server from the electronic device of the user.

13. The non-transitory computer readable medium of claim 10, the program further comprising sets of instructions for:
receiving a request at the server from the electronic device of the user to decompose the biometric-integrated cryptocurrency;
causing the distributed ledger system, by the server, to:
mint a first capsule to the account of the user, the first capsule comprising a same value as the value of the biometric-integrated cryptocurrency; and
burn the biometric-integrated cryptocurrency.

14. The non-transitory computer readable medium of claim 13, wherein the user is a first user, the program further comprising sets of instructions for:
receiving a request at the server from the electronic device of the first user to sell the first capsule;
providing the information regarding the first capsule to the electronic device of a plurality of users other than the first user;
receiving an offer at the server to buy the first capsule by a second user in the plurality of users;

forwarding the offer from the server to the electronic device of the first user;
receiving a confirmation to sell the first capsule to the second user at the server from the electronic device of the first user; and
transferring the first capsule to an account of the second user.

15. The non-transitory computer readable medium of claim 14, wherein the biometric-integrated cryptocurrency is a first biometric-integrated cryptocurrency, the program further comprising sets of instructions for:
receiving a request by the server from the electronic device of the second user to generate a biometric-integrated cryptocurrency from a biometric seed of the second user and the first capsule;
causing the distributed ledger system, by the server, to:
mint a second biometric-integrated cryptocurrency to the account of the second user, the second biometric-integrated cryptocurrency comprising the hash value of the second user's biometric seed, and the second cryptocurrency comprising a same value as the first capsule; and
burn the biometric seed of the second user and the first capsule.

16. The non-transitory computer readable medium of claim 10, wherein the user is a first user, the program further comprising sets of instructions for:
receiving a request from the electronic device of the first user to transfer the biometric-integrated cryptocurrency from the first user to a second user;
transferring the biometric-integrated cryptocurrency from the account of the first user to an account of the second user;
receiving a request at the server from an electronic device of the second user to decompose the biometric-integrated cryptocurrency;
causing the distributed ledger system, by the server, to:
mint a capsule comprising a same value as the value of the biometric-integrated cryptocurrency to the account of the second user; and
burn the biometric-integrated cryptocurrency.

17. The non-transitory computer readable medium of claim 10, the program further comprising sets of instructions for:
storing, by the server, the images corresponding to the plurality of biometric seed definitions;
receiving a selection of a first image corresponding to a biometric seed definition of a first biometric seed;
receiving a selection of a second image corresponding to a biometric seed definition of a second biometric seed;
combining the first and second images into a third image;
receiving a third biometric seed definition corresponding to the third image by the server from the electronic device of the user; and
causing the distributed ledger system, by the server, to:
mint a biometric seed comprising a hash value of the third image to the account of the user; and
burn the first and second biometric seeds.

18. The non-transitory computer readable medium of claim 10, wherein the first plurality of images comprises one of a plurality of fingerprint images, a plurality of facial images, a plurality of iris images, a plurality of retina images, a plurality of palm images, or a plurality of palm vein images.

* * * * *